United States Patent
Kinrot et al.

(10) Patent No.: US 12,044,617 B2
(45) Date of Patent: Jul. 23, 2024

(54) ACCESSORIES FOR OPTICAL SPECTROMETERS

(71) Applicant: Verifood, Ltd., Herzliya (IL)

(72) Inventors: Uri Kinrot, Hod HaSharon (IL); Oded Ben-David, Herzliya (IL); Elad Heiman, Tel Aviv (IL); Oren Cohen, Herzliya (IL)

(73) Assignee: Verifood, Ltd., Herzliya (IL)

( * ) Notice: Subject to any disclaimer, the term of this patent is extended or adjusted under 35 U.S.C. 154(b) by 0 days.

(21) Appl. No.: 17/212,101

(22) Filed: Mar. 25, 2021

(65) Prior Publication Data
US 2021/0310934 A1    Oct. 7, 2021

Related U.S. Application Data

(63) Continuation of application No. PCT/IB2019/058513, filed on Oct. 7, 2019.

(60) Provisional application No. 62/742,702, filed on Oct. 8, 2018.

(51) Int. Cl.
*G01J 3/10* (2006.01)
*G01J 3/02* (2006.01)
*G01N 21/25* (2006.01)

(52) U.S. Cl.
CPC .......... *G01N 21/255* (2013.01); *G01J 3/0205* (2013.01); *G01J 3/0272* (2013.01); *G01J 3/0291* (2013.01); *G01J 3/10* (2013.01)

(58) Field of Classification Search
CPC ............. G01N 21/552; G01N 21/0303; G01N 21/255; G01J 3/0205; G01J 3/0272; G01J 3/0291; G01J 3/10; G01J 3/0297
See application file for complete search history.

(56) References Cited

U.S. PATENT DOCUMENTS

| | | |
|---|---|---|
| 679,577 A | 7/1901 | Henry |
| 5,305,077 A | 4/1994 | Grego et al. |
| 5,442,435 A | 8/1995 | Cooper et al. |
| 5,469,252 A | 11/1995 | Doles et al. |
| 5,966,212 A | 10/1999 | Hendler et al. |
| 6,024,923 A | 2/2000 | Melendez et al. |
| 6,031,233 A | 2/2000 | Levin et al. |
| 6,031,619 A | 2/2000 | Wilkens et al. |
| 6,069,696 A | 5/2000 | McQueen et al. |
| 6,072,576 A | 6/2000 | McDonald et al. |
| 6,212,312 B1 | 4/2001 | Grann et al. |
| 6,333,501 B1 | 12/2001 | Labrenz |

(Continued)

FOREIGN PATENT DOCUMENTS

| | | |
|---|---|---|
| CN | 1437702 A | 8/2003 |
| CN | 101501465 A | 8/2009 |

(Continued)

OTHER PUBLICATIONS

Kari Ojala, "Reflection and transmission measurements with an integrating sphere and Fourier-transform infrared spectrometer", Applied Optics 1992 (Year: 1992).*

(Continued)

*Primary Examiner* — Maurice C Smith
(74) *Attorney, Agent, or Firm* — WILSON SONSINI GOODRICH & ROSATI

(57) ABSTRACT

Accessories for improving sensitivity or efficiency of optical spectrometers and methods for utilizing such accessories are disclosed.

20 Claims, 18 Drawing Sheets

(56) References Cited

U.S. PATENT DOCUMENTS

| | | |
|---|---|---|
| 6,437,345 B1 | 8/2002 | Bruno-Raimondi et al. |
| 6,441,375 B1 | 8/2002 | Joseph et al. |
| 6,456,373 B1 | 9/2002 | Wienecke et al. |
| 6,483,583 B1 | 11/2002 | Wright et al. |
| 6,615,142 B1 | 9/2003 | Hovde |
| 6,639,666 B2 | 10/2003 | Li |
| 6,700,661 B1 | 3/2004 | Cadell et al. |
| 6,717,669 B2 | 4/2004 | Ruiz |
| 6,836,325 B2 | 12/2004 | Maczura et al. |
| 6,864,978 B1 | 3/2005 | Hazen et al. |
| 6,958,479 B2 | 10/2005 | Burling-Claridge et al. |
| 7,009,702 B2 | 3/2006 | Caruso et al. |
| 7,038,774 B2 | 5/2006 | Hazen et al. |
| 7,068,366 B2 | 6/2006 | Burk et al. |
| 7,075,643 B2 | 7/2006 | Holub |
| 7,084,974 B1 | 8/2006 | Barwicz et al. |
| 7,145,147 B1 * | 12/2006 | Shelley .............. G01N 21/3563 250/341.8 |
| 7,145,650 B2 | 12/2006 | Wang et al. |
| 7,151,600 B2 | 12/2006 | Imura |
| 7,158,225 B2 | 1/2007 | Tedesco et al. |
| 7,235,766 B2 | 6/2007 | Shur et al. |
| 7,236,243 B2 | 6/2007 | Beecroft et al. |
| 7,245,372 B2 | 7/2007 | Han |
| 7,248,370 B2 | 7/2007 | Jones |
| 7,251,037 B2 | 7/2007 | Jones |
| 7,262,839 B2 | 8/2007 | Treado et al. |
| 7,286,233 B2 | 10/2007 | Pizzi |
| 7,339,665 B2 | 3/2008 | Imura |
| 7,414,724 B2 | 8/2008 | Eckert et al. |
| 7,420,663 B2 | 9/2008 | Wang et al. |
| 7,426,446 B2 | 9/2008 | Hagler |
| 7,433,042 B1 | 10/2008 | Cavanaugh et al. |
| 7,436,511 B2 | 10/2008 | Ruchti et al. |
| 7,489,396 B1 | 2/2009 | Vrhel et al. |
| 7,528,957 B2 | 5/2009 | Lewis et al. |
| 7,535,617 B2 | 5/2009 | Gupta et al. |
| 7,649,627 B2 | 1/2010 | Yamamoto |
| 7,667,740 B2 | 2/2010 | Hofer |
| 7,697,136 B2 | 4/2010 | Imura |
| 7,767,969 B2 | 8/2010 | Nagai et al. |
| 7,805,319 B2 | 9/2010 | Badinelli |
| 7,817,273 B2 | 10/2010 | Bahatt et al. |
| 7,868,296 B2 | 1/2011 | Haran et al. |
| 7,876,435 B2 | 1/2011 | Becker-Ross et al. |
| 7,881,892 B2 | 2/2011 | Soyemi et al. |
| 7,897,923 B2 | 3/2011 | Shelley et al. |
| 7,907,282 B2 | 3/2011 | Coates |
| 7,929,130 B2 | 4/2011 | Dirk |
| 7,986,193 B2 | 7/2011 | Krah |
| 7,999,933 B2 | 8/2011 | McClure |
| 8,027,041 B1 | 9/2011 | Mitchell et al. |
| 8,060,383 B2 | 11/2011 | Badinelli |
| 8,125,633 B2 | 2/2012 | Whelan et al. |
| 8,144,322 B2 | 3/2012 | Nagashima et al. |
| 8,149,415 B2 | 4/2012 | Sanders et al. |
| 8,169,607 B2 | 5/2012 | Sano et al. |
| 8,169,608 B2 | 5/2012 | Sano et al. |
| 8,247,774 B2 | 8/2012 | Chou et al. |
| 8,269,174 B2 | 9/2012 | Gardner, Jr. et al. |
| 8,274,739 B2 | 9/2012 | Lee et al. |
| 8,284,401 B2 | 10/2012 | Choi et al. |
| 8,330,945 B2 | 12/2012 | Choi et al. |
| 8,462,420 B2 | 6/2013 | Lee et al. |
| 8,477,305 B2 | 7/2013 | Shibayama et al. |
| 8,526,002 B2 | 9/2013 | Deflores et al. |
| 8,542,359 B2 | 9/2013 | Choi et al. |
| 8,593,628 B2 | 11/2013 | Shimbo et al. |
| 8,604,412 B2 | 12/2013 | Shibayama et al. |
| 8,654,327 B2 | 2/2014 | Bohle et al. |
| 8,665,440 B1 | 3/2014 | Kompaniets et al. |
| 8,675,188 B2 | 3/2014 | Liu et al. |
| 8,711,360 B2 | 4/2014 | Funamoto |
| 8,711,362 B2 | 4/2014 | Funamoto |
| 8,735,820 B2 | 5/2014 | Mertens |
| 8,742,320 B2 | 6/2014 | Shibayama et al. |
| 8,760,645 B2 | 6/2014 | Misener et al. |
| 8,773,659 B2 | 7/2014 | McClure |
| 8,786,854 B2 | 7/2014 | Miyazono |
| 8,848,187 B2 | 9/2014 | Uematsu et al. |
| 8,862,445 B2 | 10/2014 | Priore et al. |
| 8,867,033 B2 | 10/2014 | Carron et al. |
| 8,868,387 B2 | 10/2014 | Den et al. |
| 8,873,046 B2 | 10/2014 | Miyazono |
| 8,937,717 B2 | 1/2015 | Preston et al. |
| 8,976,357 B2 | 3/2015 | Uematsu et al. |
| 9,030,662 B2 | 5/2015 | Lee et al. |
| 9,060,113 B2 | 6/2015 | Rhoads et al. |
| 9,063,011 B2 | 6/2015 | Chen et al. |
| 9,074,933 B2 | 7/2015 | Yokino et al. |
| 9,128,055 B2 | 9/2015 | Sekino et al. |
| 9,163,986 B2 | 10/2015 | Bouckaert |
| 9,173,508 B2 | 11/2015 | Tornwall et al. |
| 9,182,280 B1 | 11/2015 | Gardner et al. |
| 9,234,800 B2 | 1/2016 | Kawamata et al. |
| 9,239,264 B1 | 1/2016 | Demers |
| D750,988 S | 3/2016 | Goldring |
| D751,435 S | 3/2016 | Goldring |
| 9,291,504 B2 | 3/2016 | Goldring et al. |
| 9,297,821 B2 | 3/2016 | Walter et al. |
| 9,301,626 B2 | 4/2016 | Tornwall et al. |
| 9,310,564 B2 | 4/2016 | Martinelli et al. |
| 9,377,396 B2 | 6/2016 | Goldring et al. |
| 9,383,258 B2 | 7/2016 | Goldring et al. |
| 9,383,308 B2 | 7/2016 | Bradley et al. |
| 9,395,244 B2 | 7/2016 | Kurokawa et al. |
| 9,417,180 B2 | 8/2016 | Seo et al. |
| 9,448,114 B2 | 9/2016 | Goldring et al. |
| 9,448,165 B2 | 9/2016 | Gulati et al. |
| 9,453,794 B2 | 9/2016 | Gulati et al. |
| 9,464,934 B2 | 10/2016 | Priore et al. |
| 9,488,468 B2 | 11/2016 | Tsujii et al. |
| 9,488,523 B2 | 11/2016 | Yokino et al. |
| 9,500,523 B2 | 11/2016 | Goldring et al. |
| 9,508,765 B2 | 11/2016 | Owa et al. |
| 9,518,917 B2 | 12/2016 | Scherer et al. |
| 9,546,902 B2 | 1/2017 | Kovacich et al. |
| 9,546,904 B2 | 1/2017 | Pawluczyk et al. |
| 9,557,220 B2 | 1/2017 | Yasui et al. |
| 9,562,848 B2 | 2/2017 | Goldring et al. |
| 9,568,363 B2 | 2/2017 | Yu |
| 9,574,942 B2 | 2/2017 | Goldring et al. |
| 9,587,982 B2 | 3/2017 | Goldring et al. |
| 9,933,305 B2 | 4/2018 | Goldring et al. |
| 9,952,098 B2 | 4/2018 | Goldring et al. |
| 10,203,246 B2 | 2/2019 | Rosen et al. |
| 10,254,215 B2 | 4/2019 | Wilk et al. |
| 10,323,982 B2 | 6/2019 | Goldring et al. |
| 10,330,531 B2 | 6/2019 | Goldring et al. |
| 10,386,298 B2 * | 8/2019 | Barritault ........... G01N 21/3504 |
| 10,502,679 B2 | 12/2019 | Aphek |
| 10,641,657 B2 | 5/2020 | Goldring et al. |
| 10,648,861 B2 | 5/2020 | Goldring et al. |
| 10,704,954 B2 | 7/2020 | Goldring et al. |
| 10,760,964 B2 | 9/2020 | Goldring et al. |
| 10,791,933 B2 | 10/2020 | Goldring et al. |
| 10,942,065 B2 | 3/2021 | Goldring et al. |
| 11,067,443 B2 | 7/2021 | Goldring et al. |
| 11,118,971 B2 | 9/2021 | Goldring et al. |
| 11,237,050 B2 | 2/2022 | Goldring et al. |
| 11,320,307 B2 | 5/2022 | Goldring et al. |
| 11,333,552 B2 | 5/2022 | Goldring et al. |
| 11,378,449 B2 | 7/2022 | Milo et al. |
| 11,802,794 B2 | 10/2023 | Goldring et al. |
| 2001/0009972 A1 | 7/2001 | Doi et al. |
| 2001/0028648 A1 | 10/2001 | Suzuki |
| 2002/0039186 A1 | 4/2002 | Rosenberg et al. |
| 2002/0044279 A1 | 4/2002 | Khoury |
| 2002/0131044 A1 | 9/2002 | Kobayashi et al. |
| 2002/0131047 A1 | 9/2002 | Zarrabian et al. |
| 2002/0145728 A1 | 10/2002 | Adams et al. |
| 2002/0163641 A1 | 11/2002 | Shroder |
| 2002/0191127 A1 | 12/2002 | Roberts et al. |
| 2002/0193671 A1 | 12/2002 | Ciurczak et al. |

(56) References Cited

U.S. PATENT DOCUMENTS

| | | |
|---|---|---|
| 2003/0122080 A1 | 7/2003 | Burling-Claridge et al. |
| 2003/0218880 A1 | 11/2003 | Brukilacchio |
| 2004/0019462 A1 | 1/2004 | Gehrlein et al. |
| 2004/0021078 A1 | 2/2004 | Hagler |
| 2004/0129884 A1* | 7/2004 | Boyle .................. G01N 21/552 250/338.5 |
| 2004/0136577 A1 | 7/2004 | Rao et al. |
| 2004/0174522 A1 | 9/2004 | Hagler |
| 2004/0201835 A1* | 10/2004 | Coates ................ G01N 21/8507 356/73 |
| 2004/0213459 A1 | 10/2004 | Ishimaru et al. |
| 2005/0007596 A1 | 1/2005 | Wilks, Jr. et al. |
| 2005/0037505 A1 | 2/2005 | Samsoondar |
| 2005/0117151 A1 | 6/2005 | Han |
| 2005/0128477 A1 | 6/2005 | Caruso et al. |
| 2005/0149598 A1 | 7/2005 | Mendlovic et al. |
| 2005/0151975 A1 | 7/2005 | Melnyk |
| 2005/0156103 A1* | 7/2005 | May .......................... F21K 9/60 250/228 |
| 2005/0196046 A1 | 9/2005 | Hudnut et al. |
| 2006/0038130 A1* | 2/2006 | P. Boyle .............. G01N 21/552 250/339.11 |
| 2006/0086901 A1 | 4/2006 | Price et al. |
| 2006/0124656 A1 | 6/2006 | Popovich, Jr. et al. |
| 2006/0132760 A1 | 6/2006 | Imura |
| 2006/0146315 A1 | 7/2006 | Treado |
| 2006/0279732 A1 | 12/2006 | Wang et al. |
| 2006/0280096 A1 | 12/2006 | Riley et al. |
| 2007/0002205 A1 | 1/2007 | Hasei |
| 2007/0045524 A1* | 3/2007 | Rains .................... G01J 3/0264 250/228 |
| 2007/0138978 A1* | 6/2007 | Rains ...................... G09F 13/22 315/291 |
| 2007/0230932 A1 | 10/2007 | Tanaka et al. |
| 2007/0236697 A1 | 10/2007 | Zribi et al. |
| 2008/0061236 A1 | 3/2008 | Meredith et al. |
| 2008/0073510 A1 | 3/2008 | Finlay |
| 2008/0112853 A1 | 5/2008 | Hall |
| 2008/0116379 A1* | 5/2008 | Teder .................... G01N 21/552 250/221 |
| 2008/0137328 A1 | 6/2008 | Lee et al. |
| 2008/0204578 A1 | 8/2008 | Scheuch et al. |
| 2008/0265146 A1 | 10/2008 | Coates |
| 2008/0277625 A1 | 11/2008 | Nakamura et al. |
| 2008/0297379 A1 | 12/2008 | Yang et al. |
| 2008/0297791 A1 | 12/2008 | Imura |
| 2009/0051910 A1 | 2/2009 | Imura |
| 2009/0201577 A1 | 8/2009 | Laplante et al. |
| 2009/0213361 A1 | 8/2009 | Vander et al. |
| 2009/0294637 A1 | 12/2009 | Kusano et al. |
| 2010/0045616 A1 | 2/2010 | Li et al. |
| 2010/0080351 A1 | 4/2010 | Hession-Kunz et al. |
| 2010/0085537 A1 | 4/2010 | Ramella-Roman et al. |
| 2010/0110442 A1 | 5/2010 | Adibi et al. |
| 2010/0128370 A1 | 5/2010 | Chen et al. |
| 2010/0134794 A1 | 6/2010 | Odegard et al. |
| 2010/0148083 A1 | 6/2010 | Brown et al. |
| 2010/0165337 A1 | 7/2010 | Dirk |
| 2010/0191493 A1 | 7/2010 | Brown et al. |
| 2010/0197038 A1* | 8/2010 | Verschuren .......... G01N 21/552 436/164 |
| 2010/0201979 A1 | 8/2010 | Momtahan et al. |
| 2010/0271352 A1 | 10/2010 | Nakano et al. |
| 2010/0284005 A1 | 11/2010 | Malinen et al. |
| 2010/0284014 A1* | 11/2010 | Baba .................... G01N 21/474 702/19 |
| 2010/0290051 A1 | 11/2010 | Yamada et al. |
| 2010/0292581 A1 | 11/2010 | Howard et al. |
| 2010/0309454 A1 | 12/2010 | Zhang |
| 2011/0037975 A1 | 2/2011 | McClure |
| 2011/0255745 A1 | 10/2011 | Hodder et al. |
| 2011/0261252 A1 | 10/2011 | Chen |
| 2011/0318717 A1 | 12/2011 | Adamowicz |
| 2012/0001083 A1 | 1/2012 | Knapp |
| 2012/0018829 A1 | 1/2012 | Beck et al. |
| 2012/0019819 A1 | 1/2012 | Messerchmidt |
| 2012/0053426 A1 | 3/2012 | Webster et al. |
| 2012/0088486 A1 | 4/2012 | Messerchmidt |
| 2012/0099102 A1 | 4/2012 | Bello |
| 2012/0161034 A1* | 6/2012 | Johnson ............... G01N 21/552 356/436 |
| 2012/0229809 A1 | 9/2012 | Pellenc et al. |
| 2012/0286046 A1 | 11/2012 | Ciurczak et al. |
| 2013/0021611 A1 | 1/2013 | Tsurutani |
| 2013/0107260 A1 | 5/2013 | Nozawa |
| 2013/0155402 A1 | 6/2013 | Walton et al. |
| 2013/0182250 A1 | 7/2013 | Mcclure |
| 2013/0258341 A1 | 10/2013 | Day et al. |
| 2014/0046630 A1 | 2/2014 | Smith et al. |
| 2014/0052555 A1 | 2/2014 | MacIntosh |
| 2014/0064479 A1 | 3/2014 | Manikandan et al. |
| 2014/0168636 A1 | 6/2014 | Funamoto et al. |
| 2014/0240695 A1* | 8/2014 | Pagan .................. G01N 21/031 356/440 |
| 2014/0293091 A1 | 10/2014 | Rhoads et al. |
| 2014/0320858 A1 | 10/2014 | Goldring et al. |
| 2014/0333932 A1 | 11/2014 | Uematsu et al. |
| 2015/0036138 A1 | 2/2015 | Watson et al. |
| 2015/0055132 A1 | 2/2015 | Ricketts et al. |
| 2015/0062577 A1 | 3/2015 | Hartwell et al. |
| 2015/0069239 A1 | 3/2015 | Kester et al. |
| 2015/0103354 A1 | 4/2015 | Saptari |
| 2015/0108333 A1 | 4/2015 | Bouckaert |
| 2015/0116707 A1 | 4/2015 | Tatsuda |
| 2015/0119661 A1 | 4/2015 | Gilbert et al. |
| 2015/0153225 A1 | 6/2015 | Baudelet |
| 2015/0204833 A1 | 7/2015 | O'Brien et al. |
| 2015/0253469 A1 | 9/2015 | Le Gros et al. |
| 2015/0288935 A1 | 10/2015 | Shinozaki |
| 2015/0300879 A1 | 10/2015 | Goldring et al. |
| 2015/0323383 A1 | 11/2015 | Pastore et al. |
| 2015/0369725 A1 | 12/2015 | Carvalho et al. |
| 2016/0018260 A1 | 1/2016 | Samuels |
| 2016/0033328 A1 | 2/2016 | Walters |
| 2016/0084763 A1 | 3/2016 | De Boer et al. |
| 2016/0091369 A1 | 3/2016 | Sakurai et al. |
| 2016/0103069 A1 | 4/2016 | Umapathy et al. |
| 2016/0223400 A1 | 8/2016 | Carron et al. |
| 2016/0231171 A1 | 8/2016 | Assefa et al. |
| 2016/0238449 A1 | 8/2016 | Goldring et al. |
| 2016/0245700 A1 | 8/2016 | Uematsu et al. |
| 2016/0258813 A1 | 9/2016 | Kuri |
| 2016/0263910 A1 | 9/2016 | Kanai et al. |
| 2016/0282182 A1 | 9/2016 | Kanai et al. |
| 2016/0290863 A1 | 10/2016 | Goldring et al. |
| 2016/0299004 A1 | 10/2016 | Thamm |
| 2016/0299061 A1 | 10/2016 | Goldring et al. |
| 2016/0305820 A1 | 10/2016 | Zollars et al. |
| 2016/0313184 A1 | 10/2016 | Owechko |
| 2016/0334274 A1 | 11/2016 | Xu |
| 2016/0356646 A1 | 12/2016 | Wiegand et al. |
| 2016/0356647 A1 | 12/2016 | Wiegand et al. |
| 2016/0356704 A1 | 12/2016 | Kim et al. |
| 2017/0003167 A1 | 1/2017 | Ave |
| 2017/0010160 A1 | 1/2017 | Rosen et al. |
| 2017/0027447 A1 | 2/2017 | Sutin et al. |
| 2017/0038257 A1 | 2/2017 | Liu et al. |
| 2017/0160131 A1 | 6/2017 | Goldring et al. |
| 2017/0231486 A1* | 8/2017 | Bone ........................ A61B 3/02 351/243 |
| 2017/0234729 A1 | 8/2017 | Goldring et al. |
| 2017/0309763 A1 | 10/2017 | Sweeney et al. |
| 2018/0003558 A1 | 1/2018 | Goldring et al. |
| 2018/0058927 A1* | 3/2018 | Shiraiwa ............... G01J 3/0297 |
| 2018/0120155 A1 | 5/2018 | Rosen et al. |
| 2018/0136042 A1 | 5/2018 | Goldring et al. |
| 2018/0172510 A1 | 6/2018 | Rosen et al. |
| 2018/0180478 A1 | 6/2018 | Goldring |
| 2018/0188110 A1 | 7/2018 | Goldring et al. |
| 2019/0033132 A1 | 1/2019 | Goldring, II et al. |
| 2019/0041265 A1 | 2/2019 | Rosen, II et al. |
| 2019/0056315 A1 | 2/2019 | Kinrot et al. |
| 2019/0285540 A1* | 9/2019 | Kawano ............... G01N 21/251 |

(56) References Cited

U.S. PATENT DOCUMENTS

| | | |
|---|---|---|
| 2020/0209060 A1 | 7/2020 | Rosen et al. |
| 2021/0302232 A1 | 9/2021 | Goldring et al. |
| 2022/0011162 A1 | 1/2022 | Goldring et al. |
| 2022/0074791 A1 | 3/2022 | Goldring et al. |

FOREIGN PATENT DOCUMENTS

| | | |
|---|---|---|
| CN | 102369421 A | 3/2012 |
| CN | 102435311 A | 5/2012 |
| CN | 103575223 A | 2/2014 |
| CN | 108107013 A | 6/2018 |
| EP | 2783193 A1 | 10/2014 |
| EP | 3028020 A2 | 6/2016 |
| EP | 3090239 A2 | 11/2016 |
| EP | 3864384 A1 | 8/2021 |
| JP | H0792022 A | 4/1995 |
| JP | 2001236583 A | 8/2001 |
| JP | 2002277326 A | 9/2002 |
| JP | 2004294361 A | 10/2004 |
| JP | 2005148018 A | 6/2005 |
| JP | 2007218878 A | 8/2007 |
| JP | 2008286522 A | 11/2008 |
| JP | 2009104547 A | 5/2009 |
| JP | 2011198801 A | 10/2011 |
| JP | 2012058711 A | 3/2012 |
| WO | WO-9953350 A1 | 10/1999 |
| WO | WO-2005008198 A2 | 1/2005 |
| WO | WO-2010027982 A2 | 3/2010 |
| WO | WO-2010036906 A1 | 4/2010 |
| WO | WO-2013065035 A1 | 5/2013 |
| WO | WO-2013082272 A1 | 6/2013 |
| WO | WO-2013106307 A1 | 7/2013 |
| WO | WO-2013148461 A1 | 10/2013 |
| WO | WO-2013150290 A1 | 10/2013 |
| WO | WO-2013162850 A1 | 10/2013 |
| WO | WO-2013163268 A1 | 10/2013 |
| WO | WO-2013165887 A1 | 11/2013 |
| WO | WO-2013184226 A1 | 12/2013 |
| WO | WO-2014014534 A2 | 1/2014 |
| WO | WO-2014033783 A1 | 3/2014 |
| WO | WO-2014014534 A3 | 4/2014 |
| WO | WO-2014064447 A1 | 5/2014 |
| WO | WO-2014102629 A1 | 7/2014 |
| WO | WO-2014129305 A1 | 8/2014 |
| WO | WO-2014139003 A1 | 9/2014 |
| WO | WO-2014192007 A1 | 12/2014 |
| WO | WO-2015009602 A1 | 1/2015 |
| WO | WO-2015015493 A2 | 2/2015 |
| WO | WO-2015015493 A3 | 3/2015 |
| WO | WO-2015038372 A1 | 3/2015 |
| WO | WO-2015042617 A1 | 3/2015 |
| WO | WO-2015058166 A2 | 4/2015 |
| WO | WO-2015058166 A3 | 6/2015 |
| WO | WO-2015101992 A2 | 7/2015 |
| WO | WO-2015101992 A3 | 9/2015 |
| WO | WO-2015138028 A2 | 9/2015 |
| WO | WO-2015138028 A3 | 11/2015 |
| WO | WO-2016022283 A1 | 2/2016 |
| WO | WO-2016033224 A1 | 3/2016 |
| WO | WO-2016059946 A1 | 4/2016 |
| WO | WO-2016063284 A1 | 4/2016 |
| WO | WO-2016124659 A1 | 8/2016 |
| WO | WO-2016125164 A2 | 8/2016 |
| WO | WO-2016125165 A2 | 8/2016 |
| WO | WO-2016162865 A1 | 10/2016 |
| WO | WO-2016196727 A2 | 12/2016 |
| WO | WO-2016196727 A3 | 1/2017 |
| WO | WO-2017051424 A1 | 3/2017 |
| WO | WO-2018015951 A1 | 1/2018 |
| WO | WO-2020075036 A1 | 4/2020 |
| WO | WO-2020120296 A1 * | 6/2020 ........... G01J 3/0202 |

OTHER PUBLICATIONS

Zerlaut, "Multiple-integrating sphere spectrophotometer for measuring absolute spectral reflectance and transmittance", 1981 (Year: 1981).*

J. G. Symons, "Integrating sphere for solar transmittance measurement of planar and nonplanar samples", 1982 (Year: 1982).*

V.M. Salazar, "Discussion of the Role of Fuel-Oil Diffusion in the Hydrocarbon Emissions from a Small Engine", SAE International, 2009 (Year: 2009).*

Newport, "Infrared light source Kits", https://www.newport.com/f/ir-light-source-kits, Oct. 17, 2017 (Year: 2017).*

Acktar Advanced Coatings Website. Accessed Jun. 3, 2015. http://www.acktar.com/.

Anoplate Website. Accessed Jun. 3, 2015. http://www.anoplate.com/capabilities/anoblack_ni.html.

Avian Technologies Website. Accessed Jun. 3, 2015. http://www.aviantechnologies.com/products/coatings/diffuse_black.php.

Co-pending U.S. Appl. No. 15/479,105, inventors Weissman; Liron Nunez et al., filed on Apr. 4, 2017.

Co-pending U.S. Appl. No. 15/667,360, inventor Goldring; Damian, filed on Aug. 2, 2017.

Co-pending U.S. Appl. No. 15/713,198, inventors Carmi; Assaf et al., filed on Sep. 22, 2017.

Co-pending U.S. Appl. No. 15/858,340, inventors Weissman; Liron Nunez et al., filed on Dec. 29, 2017.

Co-pending U.S. Appl. No. 15/867,245, inventors Rosen; Sagee et al., filed on Jan. 10, 2018.

Co-pending U.S. Appl. No. 15/905,578, inventors Goldring; Damian et al., filed on Feb. 26, 2018.

Co-pending U.S. Appl. No. 16/232,959, inventors Rosensagee et al., filed on Dec. 26, 2018.

Co-pending U.S. Appl. No. 16/437,826, inventors Goldringdamian et al., filed on Jun. 11, 2019.

European search report and search opinion dated Feb. 7, 2017 for EP Application No. 14831451.1.

European search report and search opinion dated Jul. 24, 2015 for EP Application No. 12845773.6.

European search report and search opinion dated Aug. 7, 2017 for EP Application No. 15733267.7.

"Extended European Search Report and Search Opinion dated Dec. 13, 2017 for European Patent Application No. EP15733267.7".

"Interference Filter Handbook," published by JDS Uniphase (Second Edition), Sep. 2006, p. 195-202 and 213-214.

International search report and written opinion dated Jan. 26, 2015 for PCT Application No. IL2014/050688.

International search report and written opinion dated Mar. 22, 2013 for PCT Application No. IL2012/000367.

International search report and written opinion dated Jul. 14, 2015 for PCT Application No. PCT/IL2015/050002.

PCT/IB2019/058513 International Search Report and Written Opinion dated Jan. 9, 2020.

* cited by examiner

ACCESSORIES FOR OPTICAL SPECTROMETERS

CROSS-REFERENCE

This application is a continuation application of International Patent Application No. PCT/IB2019/058513, filed Oct. 7, 2019, which claims the benefit of U.S. provisional application No. 62/742,702, entitled "ACCESSORIES FOR OPTICAL SPECTROMETERS," filed Oct. 8, 2018, each of which is incorporated herein by reference in its entirety.

BACKGROUND

Spectrometers, such as optical spectrometers, can be used to analyze one or more properties of an object. Optical spectrometers can detect electromagnetic radiation from an object to obtain spectral information of the object. The spectral information can be processed to provide information, such as chemical composition information, about the object. Optical spectrometers can typically include some type of spectrally selective element to separate wavelengths of radiation received from the object, and a first-stage optic, such as a lens, to focus and/or concentrate the radiation onto an imaging array.

SUMMARY

Samples that are examined with spectrometers (such as near-infrared (NIR) spectrometers) may often have high reflectivity or poor chemical signals that manifest as poor contrast in a spectral parameter (such as an absorption coefficient). For example, in a reflectance spectral measurement, an average reflectivity may be about 95% with a variation of about 1%. Recognized herein are apparatus, systems, and methods that can improve the contrast of the chemical signal, such as by increasing the optical path length of the illumination light within the tested material before it is being detected by the spectrometer.

In an example, a common method to achieve increased optical path length is to use transmission spectrometry, where the illumination light is directed through a relatively thick layer of the tested material before detection, or directed through multiple reflections from the surface of the particles before reaching the sensor. However, such a method may be problematic for an opaque sample. In such a sample, a significant portion of the illumination light may be lost, necessitating an intense and power-consuming light source, a large detector, or a long sampling time in order to achieve sufficiently high signal-to-noise ratio. Such a high-power light source may be too large or too expensive for many applications, such as for use in portable spectrometers, or may require an unacceptably long amount of time to achieve stable operation. Such disadvantages may be overcome using the apparatus, systems, and methods of the present disclosure.

Disclosed herein are accessories for improving sensitivity or efficiency of optical spectrometers and methods for utilizing such accessories. Further disclosed herein are systems of the accessories, light sources, and/or optical spectrometers, and their methods of use. The accessories may be characterized in that they allow illumination light to typically interact multiple times with the sample before being detected by a spectrometer, thereby increasing an effective optical path length relative to the optical path of a single reflection from the sample. A minimal amount of light may escape the accessories without contributing to the chemical signal. Instead, photons may be either detected by the spectrometer or absorbed by the sample due to the characteristic spectral response of the chemical bonds in the sample. Beneficially, a large amount of the sample may contribute to the detected signal, as may be desirable when measuring samples with small-scale variations in material characteristics. Measurement conditions may be highly repeatable. For instance, the accessories may provide a fixed distance from the sample to the spectrometer and light source and promote a consistent exposed area and volume of the sample. Furthermore, homogeneity of the illumination light within the sample and the reception of reflected light may allow optimal averaging of local variations within the sample.

In an aspect, an accessory for improving sensitivity or efficiency of an optical spectrometer may comprise: an outer surface; and an inner surface, wherein said outer surface or said inner surface or both are in optical communication with a sample, and wherein said inner surface is configured to partially or completely enclose a light source and said optical spectrometer and to direct light emitted by said light source to achieve at least two optical interactions with said sample before being received by said optical spectrometer. Said outer surface or said inner surface may be spherical. Said outer surface or said inner surface may be hemispherical. Said outer surface or said inner surface may be cylindrical. Said outer surface or said inner surface may be tubular. Said outer surface or said inner surface may comprise one or more angles. Said outer surface or said inner surface may be transparent. Said outer surface or said inner surface may be translucent. Said outer surface or said inner surface may have a reflectivity greater than 90% over a range of wavelengths of light detected by said optical spectrometer. Said outer surface or said inner surface may comprise an anti-reflective material. Said anti-reflective material may have a reflectivity less than 10% over a range of wavelengths of light emitted by said light source. Both said outer surface and said inner surface may comprise anti-reflective materials. Said outer surface or said inner surface may comprise a diffuse reflective material. Said diffuse reflective material may comprise a diffuse white reflector. Said diffuse reflective material may be substantially flat. Said diffuse reflective material may be outside a direct field of view of said light source or said optical spectrometer. Said outer surface may be in physical contact with said sample. Both said outer surface and said inner surface may be in optical communication with said sample. Said light source may be configured to emit light within a light cone having a half-angle of at least 60 degrees. Said light source may be configured to emit light within a light cone having a half-angle of at most 60 degrees. Said light source may have a bandwidth of at least 10 nanometers (nm). Said spectrometer may be configured to detect light within a light cone having a half-angle of at least 60 degrees. Said spectrometer may be configured to detect light within a light cone having a half-angle of at most 60 degrees. Said spectrometer may have a bandwidth of at least 10 nm. Said at least two optical interactions may increase a contrast of an optical spectrum obtained by said spectrometer by a factor of at least 2 as compared to a contrast of an optical spectrum obtained by a spectrometer in the absence of said accessory. Said inner surface may be configured to direct said light emitted by said light source to achieve at least four optical interactions with said sample before being received by said optical spectrometer. Said inner surface may define a cavity having a closing plane, wherein said closing plane comprises a closing plane material having reflectivity greater than 90%. Said closing plane material may have a reflectivity greater than 99%. Said closing plane material may be selected from a mirror or a diffuse white material. Said closing plane may comprise a dynamically adjustable reflective surface. Said dynamically adjustable reflective surface may comprise a plurality of reflective surfaces, wherein a reflective surface of the plurality of reflective surfaces may be substantially planar with said closing plane. Said dynamically adjustable reflective surface may be configured to rotate about an axis such that any one of said plurality of reflective surfaces may be substantially planar with said closing plane. Said closing plane may comprise a prism. Said closing plane may comprise an aperture. Said aperture may be sized for placement of said optical spectrometer. Said aperture may be sized for placement of said light source. Said closing plane may comprise a plurality of apertures. Said inner surface may comprise an aperture. Said aperture may be sized for placement of said optical spectrometer. Said aperture may be sized for placement of said light source. Said inner surface may comprise a plurality of apertures. Said accessory may be configured to enclose said optical spectrometer having a first area and be in optical communication with said sample having a second area, wherein a ratio of said second area to said first area is greater than 10.

In another aspect, a system for improving an optical spectrum may comprise: an optical spectrometer; a light source; and an encasement, comprise: an outer surface; an inner surface defining a cavity and partially or completely enclosing said light source and said optical spectrometer in said cavity, wherein said outer surface or said inner surface or both are in optical communication with a sample; and a closing plane defined by said cavity, wherein said encasement is disposed relative to each of said optical spectrometer and said light source such that light emitted by said light source achieves at least two optical interactions with said sample before being received by said optical spectrometer. Said outer surface or said inner surface may be spherical. Said outer surface or said inner surface may be hemispherical. Said outer surface or said inner surface may be cylindrical. Said outer surface or said inner surface may be tubular. Said outer surface or said inner surface may comprise one or more angles. Said outer surface or said inner surface may be transparent. Said outer surface or said inner surface may be translucent. Said outer surface or said inner surface may have a reflectivity greater than 90% over a range of wavelengths of light detected by said optical spectrometer. Said outer surface or said inner surface may comprise an anti-reflective material. Said anti-reflective material may have a reflectivity less than 10% over a range of wavelengths of light emitted by said light source. Both said outer surface and said inner surface may comprise anti-reflective materials. Said outer surface or said inner surface may comprise a diffuse reflective material. Said diffuse reflective material may comprise a diffuse white reflector. Said diffuse reflective material may be substantially flat. Said diffuse reflective material may be outside a direct field of view of said light source or said optical spectrometer. Said outer surface may be in physical contact with said sample. Both said outer surface and said inner surface may be in optical communication with said sample. Said light source may be configured to emit light within a light cone having a half-angle of at least 60 degrees. Said light source may be configured to emit light within a light cone having a half-angle of at most 60 degrees. Said light source may have a bandwidth of at least 10 nanometers (nm). Said spectrometer may be configured to detect light within a light cone having a half-angle of at least 60 degrees. Said spectrometer may be configured to detect light within a light cone having a half-angle of at most 60 degrees. Said spectrometer may have a bandwidth of at least 10 nm. Said at least two optical interactions may increase a contrast of an optical spectrum obtained by said spectrometer by a factor of at least 2 as compared to a contrast of an optical spectrum obtained by a spectrometer in the absence of said accessory. Said encasement may be disposed relative to each of said optical spectrometer and said light source such that light emitted by said light source achieves at least four optical interactions with said sample before being received by said optical spectrometer. Said closing plane may comprise a closing plane material having a reflectivity greater than 90%. Said closing plane material may have a reflectivity greater than 99%. Said closing plane material may be selected from a mirror or a diffuse white material. Said closing plane may comprise a dynamically adjustable reflective surface. Said dynamically adjustable reflective surface may comprise a plurality of reflective surfaces, wherein a reflective surface of the plurality of reflective surfaces may be substantially planar with said closing plane. Said dynamically adjustable reflective surface may be configured to rotate about an axis such that any one of said plurality of reflective surfaces may be substantially planar with said closing plane. Said closing plane may comprise a prism. Said closing plane may comprise an aperture. Said optical spectrometer may be disposed at said aperture. Said light source may be disposed at said aperture. Said closing plane may comprise a plurality of apertures. Said inner surface may comprise an aperture. Said optical spectrometer may be disposed at said aperture. Said light source may be disposed at said aperture. Said inner surface may comprise a plurality of apertures. Said sample may be solid. Said sample may be liquid. Said cavity may be placed in a measurement volume filled by said sample. Said measurement volume of said sample may be disposed below said closing plane. Said measurement volume of said sample may be disposed above said closing plane. Said measurement volume of said sample may be partially or completely enclosed by said encasement. The system may further comprise an external light source and external optical sensor configured to image said encasement during activation of said light source.

In another aspect a method for improving sensitivity or efficiency of an optical spectrometer may comprise: (a) providing a light source and an optical spectrometer in proximity to a sample; (b) partially or completely enclosing said light source and said optical spectrometer in an accessory, said accessory comprising: (i) an outer surface; and (ii) an inner surface configured to partially or completely enclose said light source and said optical spectrometer, wherein said outer surface or said inner surface or both are in optical communication with a sample, and wherein said inner surface is configured to direct light emitted by said light source to optically interact with said sample at least twice before being received by said optical spectrometer; and (c) activating said light source and said optical spectrometer. The method may further comprise calibrating said accessory, said calibrating comprising, providing said light source and said optical spectrometer in proximity to a reference sample, partially or completely enclosing said light source and said optical spectrometer in said accessory, and activating said light source and said optical spectrometer to generate reference data. The method may further comprise, subsequent to (c), generating sample data and processing said sample data with said reference data to calibrate said sample data. Said reference sample may comprise a polytetrafluoroethylene (PTFE) sample. The method may further comprise calibrating said accessory, said calibrating comprising, providing a reference accessory comprising reference sample material, partially or completely enclosing said light source and said optical spectrometer in said reference accessory, and activating said light source and said optical spectrometer to generate reference data. The method may further comprise, subsequent to (c), generating sample data and processing said sample data with said reference data to calibrate said sample data. Said reference sample material may comprise a polytetrafluoroethylene (PTFE) material. The method may further comprise, subsequent to (c), generating sample data, measuring sample temperature to generate sample temperature data, and processing said sample data with said sample temperature data to compensate for temperature-related spectrum variations.

Additional aspects and advantages of the present disclosure will become readily apparent to those skilled in this art from the following detailed description, wherein only exemplary embodiments of the present disclosure are shown and described, simply by way of illustration of the best mode contemplated for carrying out the present disclosure. As will be realized, the present disclosure is capable of other and different embodiments, and its several details are capable of modifications in various obvious respects, all without departing from the disclosure. Accordingly, the drawings and description are to be regarded as illustrative in nature, and not as restrictive.

INCORPORATION BY REFERENCE

All publications, patents, and patent applications mentioned in this specification are herein incorporated by reference to the same extent as if each individual publication, patent, or patent application was specifically and individually indicated to be incorporated by reference.

BRIEF DESCRIPTION OF THE DRAWINGS

A better understanding of the features and advantages of the present invention will be obtained by reference to the following detailed description that sets forth illustrative embodiments, in which the principles of the disclosure are utilized, and the accompanying drawings of which.

DETAILED DESCRIPTION

In the following description, various aspects of the invention will be described. For the purposes of explanation, specific details are set forth in order to provide a thorough understanding of the invention. It will be apparent to one skilled in the art that there are other embodiments of the present disclosure that differ in details without affecting the essential nature thereof. Therefore, the present disclosure is not limited by that which is illustrated in the figure and described in the specification, but only as indicated in the accompanying claims, with the proper scope determined only by the broadest interpretation of said claims.

Various embodiments of the present disclosure will be described in detail below with reference to the accompanying drawings. It will be understood that many variations, alterations and adaptations based on the disclosure provided herein may be possible. For example, the order of the operations of one or more of the processes described herein can be changed, some of the operations removed, some of the operations duplicated, and additional operations added as appropriate. Some of the operations can be performed in succession. Some of the operations can be performed in parallel. Some of the operations can be performed once.

Some of the operations can be performed more than once. Some of the operations can comprise sub-operations. The processor as described herein can comprise one or more instructions to perform at least a portion of one or more operations of one or more of the methods.

Figure 1A:
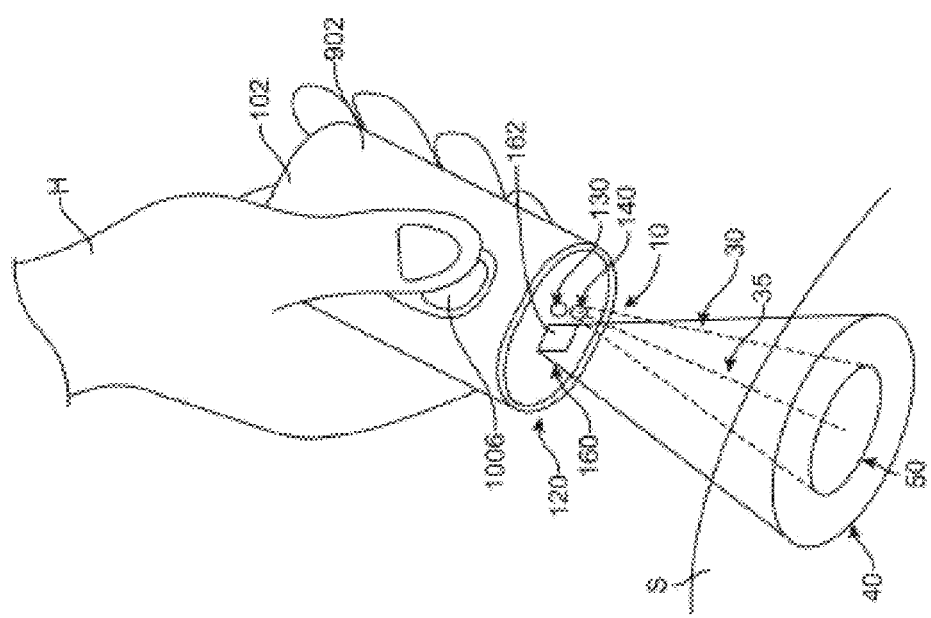
FIG. 1A and FIG. 1B show isometric views of an exemplary compact spectrometer, in accordance with the embodiments of the present disclosure.
Figure 1B:
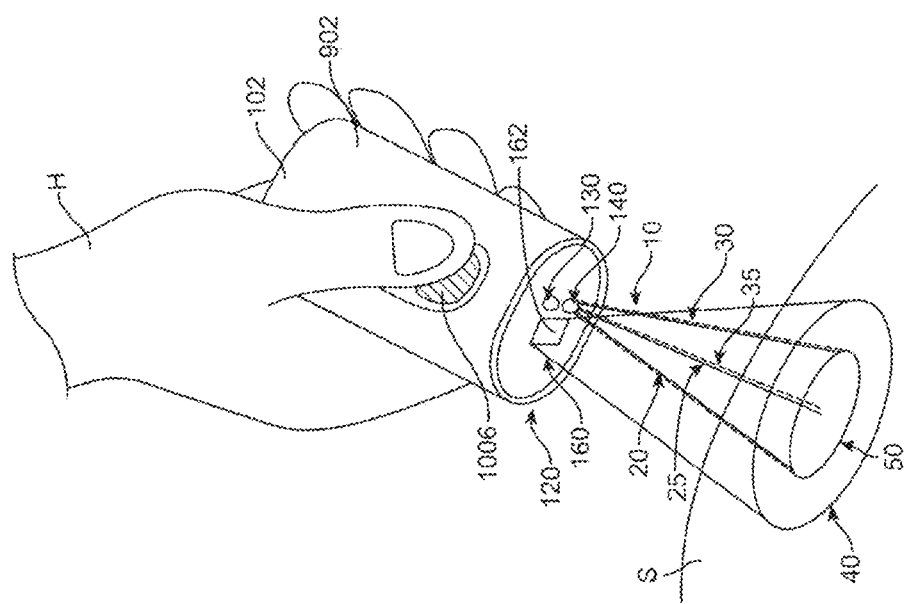

FIG. 1A and FIG. 1B show an isometric view of a compact or handheld optical spectrometer 102, in accordance with the embodiments of the present disclosure. The spectrometer 102 can be used as a general purpose material analyzer for many applications, as described in further detail herein. In particular, the spectrometer 102 can be used to identify materials or objects, provide information regarding certain properties of the identified materials, and accordingly provide users with actionable insights regarding the identified materials. The spectrometer 102 may comprise a spectrometer head 120 configured to be directed towards a sample material S, such as a sample of an object as discussed herein. The spectrometer head 120 may comprise a sensor module 130, which may, for example, comprise a temperature sensor. The spectrometer head 120 may also comprise an illumination module 140 configured to illuminate a sample with light. Additionally, the spectrometer head 120 may comprise a spectrometer module 160, which may be sealed by a spectrometer window 162 (e.g., an IR-pass filter) and comprise a detector or sensor configured to measure the spectra of the sample material within a field of view 40 of the detector or sensor, thereby obtaining spectral information associated with the sample material S. As illustrated, the spectrometer module 160, illumination module 140 and sensor module 130 may be housed by a container 902, which may be capable of supporting user input via control means. The control means, such as an operating button 1006, may be configured for users to control the operation of the spectrometer. The compact size of the spectrometer 102 can provide a mobile device that can be directed (e.g., pointed) at a material to rapidly obtain information about the material. For example, as shown in FIG. 1A and FIG. 1B, the spectrometer 102 may be sized to fit inside a single hand H of a user.

The detector as discussed above may be configured to have a wide field of view. The illumination module may comprise a light source configured to direct an optical beam 10 to the sample material S within the field of view 40. The light source may be configured to emit electromagnetic energy, which may include but is not limited to one or more of ultraviolet, visible, near infrared, or infrared light energy. The light source may comprise one or more component light sources. The field of view 40 can define the portion of the sample material S from which the spectral data is collected by the spectrometer 102. The illumination module may further comprise one or more optics coupled to the light source to direct the optical beam 10 toward the sample material S. The one or more optics may comprise one or more of a mirror, a beam splitter, a lens, a curved reflector, or a parabolic reflector, as described in further detail herein. The spectrometer 102 may further comprise circuitry coupled to the detector and the light source, wherein the circuitry is configured to transmit the optical beam 10 in response to user interactions with the user input using hand H holding the spectrometer. When a user initiates a measurement of a sample material S using the spectrometer 102, for example by pressing the operating button 1006 with the hand H, the spectrometer emits an optical beam 10 toward the sample material within the field of view 40. When the optical beam 10 hits the sample material S, the light may be partially absorbed and/or partially reflected by the sample material. Alternatively or in combination, optical beam 10 may cause the sample material to emit light in response. The sample emission, which may comprise at least a portion of the optical beam 10 reflected back by the sample and/or light emitted by the sample in response to the optical beam 10, is sensed by the detector or sensor of the spectrometer module 160. The spectrometer module 160 may consequently generate the spectral data of the sample material as described in further detail herein.

The spectrometer 102 may be configured to begin measurement of a sample material S with just ambient light, without the optical beam 10. Subsequent to completing the measurement with ambient light only, the illumination module 140 of the spectrometer 102 can generate the optical beam 10, and the spectrometer module 160 can begin measurement of the sample material with the optical beam 10. In this case, there may be a brief time lapse between the initiation of a measurement, for example by a user pressing the operating button 1006, and the generation of the optical beam 10 and the visible portions thereof. The ambient light-only measurement can be used to reduce or eliminate the contribution of ambient light in the spectral data of the sample material S. For example, the measurement made with ambient light only can be subtracted from the measurement made with the optical beam 10.

A portion of the optical beam 10 that is reflected from the sample material S may be visible to the user; this visible, reflected portion of optical beam 10 may define the measurement area 50 of the sample material S. The measurement area 50 of the sample may at least partially overlap with and fall within the field of view 40 of the detector of the spectrometer. The area covered by the field of view 40 may be larger than the visible area of the sample illuminated by the optical beam 10, or the measurement area 50 defined by the visible portion of the optical beam 10. Alternatively, the field of view may be smaller than the optical beam, for example. In many configurations, the field of view 40 of the detector of the spectrometer module is larger than the area illuminated by the optical beam 10, and hence the measurement area 50 is defined by the optical beam 10 rather than by the field of view 40 of the detector.

The visible portion of optical beam 10 may comprise one or more wavelengths corresponding to one or more colors visible to the user. For example, the visible portion of optical beam 10 may comprise one or more wavelengths corresponding to the colors, such as red, orange, yellow, blue, green, indigo, violet, or a combination thereof. The visible portion of optical beam 10 reflected from the sample material S may comprise at least 0.1%, at least 0.2%, at least 0.3%, at least 0.4%, at least 0.5%, at least 0.6%, at least 0.7%, at least 0.7%, at least 0.8%, at least 0.9%, at least 1%, at least 2%, at least 3%, at least 4%, at least 5%, at least 6%, at least 7%, at least 8%, at least 9%, at least 10%, or more of the power of optical beam 10. The visible portion of optical beam 10 reflected from the sample material S may comprise at most 10%, at most 9%, at most 8%, at most 7%, at most 6%, at most 5%, at most 4%, at most 3%, at most 2%, at most 1%, at most 0.9%, at most 0.8%, at most 0.7%, at most 0.6%, at most 0.5%, at most 0.4%, at most 0.3%, at most 0.2%, at most 0.1%, or less of the power of optical beam 10. The visible portion of optical beam 10 reflected from the sample material S may comprise a percentage of the power of optical beam 10 that is within a range defined by any two of the preceding values. For instance, the visible portion of optical beam 10 reflected from the sample material S may comprise about 0.1% to about 10%, about 1% to about 4%, or about 2% to about 3% of the power of optical beam 10.

The visible portion of optical beam 10 may comprise light operating with a power of at least 0.1 milliwatts (mW), at least 0.2 mW, at least 0.3 mW, at least 0.4 mW, at least 0.5 mW, at least 0.6 mW, at least 0.7 mW, at least 0.8 mW, at least 0.9 mW, at least 1 mW, at least 2 mW, at least 3 mW, at least 4 mW, at least 5 mW, at least 6 mW, at least 7 mW, at least 8 mW, at least 9 mW, at least 10 mW, at least 20 mW, at least 30 mW, at least 40 mW, at least 50 mW, at least 60 mW, at least 70 mW, at least 80 mW, at least 90 mW, at least 100 mW, at least 200 mW, at least 300 mW, at least 400 mW, at least 500 mW, at least 600 mW, at least 700 mW, at least 800 mW, at least 900 mW, at least 1 W, at least 2 W, at least 3 W, at least 4 W, at least 5 W, at least 6 W, at least 7 W, at least 8 W, at least 9 W, at least 10 W, or more. The visible portion of optical beam 10 may comprise light operating with a power of at most 10 W, at most 9 W, at most 8 W, at most 7 W, at most 6 W, at most 5 W, at most 4 W, at most 3 W, at most 2 W, at most 1 W, at most 900 mW, at most 800 mW, at most 700 mW, at most 600 mW, at most 500 mW, at most 400 mW, at most 300 mW, at most 200 mW, at most 100 mW, at most 90 mW, at most 80 mW, at most 70 mW, at most 60 mW, at most 50 mW, at most 40 mW, at most 30 mW, at most 20 mW, at most 10 mW, at most 9 mW, at most 8 mW, at most 7 mW, at most 6 mW, at most 5 mW, at most 4 mW, at most 3 mW, at most 2 mW, at most 1 mW, at most 0.9 mW, at most 0.8 mW, at most 0.7 mW, at most 0.6 mW, at most 0.5 mW, at most 0.4 mW, at most 0.3 mW, at most 0.2 mW, at most 0.1 mW, or less, The visible portion of optical beam may comprise light operating with a power that is within a range defined by any two of the preceding values. For instance, the visible portion of optical beam 10 may comprise light operating with power in a range from about 0.1 mW to about 100 mW, about 1 mW to about 75 mW, about 1 mW to about 50 mW, about 5 mW to about 40 mW, about 5 mW to about 30 mW, about 5 mW to about 20 mW, or about 10 mW to about 15 mW. The visible portion of optical beam 10 incident on the sample may have an intensity in a range from about 0.1 mW to about 100 mW, about 1 mW to about 75 mW, about 1 mW to about 50 mW, about 5 mW to about 40 mW, about 5 mW to about 30 mW, about 5 mW to about 20 mW, or about 10 mW to about 15 mW. The visible portion of optical beam 10 incident on the sample may have an intensity or total light output in a range from about 0.001 lumens to about 10 lumens, about 0.001 lumens to about 5 lumens, about 0.005 lumens to about 10 lumens, about 0.01 lumens to about 10 lumens, about 0.005 lumens to about 5 lumens, about 0.05 lumens to about 5 lumens, about 0.1 lumens to about 5 lumens, about 0.2 lumens to about 1 lumens, or about 0.5 lumens to about 5 lumens.

The optical beam 10 incident on the sample S may have an area of about 0.5 to about 2 $cm^2$, or about 1 $cm^2$. Accordingly, the optical beam 10 incident on the sample S may have an irradiance within a range from about 0.1 $mW/cm^2$ to about 100 $mW/cm^2$, about 1 $mW/cm^2$ to about 75 $mW/cm^2$, about 1 $mW/cm^2$ to about 50 $mW/cm^2$, about 5 $mW/cm^2$ to about 40 $mW/cm^2$, about 5 $mW/cm^2$ to about 30 $mW/cm^2$, about 5 $mW/cm^2$ to about 20 $mW/cm^2$, or about 10 $mW/cm^2$ to about 15 $mW/cm^2$. The optical beam 10 incident on the sample S may have an illuminance ($E_v$) within a range from about 20 lux (lumens/$m^2$) to about 100,000 lux, about 200 lux to about 75,000 lux, about 400 lux to about 50,000 lux, about 2,000 lux to about 25,000 lux, about 2,000 lux to about 15,000 lux, about 4,000 lux to about 15,000 lux, or about 4,000 lux to about 6,000 lux.

The light output of the visible portion of optical beam 10 may vary depending on the type of light source. In some cases, the visible light output of optical beam 10 may vary due to the different luminous efficacies of different types of light source.

The light output of the visible portion of optical beam 10 may also vary due to the nature of interactions between the different components of a light source.

A portion of the optical beam 10 that is reflected from the sample material S may be invisible to the user. The invisible portion of optical beam 10 may comprise one or more infrared wavelengths. For example, the invisible portion of optical beam 10 may comprise one or more wavelengths in range from about 700 nanometers (nm) to about 1 millimeter (mm). The invisible portion of optical beam 10 reflected from the sample material S may comprise at least 90%, at least 91%, at least 92%, at least 93%, at least 94%, at least 95%, at least 96%, at least 97%, at least 98%, at least 99%, at least 99.1%, at least 99.2%, at least 99.3%, at least 99.4%, at least 99.5%, at least 99.6%, at least 99.7%, at least 99.8%, at least 99.9%, or more of the power of optical beam 10. The invisible portion of optical beam 10 reflected from the sample material S may comprise at most 99.9%, at most 99.8%, at most 99.7%, at most 99.6%, at most 99.5%, at most 99.4%, at most 99.3%, at most 99.2%, at most 99.1%, at most 99%, at most 98%, at most 97%, at most 96% at most 95%, at most 94%, at most 93%, at most 92%, at most 91%, at most 90%, or less of the power of optical beam 10. The invisible portion of optical beam 10 reflected from the sample material S may comprise a percentage of the power of optical beam 10 that is within a range defined by any two of the preceding values.

The invisible portion of optical beam 10 may comprise light operating with a power of at least 0.1 mW, at least 0.2 mW, at least 0.3 mW, at least 0.4 mW, at least 0.5 mW, at least 0.6 mW, at least 0.7 mW, at least 0.8 mW, at least 0.9 mW, at least 1 mW, at least 2 mW, at least 3 mW, at least 4 mW, at least 5 mW, at least 6 mW, at least 7 mW, at least 8 mW, at least 9 mW, at least 10 mW, at least 20 mW, at least 30 mW, at least 40 mW, at least 50 mW, at least 60 mW, at least 70 mW, at least 80 mW, at least 90 mW, at least 100 mW, at least 200 mW, at least 300 mW, at least 400 mW, at least 500 mW, at least 600 mW, at least 700 mW, at least 800 mW, at least 900 mW, at least 1 W, at least 2 W, at least 3 W, at least 4 W, at least 5 W, at least 6 W, at least 7 W, at least 8 W, at least 9 W, at least 10 W, or more. The invisible portion of optical beam 10 may comprise light operating with a power of at most 10 W, at most 9 W, at most 8 W, at most 7 W, at most 6 W, at most 5 W, at most 4 W, at most 3 W, at most 2 W, at most 1 W, at most 900 mW, at most 800 mW, at most 700 mW, at most 600 mW, at most 500 mW, at most 400 mW, at most 300 mW, at most 200 mW, at most 100 mW, at most 90 mW, at most 80 mW, at most 70 mW, at most 60 mW, at most 50 mW, at most 40 mW, at most 30 mW, at most 20 mW, at most 10 mW, at most 9 mW, at most 8 mW, at most 7 mW, at most 6 mW, at most 5 mW, at most 4 mW, at most 3 mW, at most 2 mW, at most 1 mW, at most 0.9 mW, at most 0.8 mW, at most 0.7 mW, at most 0.6 mW, at most 0.5 mW, at most 0.4 mW, at most 0.3 mW, at most 0.2 mW, at most 0.1 mW, or less, The invisible portion of optical beam may comprise light operating with a power that is within a range defined by any two of the preceding values. For instance, the invisible portion of optical beam 10 may comprise light operating with power in a range from about 0.1 mW to about 100 mW, about 1 mW to about 75 mW, about 1 mW to about 50 mW, about 5 mW to about 40 mW, about 5 mW to about 30 mW, about 5 mW to about 20 mW, or about 10 mW to about 15 mW. The invisible portion of optical beam 10 incident on the sample may have an intensity in a range from about 0.1 mW to about 100 mW, about 1 mW to about 75 mW, about 1 mW to about 50 mW, about 5 mW to about 40 mW, about 5 mW to about 30 mW, about 5 mW to about 20 mW, or about 10 mW to about 15 mW. The invisible portion of optical beam 10 incident on the sample may have an intensity or total light output in a range from about 0.001 lumens to about 10 lumens, about 0.001 lumens to about 5 lumens, about 0.005 lumens to about 10 lumens, about 0.01 lumens to about 10 lumens, about 0.005 lumens to about 5 lumens, about 0.05 lumens to about 5 lumens, about 0.1 lumens to about 5 lumens, about 0.2 lumens to about 1 lumens, or about 0.5 lumens to about 5 lumens.

The light output of the invisible portion of optical beam 10 may vary depending on the type of light source. In some cases, the invisible light output of optical beam 10 may vary due to the different luminous efficacies of different types of light source.

The light output of the invisible portion of optical beam 10 may also vary due to the nature of interactions between the different components of a light source.

The optical beam 10 may comprise a visible aiming beam 20 as illustrated in FIG. 1B. The aiming beam 20 may comprise one or more wavelengths corresponding to one or more colors visible to the user, such as red, orange, yellow, blue, green, indigo, or violet. Alternatively or in combination, the optical beam 10 may comprise a measurement beam 30, configured to measure the spectra of the sample material. The measurement beam 30 may be visible, such that the measurement beam 30 comprises and functions as a visible aiming beam. The optical beam 10 may comprise a visible measurement beam 30 that comprises a visible aiming beam. The measurement beam 30 may comprise light in the visible spectrum, non-visible spectrum, or a combination thereof. The aiming beam 20 and the measurement beam 30 may be produced by the same light source or by different light sources within the illumination module 140, and can be arranged to illuminate the sample material S within the field of view 40 of the detector or sensor of the spectrometer 102. The visible aiming beam 20 and the optical beam 30 may be partially or completely overlapping, aligned, and/or coaxial.

The visible aiming beam 20 may comprise light in the visible spectrum, for example in a range from about 390 nm to about 800 nm, which the user can see reflected on a portion of the sample material S. The aiming beam 20 can provide basic visual verification that the spectrometer 102 is operational, and can provide visual indication to the user that a measurement is in progress. The aiming beam 20 can help the user visualize the area of the sample material being measured, and thereby provide the user with guidance in adjusting the position and/or angle of the spectrometer 102 to position the measurement area over the desired area of the sample material S. The aiming beam 20 may be configured with circuitry to be emitted throughout the duration of a measurement, and automatically turn off when the measurement of the sample material S is complete; in this case, the aiming beam 20 can also provide visual indication to the user of how long the user should hold the spectrometer 102 pointed at the sample material S.

The visible aiming beam 20 and the measurement beam 30 may be produced by the same light source, wherein the visible aiming beam 20 comprises a portion of the measurement beam 30. Additionally or alternatively, the aiming beam 20 may be produced by a first light source, and the measurement beam 30 may be produced by a second light source. For example, the measurement beam 30 may comprise an infrared beam and the aiming beam 20 may comprise a visible light beam.

The measurement beam 30 may be configured to illuminate the measurement area of the sample S, and the aiming beam 20 may be configured to illuminate an area of the sample overlapping with the measurement area, thereby displaying the measurement area to the user. The visible area illuminated by the visible aiming beam 20 may comprise from about 50% to about 150% or about 75% to about 125% of the measurement area, or at least about 90%, at least about 95%, or at least about 99% of the measurement area.

One or more optics of the illumination module, such as a lens or a parabolic reflector, may be arranged to receive the aiming beam 20 and the measurement beam 30 and direct the aiming beam and measurement beam toward the sample material S, with the aiming beam and measurement beam overlapping on the sample. In some configurations, the aiming beam 20 may be arranged to be directed along an aiming beam axis 25 as illustrated in FIG. 1B, while the measurement beam 30 may be arranged to be directed along a measurement beam axis 35. The aiming beam axis 25 may be co-axial with measurement beam axis 35.

The sensor or detector of the spectrometer module 160 may comprise one or more filters configured to transmit the measurement beam 30 but inhibit transmission of the aiming beam 20. In many configurations, the spectrometer module comprises one filter configured to inhibit transmission of visible light, thereby inhibiting transmission of portions of the aiming beam 20 and measurement beam 30 reflected from the sample that comprise visible light. In some configurations, the spectrometer module 160 may comprise a plurality of optical filters configured to inhibit transmission of a portion of the aiming beam 20 reflected from the sample material S, and to transmit a portion of the measurement beam 30 reflected from the sample. In configurations of the spectrometer module comprising a plurality of optical channels, the spectrometer module may comprise a plurality of filters wherein each optical filter corresponds to an optical channel. Each filter may be configured to inhibit transmission of light within a specific range and/or within a specific angle of incidence, wherein the filtered specific range or specific angle of incidence may be specific to the corresponding channel. In some configurations, each optical channel of the spectrometer module may comprise a field of view. The field of view 40 of the spectrometer module may hence comprise a plurality of overlapping fields of view of a plurality of optical channels. The aiming beam and the measurement beam may overlap with the plurality of overlapping fields of view on the sample S. In some configurations, a diffuser may be disposed between the plurality of optical filters and the incident light from the sample, wherein each optical filter corresponds to an optical channel. In such configurations, the plurality of optical channels may comprise similar fields of view, each field of view at least partially overlapping with the fields of view of other optical channels, wherein the spectrometer substantially comprises a field of view of ±1 to ±90°.

Optionally, the visible aiming beam 20 may be produced by a light source separate from the illumination module 140. In this case, the separate light source may be configured to produce the aiming beam such that the aiming beam illuminates a portion of the sample material that overlaps with the measurement area of the sample.

Figure 2:
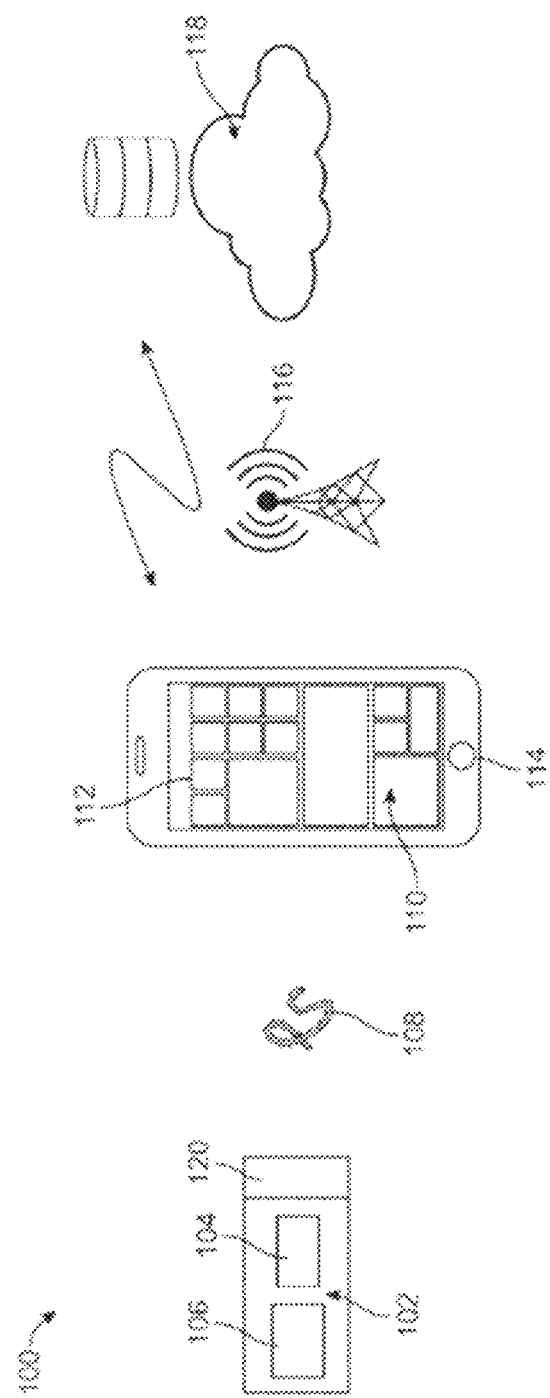
FIG. 2 is a schematic diagram of a spectrometer system 100, in accordance with embodiments of the present disclosure.

FIG. 2 shows a schematic diagram of a spectrometer system 100. In many instances, the spectrometer system 100 may comprise a handheld spectrometer 102 as described herein or elsewhere in this specification and a mobile device 110 in wireless communication 116 with a remote server or storage, such as a cloud based server or storage system 118. The handheld spectrometer 102 can acquire the data as described herein or elsewhere in this specification. The handheld spectrometer 102 may comprise a processor 106 and communication circuitry 104 coupled to the spectrometer head 120 having spectrometer components as described herein or elsewhere in this specification. The spectrometer can transmit the data to the mobile device 110 with communication circuitry 104 with a communication link, such as a wireless serial communication link, for example Bluetooth™. The mobile device can receive the data from the handheld spectrometer 102 and transmit the data to the cloud based storage system 118. The data can be processed and analyzed by the cloud based server 118, and transmitted back to the mobile device 110 to be displayed to the user. In addition, the analyzed spectral data and/or related additional analysis results may be dynamically added to a universal database operated by the cloud server 118, where the spectral data associated with sample materials may be stored. The spectral data stored on the database may comprise data generated by one or more users of the spectrometer system 100, and/or pre-loaded spectral data of materials with known spectra. The cloud based server may comprise a memory having the database stored thereon.

The spectrometer system may allow multiple users to connect to the cloud based server 118 via their mobile devices 110, as described in further detail herein. In some instances, the server 118 may be configured to simultaneously communicate with up to millions of mobile devices 110. The ability of the system to support a large number of users and devices at the same time can allow users of the system to access, in some instances in real-time, large amounts of information relating to a material of interest. Access to such information may provide users with a way of making informed decisions relating to a material of interest or differentiating among a variety of materials.

The mobile device 110 may comprise one or more components of a smart phone, such as a display 112, an interface 114, a processor, a computer readable memory and communication circuitry, such as one or more transmitters and receivers (or transceivers). The mobile device 110 may comprise a substantially stationary device when used, such as a wireless communication gateway, for example.

The processor 106 may comprise a tangible medium embodying instructions, such as a computer readable memory embodying instructions of a computer program. Alternatively or in combination, the processor may comprise logic such as gate array logic in order to perform one or more logic steps. In some cases, the handheld spectrometer 102 can be integrated with the mobile device 110. For example, the handheld spectrometer 102 can be a part of the mobile device 110. In this case, it would be convenient for the user of the mobile device 110 to collect spectral data of a material of interest and transmit the collected spectral data to the cloud based server at any time using the mobile device. Additionally or alternatively, the handheld spectrometer 102 can either be enclosed within the mobile device itself, or mounted on and connected to the mobile device by wired or wireless means for providing power and a data link. By incorporating the spectrometer system into a mobile device, the spectral data obtained with the spectrometer can be uploaded to a remote location, and analysis can be performed there. Afterwards, the user can be notified of the results of the analysis. The spectrometer system can also be equipped with a Global Position System (GPS) device and/or altimeter so that a physical location or a height of a sample being measured can be reported. Further non-limiting examples of such components may include a camera for recording the visual impression of the sample and sensors for measuring such environmental variables as temperature and humidity.

Figure 3:
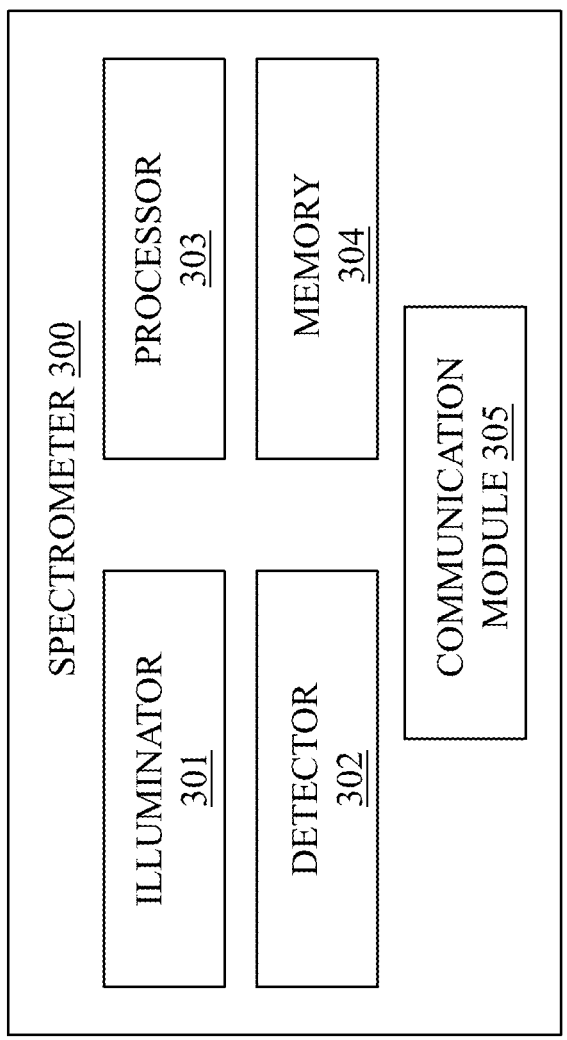
FIG. 3 is a schematic diagram of an exemplary optical spectrometer, in accordance with embodiments of the present disclosure.

FIG. 3 is a schematic diagram of an example of an optical spectrometer 300. The optical spectrometer 300 may comprise an illuminator 301, which may be configured to illuminate a sample of an object with light. In some embodiments, the illuminator may comprise an illumination window for sealing the illumination module. The illumination window can be substantially transmissive to the light produced in the illuminator. The illuminator can comprise a light source. In some embodiments, the light source can comprise one or more light emitting diodes (LED), such as a blue LED, a red LED, a green LED or an infrared LED. The illuminator 301 may further comprise a radiation diffusion unit which may be configured to receive the radiation emitted from the array of LEDs, and provide as an output illumination radiation for use in analyzing a sample material. The radiation diffusion unit may comprise a first diffuser and a second diffuser and one lens may be disposed between the first and second diffusers. The radiation diffusion unit may further comprise additional diffusers and lenses.

The optical spectrometer 300 may also comprise a detector 302 which may be configured to detect electromagnetic radiation from each of a plurality of objects. In some embodiments, the detector may comprise one or more of a spectrometer module and a sensor module (not shown). The spectrometer module, working together with the illuminator 301, can be configured to measure spectroscopic information relating to a sample material of an object. The sensor module herein can be configured to measure non-spectroscopic information relating to a sample material. For instance, the sensor module may be a temperature sensor module configured to measure and record the temperature of the sample in response to infrared radiation emitted from the sample. In some embodiments, the sensor module may further comprise a second temperature sensor module configured to measure the temperature of the light source in the illuminator. In some embodiments, the sensor module can enable an identification of the sample material based on non-spectroscopic information in addition to the spectroscopic information measured by the co-operation of the illuminator and detector. Such a dual information system may enhance the accuracy of detection or identification of the samples.

The optical spectrometer 300 may further comprise one or more of a processor 303, a memory 304, and a communication module 305. The processor herein may be configured to analyze the spectral data collected with the illuminator 301 and detector 302. The memory herein may be configured to store spectral data collected by the optical spectrometer and other data that may be useful for analyzing the spectral data. For example, the memory may be configured to temporarily or permanently store the spectral data associated with a variety of objects and computer software programs or instructions embodying various algorithms. In some embodiments, upon execution via the processor, the software instructions may analyze the spectral data associated with a plurality of objects. Alternatively or in combination, the processor may comprise a digital signal processing unit, which can be configured to compress the raw data, including raw spectral data. The compressed raw data signal can then be transmitted inside the spectrometer to the communication module, which may comprise a data encryption/transmission component such as Bluetooth™ to encrypt the data. Once encrypted, the compressed encrypted raw data can be wirelessly transmitted via Bluetooth to the mobile device 110, where the encrypted raw data can be decrypted and get prepared for further processing.

In some embodiments, the communication module 305 may comprise one or more transmitters and receivers, or one or more transceivers integrating the functionalities of the transmitter and receiver for establishing a wired or wireless connection with a mobile device and thereby performing two-way communication with the mobile device. For example, a result may be transmitted to a mobile device via the communication module and presented to the user via a graphic user interface on a display of the mobile device. Alternatively, measurements of the optical spectrometer may be transmitted directly to a mobile device or a cloud based server, or indirectly to the cloud based server via the mobile device, which acts as a relay node. The communication module herein can be configured to support a wide variety of communication techniques, including but not limited to communications via the Internet, Local Area Networks (LANs), Wide Area Networks (WANs), Bluetooth, Near Field Communication (NFC) technologies, networks based on mobile data protocols such as General Packet Radio Services (GPRS), GSM, Enhanced Data GSM Environment (EDGE), 3G, 4G, or Long Term Evolution (LTE) protocols, Infra-Red (IR) communication technologies, and/or Wi-Fi, and may be wireless, wired, or a combination thereof.

Figure 4:
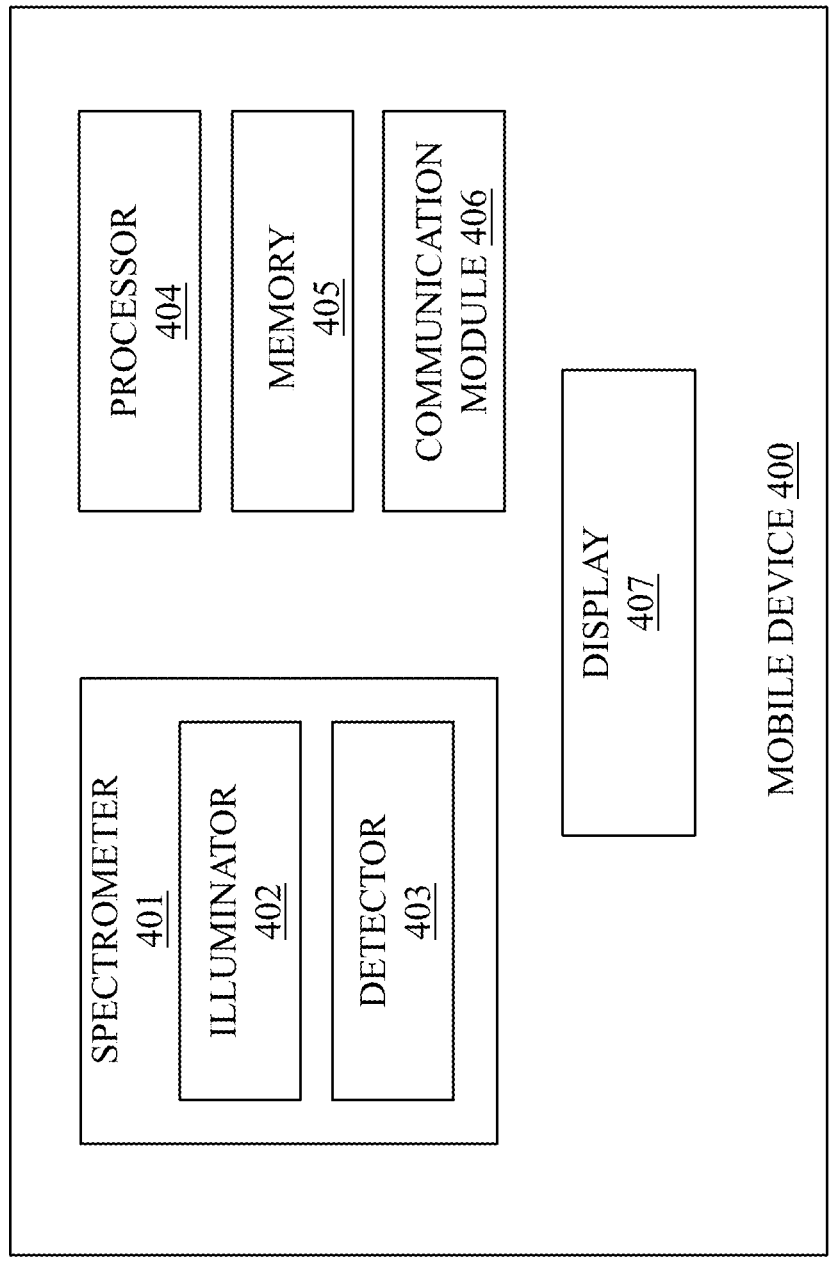
FIG. 4 is a schematic diagram of an exemplary mobile device comprising an optical spectrometer, in accordance with embodiments of the present disclosure.

FIG. 4 is a schematic diagram of an example of a mobile device 400 comprising an optical spectrometer. As mentioned above with respect to FIG. 3, an optical spectrometer can be a part of a mobile device, such as integrated into a mobile device, which is illustrated in FIG. 4. The optical spectrometer 401 as included in the mobile device may comprise an illuminator 402 and a detector 403 for carrying out steps of detecting, scanning, measuring samples of objects, and collecting corresponding spectral data for subsequent processing. It is to be understood that the illuminator and detector shown in FIG. 4 may be the same as or similar to the illuminator and detector as shown in FIG. 3. Therefore, any description of the illuminator and detector made before with reference to FIG. 3 can be equally applied to those as illustrated in FIG. 4.

Different from the optical spectrometer as shown in FIG. 3 which may be equipped with its own processor, memory, and communication module, the optical spectrometer 401 can share a processor 404, memory 405 and a communication module 406 with the mobile device 400. In other words, the processor, memory and communication module can be commonly used by both the mobile device and the spectrometer. Based on this configuration and arrangement, the mobile device comprising the optical spectrometer can be more compact and minimized and thereby mobility can be increased.

Upon obtaining the spectral data associated with the samples of the objects of interest, the optical spectrometer can transmit these data internally to the memory via data buses or channels (not shown) and the processor can extract the spectral data from the memory for further processing.

It will be appreciated that the mobile device 400 is only one example of a portable multifunction device, and that the device 400 may have more or fewer components than shown, may combine two or more components, or a may have a different configuration or arrangement of the components. The various components shown in FIG. 4 may be implemented in hardware, software or a combination of hardware and software, including one or more signal processing and/or application specific integrated circuits. For example, although not shown, the mobile device 400 may further include a peripherals interface, a RF circuitry in the communication module, audio circuitry, a speaker, a microphone, an input/output (I/O) subsystem, other input or control devices, and an external port. These components, together with those shown in FIG. 4 may communicate over one or more communication buses or signal lines within the external housing of the mobile device.

It will be understood that the optical spectrometers as described herein are for illustrative purposes. Any number of other spectrometers known in the art can be applied to the methods and apparatuses described herein, including for example spectrometers described in U.S. Publication No. 2010/0182598, U.S. Publication No. 2005/0229698, U.S. Publication No. 2015/0036138, U.S. Patent No. 2013/0308045, and U.S. Publication No. 2014/0061486, and U.S. Publication No. 2011/0310052, the entire disclosures of each of which are incorporated herein by reference.

Figure 5:
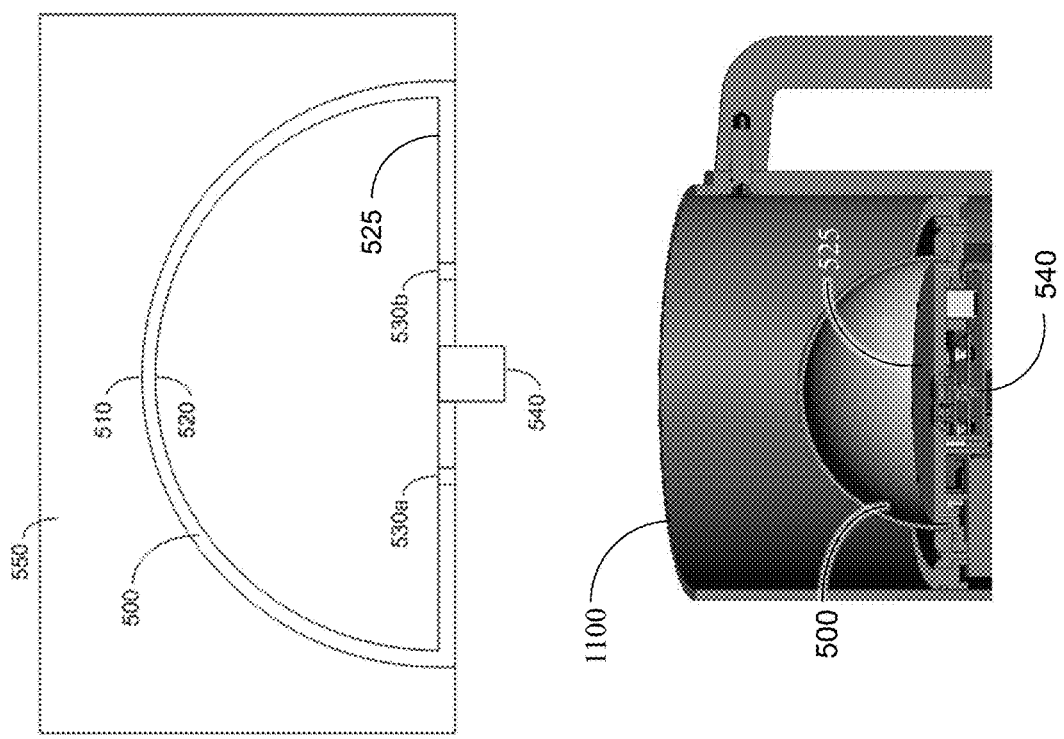
FIG. 5 is a schematic diagrams of (1) an exemplary upright hemispherical accessory for improving sensitivity or efficiency of an optical spectrometer and (λ) an exemplary upright hemispherical accessory in conjunction with an exemplary cup accessory, in accordance with embodiments of the present disclosure.

FIG. 5 is a schematic diagram of an exemplary upright hemispherical accessory 500 for improving sensitivity or efficiency of an optical spectrometer. The accessory 500 may comprise an outer surface 510. The outer surface may be in optical communication with a sample 550. The sample may be a solid sample. The sample may be a powder sample. The sample may be a liquid sample. The sample may be a gaseous sample. The outer surface may be in proximity to the sample. The outer surface may be in contact with the sample. The outer surface may be surrounded by the sample. In some embodiments, the sample may be contained in a cup accessory 1100, described in further detail with respect to FIG. 11. Alternatively, the outer surface may not be in contact with the sample. For example, there may be at least one medium (such as air, water, or any other medium) between the outer surface and the sample.

Figure 6:
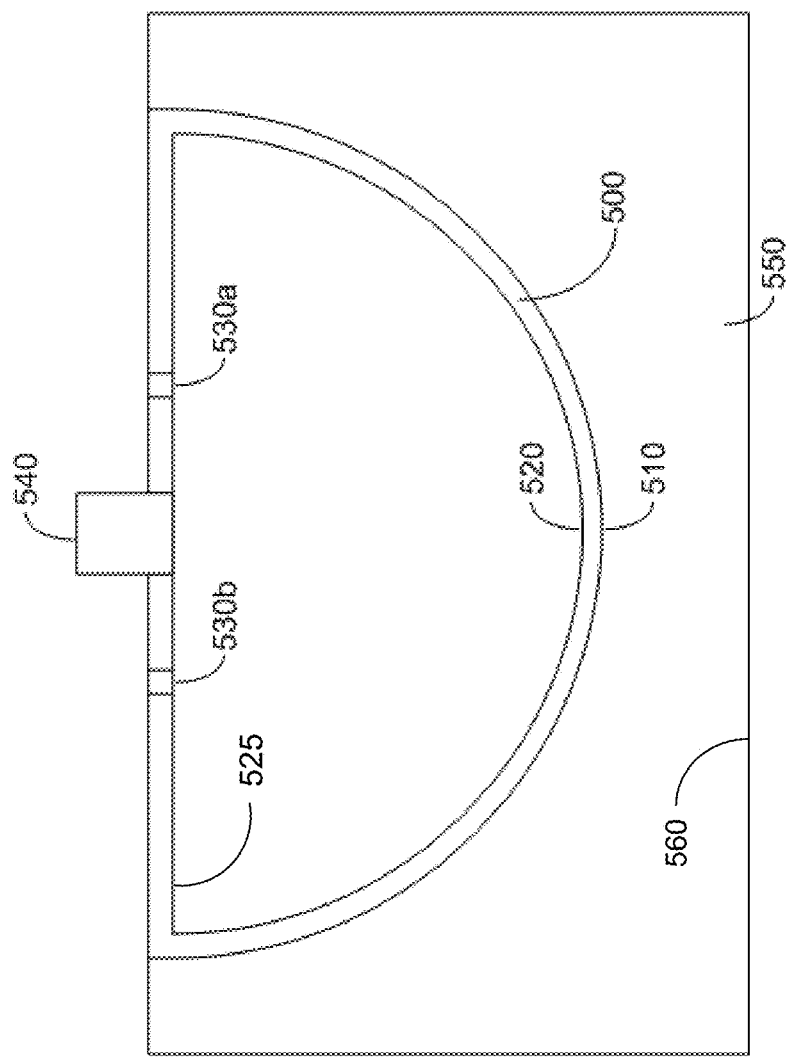
FIG. 6 is a schematic diagram of an exemplary inverted hemispherical accessory for improving sensitivity or efficiency of an optical spectrometer, in accordance with embodiments of the present disclosure.
Figure 7:
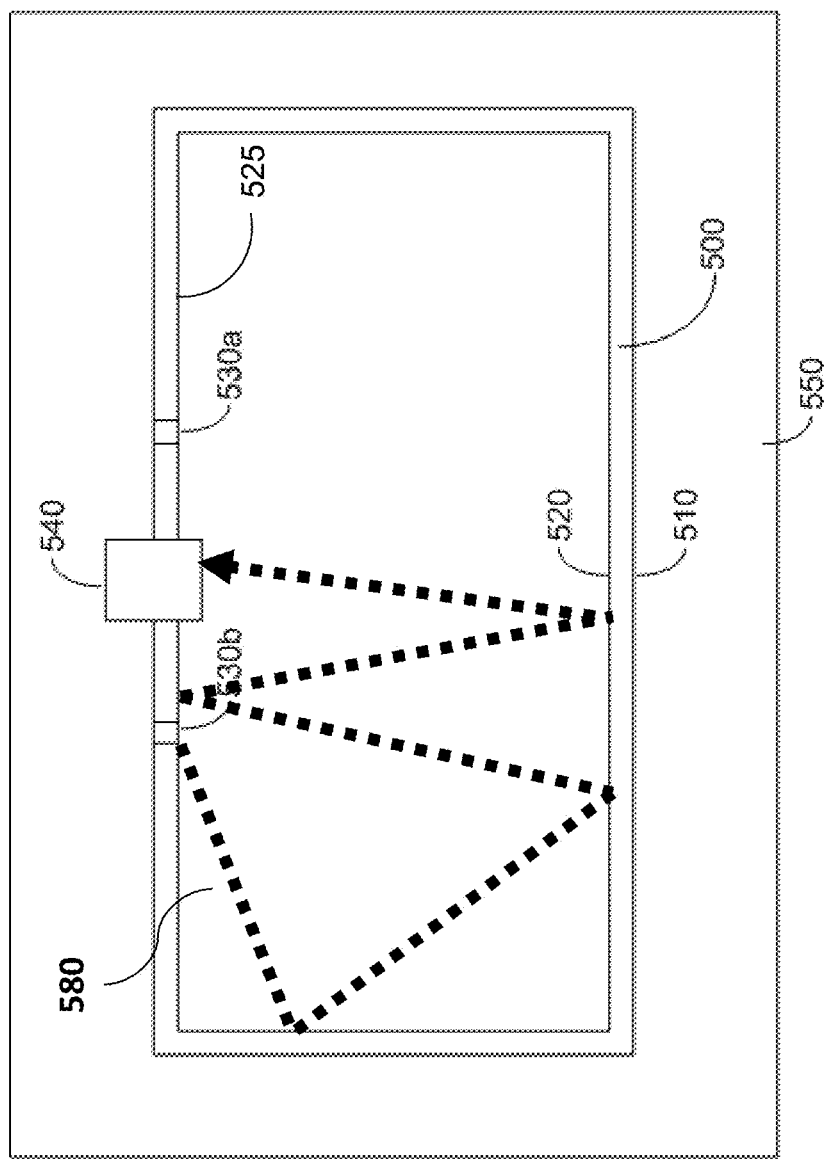
FIG. 7 is a schematic diagram of an exemplary cylindrical or tubular accessory for improving sensitivity or efficiency of an optical spectrometer, in accordance with embodiments of the present disclosure.
Figure 8:
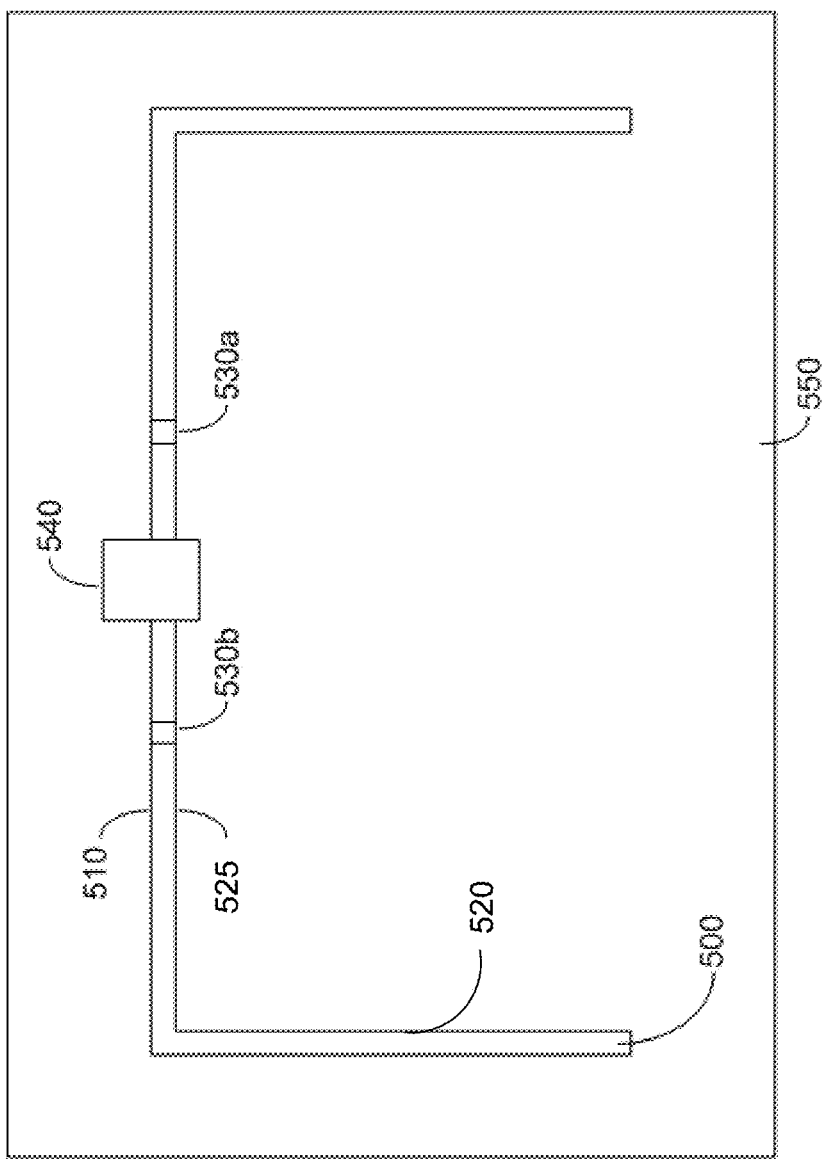
FIG. 8 is a schematic diagram of an exemplary cylindrical or tubular accessory comprising an opening for improving sensitivity or efficiency of an optical spectrometer, in accordance with embodiments of the present disclosure.

The outer surface may be spherical. The outer surface may be hemi-spherical (for instance, as depicted in FIG. 5 or FIG. 6). The outer surface may be cylindrical or tubular (for instance, as depicted in FIG. 7 or FIG. 8). The outer surface may be polyhedral. The outer surface may comprise one or more angles. For instance, the outer surface may comprise at least 1, at least 2, at least 3, at least 4, at least 5, at least 6, at least 7, at least 8, at least 9, at least 10, at least 11, at least 12, at least 13, at least 14, at least 15, at least 16, at least 17, at least 18, at least 19, at least 20, at least 30, at least 40, at least 50, at least 60, at least 70, at least 80, at least 90, at least 100, or more angles. The outer surface may comprise at most 100, at most 90, at most 80, at most 70, at most 60, at most 50, at most 40, at most 30, at most 20, at most 19, at most 18, at most 17, at most 16, at most 15, at most 14, at most 13, at most 12, at most 11, at most 10, at most 9, at most 8, at most 7, at most 6, at most 5, at most 4, at most 3, at most 2, or at most 1 angles. The outer surface may comprise a number of angles that is within a range defined by any two of the preceding values. The outer surface may have any number of substantially flat surfaces. The outer surface may have any number of substantially curved surfaces. Alternatively or in addition, the outer surface may have any combination of a number of substantially curved surfaces and substantially flat surfaces.

The outer surface may be transparent. The outer surface may be translucent. The outer surface may be opaque. The outer surface may have a reflectivity of at least 0.01%, at least 0.02%, at least 0.03%, at least 0.04%, at least 0.05%, at least 0.06%, at least 0.07%, at least 0.08%, at least 0.09%, at least 0.1%, at least 0.2%, at least 0.3%, at least 0.4%, at least 0.5%, at least 0.6%, at least 0.7%, at least 0.8%, at least 0.9%, at least 1%, at least 2%, at least 3%, at least 4%, at least 5%, at least 6%, at least 7%, at least 8%, at least 9%, at least 10%, at least 20%, at least 30%, at least 40%, at least 50%, at least 60%, at least 70%, at least 80%, at least 90%, at least 91%, at least 92%, at least 93%, at least 94%, at least 95%, at least 96%, at least 97%, at least 98%, at least 99%, at least 99.1%, at least 99.2%, at least 99.3%, at least 99.4%, at least 99.5%, at least 99.6%, at least 99.7%, at least 99.8%, at least 99.9%, at least 99.91%, at least 99.92%, at least 99.93%, at least 99.94%, at least 99.95%, at least 99.96%, at least 99.97%, at least 99.98%, at least 99.99%, or more, over a range of wavelengths detected by the optical spectrometer (and/or a range of wavelengths emitted by the light source). The outer surface may have a reflectivity of at most 99.99%, at most 99.98%, at most 99.97%, at most 99.96%, at most 99.95%, at most 99.94%, at most 99.93%, at most 99.92%, at most 99.91%, at most 99.9%, at most 99.8%, at most 99.7%, at most 99.6%, at most 99.5%, at most 99.4%, at most 99.3%, at most 99.1%, at most 99.1%, at most 99%, at most 98%, at most 97%, at most 96%, at most 95%, at most 94%, at most 93%, at most 92%, at most 91%, at most 90%, at most 80%, at most 70%, at most 60%, at most 50%, at most 40%, at most 30%, at most 20%, at most 10%, at most 9%, at most 8%, at most 7%, at most 6%, at most 5%, at most 4%, at most 3%, at most 2%, at most 1%, at most 0.9%, at most 0.8%, at most 0.7%, at most 0.6%, at most 0.5%, at most 0.4%, at most 0.3%, at most 0.2%, at most 0.1%, at most 0.09%, at most 0.08%, at most 0.07%, at most 0.06%, at most 0.05%, at most 0.04%, at most 0.03%, at most 0.02%, at most 0.01%, or less, over a range of wavelengths detected by the optical spectrometer (and/or a range of wavelengths (and/or a range of wavelengths emitted by the light source). The outer surface may have a reflectivity that is within a range defined by any two of the preceding values.

The outer surface may have a transmissivity of at least 0.01%, at least 0.02%, at least 0.03%, at least 0.04%, at least 0.05%, at least 0.06%, at least 0.07%, at least 0.08%, at least 0.09%, at least 0.1%, at least 0.2%, at least 0.3%, at least 0.4%, at least 0.5%, at least 0.6%, at least 0.7%, at least 0.8%, at least 0.9%, at least 1%, at least 2%, at least 3%, at least 4%, at least 5%, at least 6%, at least 7%, at least 8%, at least 9%, at least 10%, at least 20%, at least 30%, at least 40%, at least 50%, at least 60%, at least 70%, at least 80%, at least 90%, at least 91%, at least 92%, at least 93%, at least 94%, at least 95%, at least 96%, at least 97%, at least 98%, at least 99%, at least 99.1%, at least 99.2%, at least 99.3%, at least 99.4%, at least 99.5%, at least 99.6%, at least 99.7%, at least 99.8%, at least 99.9%, at least 99.91%, at least 99.92%, at least 99.93%, at least 99.94%, at least 99.95%, at least 99.96%, at least 99.97%, at least 99.98%, at least 99.99%, or more, over a range of wavelengths emitted by the light source. The outer surface may have a transmissivity of at most 99.99%, at most 99.98%, at most 99.97%, at most 99.96%, at most 99.95%, at most 99.94%, at most 99.93%, at most 99.92%, at most 99.91%, at most 99.9%, at most 99.8%, at most 99.7%, at most 99.6%, at most 99.5%, at most 99.4%, at most 99.3%, at most 99.1%, at most 99.1%, at most 99%, at most 98%, at most 97%, at most 96%, at most 95%, at most 94%, at most 93%, at most 92%, at most 91%, at most 90%, at most 80%, at most 70%, at most 60%, at most 50%, at most 40%, at most 30%, at most 20%, at most 10%, at most 9%, at most 8%, at most 7%, at most 6%, at most 5%, at most 4%, at most 3%, at most 2%, at most 1%, at most 0.9%, at most 0.8%, at most 0.7%, at most 0.6%, at most 0.5%, at most 0.4%, at most 0.3%, at most 0.2%, at most 0.1%, at most 0.09%, at most 0.08%, at most 0.07%, at most 0.06%, at most 0.05%, at most 0.04%, at most 0.03%, at most 0.02%, at most 0.01%, or less, over a range of wavelengths emitted by the light source. The outer surface may have a transmissivity that is within a range defined by any two of the preceding values.

The outer surface may comprise an anti-reflective material. The anti-reflective material may have any reflectivity or transmissivity described herein with respect to the outer surface of the accessory.

The outer surface may comprise a diffuse reflective material. The diffuse reflective material may comprise a diffuse white reflector. The diffuse reflective material may be substantially flat. The diffuse reflective material may be outside a range of a direct field of view of a light source used with the accessory 500. The diffuse reflective material may be outside a range of a direct field of view of an optical spectrometer used with the accessory 500.

The accessory 500 may further comprise an inner surface, comprising a ceiling 520 and a floor 525. In some embodiments, the ceiling 520 may comprise the surface opposite the outer surface. The inner surface may be in optical communication with the sample 550. The inner surface may be configured to partially or completely enclose one or more light sources, such as first light source 530a and second light source 530b, as depicted in FIG. 5. Though depicted as enclosing two light sources in FIG. 5, the accessory may be configured to partially or completely enclose at least 1, at least 2, at least 3, at least 4, at least 5, at least 6, at least 7, at least 8, at least 9, at least 10, or more light sources. The accessory may be configured to partially or completely enclose at most 10, at most 9, at most 8, at most 7, at most 6, at most 5, at most 4, at most 3, at most 2, or at most 1 light sources. The accessory may be configured to partially or completely enclose a number of light sources that is within a range defined by any two of the preceding values.

The inner surface, comprising the ceiling 520 and the floor 525, may be configured to partially enclose an optical spectrometer 540. Optical spectrometer 540 may comprise an ultraviolet, visible, or infrared spectrometer. Optical spectrometer 540 may comprise a reflectance spectrometer. Optical spectrometer 540 may comprise an absorptance spectrometer. Optical spectrometer 540 may comprise a fluorescence spectrometer. Optical spectrometer 540 may comprise a Fourier transform spectrometer. Optical spectrometer 540 may comprise a Raman spectrometer. Optical spectrometer 540 may be similar to spectrometer 102 described herein, or any element or module of spectrometer 102 described herein. Optical spectrometer 540 may be similar to spectrometer 300 described herein, or any element or module of spectrometer 300 described herein. Optical spectrometer 540 may be similar to spectrometer 401 described herein, or any element or module of spectrometer 401 described herein.

Figure 13:
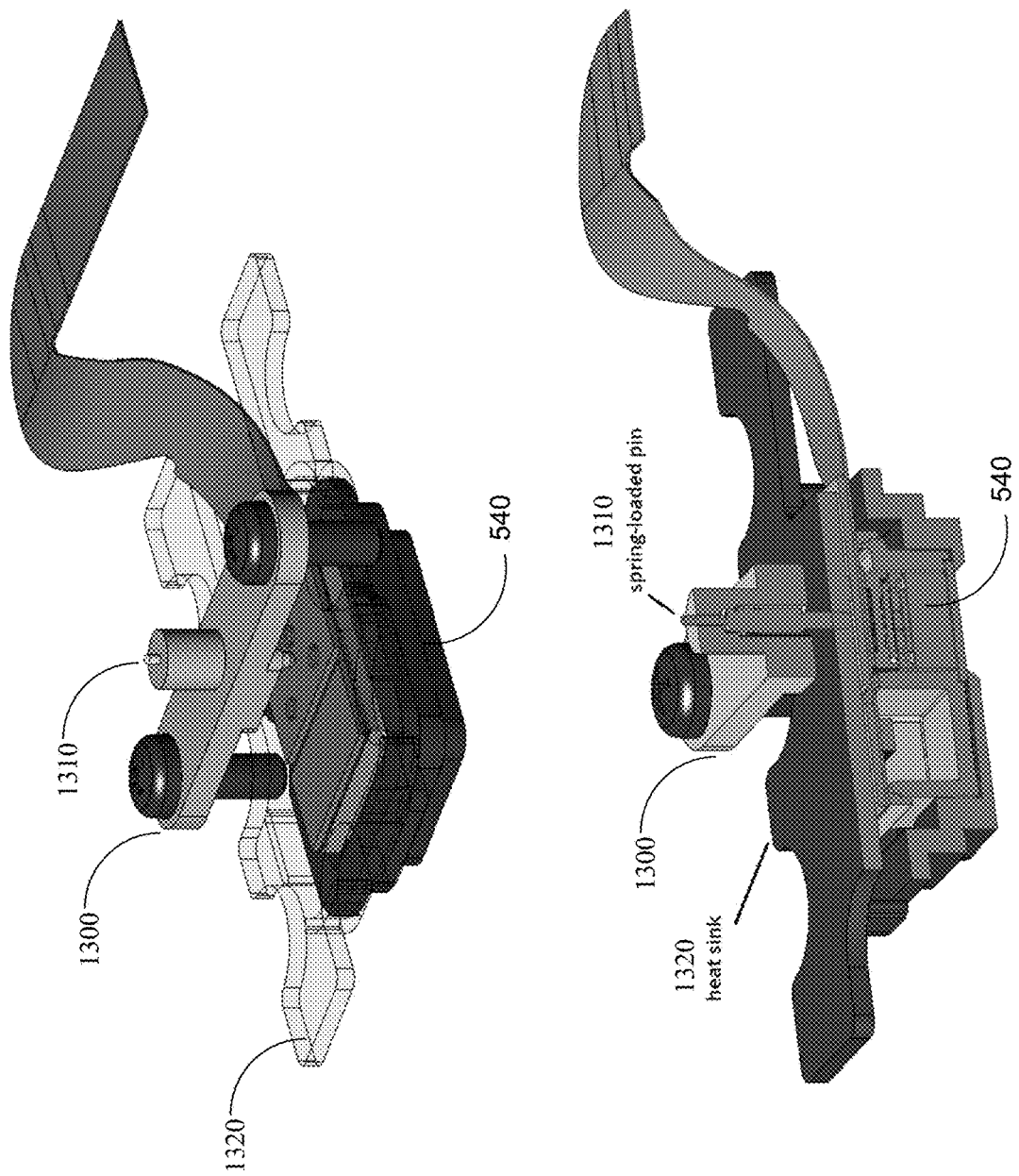
FIG. 13 is a schematic diagram of an exemplary fixed-force holder accessory for improving accuracy or sensitivity of an optical spectrometer, in accordance with the embodiments of the present disclosure.
Figure 14:
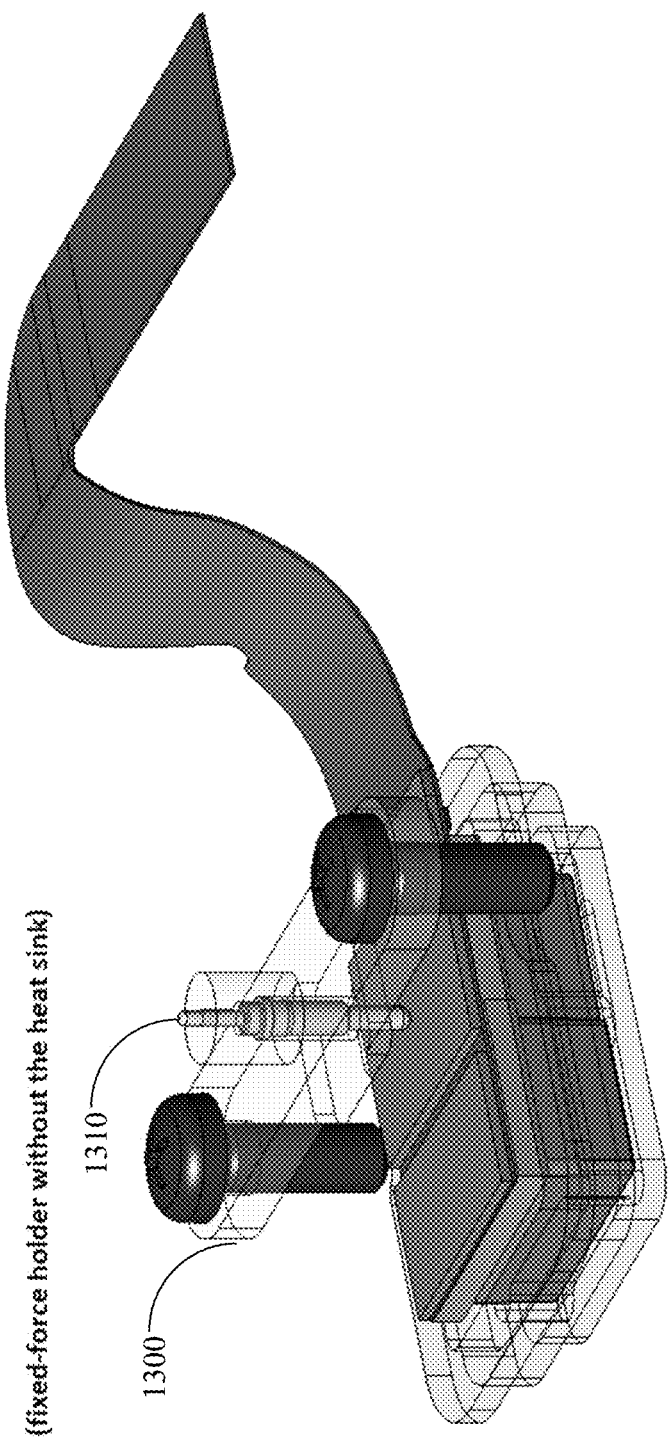
FIG. 14 is a schematic diagram of an exemplary fixed-force holder accessory for improving accuracy or sensitivity of an optical spectrometer, in accordance with the embodiments of the present disclosure.

Optical spectrometer 540 may comprise a fixed-force holder accessory 1300, as shown in FIG. 13 and FIG. 14. The fixed-force holder accessory 1300 may be configured to apply a constant force to the base of the spectrometer. The application of the constant force may reduce or eliminate measurement variations over time or between two or more optical spectrometer units. For example, the application of the constant force may reduce or eliminate variations due to changes in temperature of the spectrometer or physical stresses on the spectrometer. The fixed-force holder accessory 1300 may comprise a force application device. The force application device may apply a force to a surface of the optical spectrometer 540. The force may be constant, or the force may be variable. In some embodiments, the force may vary in response to a change in temperature, a physical stress, or a movement. In some embodiments, the force application device may be a spring-loaded pin 1310, for example as shown in FIG. 13 and FIG. 14. In some embodiments, the force application device may be an elastic device, a hydraulic device, a set screw, a micrometer, or any other device capable of applying a variable or adjustable force on the optical spectrometer. In some embodiments, the fixed-force holder accessory comprises a heat sink 1302, for example as shown in FIG. 13. The heat sink may be configured to reduce thermal fluctuations of the spectrometer.

Optical spectrometer 540 may be positioned in any possible spatial relation to inner surface. For instance, optical spectrometer 540 may be positioned at or near a center of the floor 525. Optical spectrometer 540 may be positioned at an offset from the center of the floor. Positioning the optical spectrometer at or near the center of the floor, or at an offset from the center of the floor, may increase a number of interactions of the light with the sample, thereby enhancing the sensitivity or efficiency of the optical spectrometer.

The one or more light sources (such as first and second light source 530a and 530b, respectively, as described herein) may be positioned in any possible spatial relation to the inner surface. For instance, the one or more light sources may be positioned at or near a center of the floor 525. The one or more light sources may be positioned at an offset from the center of the floor. Positioning the one or more light sources at or near the center of the floor, or at an offset from the center of the floor, may increase a number of interactions of the light with the sample, thereby enhancing the sensitivity or efficiency of the optical spectrometers described herein.

The inner surface, comprising the ceiling 520 and the floor 525, may be hemispherical, spherical, tubular, tetrahedral, cubic, rectangular, octahedral, dodecahedral, icosahedral, or any polyhedron. The floor may be positioned below the ceiling, as shown in FIG. 5, or the floor may be positioned above the ceiling, as shown in FIG. 6. In some embodiments, the floor comprises a region of an inner surface of a tube, as shown in FIG. 7. The inner surface may have a diameter. The diameter of the inner surface may be about 20 millimeters (mm), about 25 mm, about 30 mm, about 35 mm, about 40 mm, about 50 mm, about 60 mm, about 75 mm, about 100 mm, about 105 mm, about 110 mm, about 125 mm, about 150 mm, about 200 mm, about 250 mm, about 300 mm, or about 400 mm. The diameter of the inner surface may be from 30 mm to 50 mm, from 40 mm to 75 mm, from 50 mm to 100 mm, from 60 mm to 100 mm, from 75 mm to 100 mm, from 100 mm to 105 mm, from 105 mm to 110 mm, from 110 mm to 125 mm, from 125 mm to 150 mm, from 150 mm to 200 mm, from 200 mm to 250 mm, from 250 mm to 300 mm, from 300 mm to 400 mm, from 20 mm to 400 mm, from 30 mm to 300 mm, from 50 mm to 200 mm, from 75 mm to 125 mm, or from 100 mm to 110 mm.

An optical spectrometer of the present disclosure may comprise two or more light sources. The two or more light sources may be the same. The two or more light sources may be different. For example, the two or more light sources may have different illumination wavelengths. The two or more light sources may have different illumination spectra. The two or more light sources may have different illumination intensities. The two or more light sources may have different angles of incidence on a closing plane. The two or more light sources may reflect or refract off different closing planes. In some embodiments, the light from the two or more light sources may be combined to produce homogenous illumination of the sample. The combined light from the two or more light sources may produce a more homogenous illumination of the sample than an individual light source.

An optical spectrometer of the present disclosure may comprise two or more detectors. The two or more detectors may be the same. The two or more detectors may be different. For example, the two or more detectors may have different detection wavelengths. The two or more detectors may have different detection bandwidth. The two or more light sources may have different detection sensitivities. In some embodiments, the signal detected by the two or more detectors may be combined to produce homogenous detection of the sample. The combined signal detected by the two or more detectors may produce a more homogenous detection of the sample than an individual detector.

The optical spectrometer, one or more light sources, inner surface, and outer surface may be positioned in any possible configuration relative to one another. For instance, the optical spectrometer, one or more light sources, inner surface, and outer surface may be positioned in such a manner as to minimize reflections of light emitted by the one or more light sources from the inner surface or the outer surface toward the spectrometer. Such a configuration may reduce the amount of light that has not interacted with the sample that is subsequently detected by the spectrometer and thereby increase the number of interactions of the light with the sample.

The inner surface may be configured to direct light emitted by the one or more light sources to achieve a plurality of optical interactions with the sample 550 before being received by the optical spectrometer. The optical interactions may comprise any possible interaction of the light with the sample. For instance, the optical interactions may comprise reflection, absorption, elastic scattering, inelastic scattering, diffraction, or any other linear or non-linear optical interaction, The inner surface may be configured to direct light emitted by the one or more light sources to achieve at least 1, at least 2, at least 3, at least 4, at least 5, at least 6, at least 7, at least 8, at least 9, at least 10, at least 20, at least 30, at least 40, at least 50, at least 60, at least 70, at least 80, at least 90, at least 100, at least 200, at least 300, at least 400, at least 500, at least 600, at least 700, at least 800, at least 900, at least 1,000, or more optical interactions with the sample before being received by the optical spectrometer. The inner surface may be configured to direct light emitted by the one or more light sources to achieve at most 1,000, at most 900, at most 800, at most 700, at most 600, at most 500, at most 400, at most 300, at most 200, at most 100, at most 90, at most 80, at most 70, at most 60, at most 50, at most 40, at most 30, at most 20, at most 10, at most 90, at most 80, at most 70, at most 60, at most 50, at most 40, at most 30, at most 20, at most 10, at most 9, at most 8, at most 7, at most 6, at most 5, at most 4, at most 3, at most 2, or at most 1 optical interactions with the sample before being received by the optical spectrometer. The inner surface may be configured to direct light emitted by the one or more light sources to achieve a number of optical interactions with the sample that is within a range defined by any two of the preceding values before being received by the optical spectrometer. In some instances, most of the light emitted by the one or more light sources may achieve such multiple optical interactions with the sample before being received by the optical spectrometer. In some instances, the inner surface may be configured to increase an optical path length by at least 1 times, at least 2 times, at least 3 times, at least 4 times, at least 5 times, at least 6 times, at least 7 times, at least 8 times, at least 9 times, at least 10 times, at least 20 times, at least 30 times, at least 40 times, at least 50 times, at least 60 times, at least 70 times, at least 80 times, at least 90 times, at least 100 times, or more, with respect to an optical path length of a single reflection. The inner surface may be configured to increase an optical path length by at most 100 times, at most 90 times, at most 80 times, at most 70 times, at most 60 times, at most 50 times, at most 40 times, at most 30 times, at most 20 times, at most 10 times, at most 9 times, at most 8 times, at most 7 times, at most 6 times, at most 5 times, at most 4 times, at most 3 times, at most 2 times, at most 1 time, or less. The inner surface may be configured to increase an optical path length by a number of times that is within a range defined by any two of the preceding values.

The plurality of optical interactions may increase a contrast of an optical spectrum obtained by the optical spectrum by a factor of at least 2, at least 3, at least 4, at least 5, at least 6, at least 7, at least 8, at least 9, at least 10, at least 20, at least 30, at least 40, at least 50, at least 60, at least 70, at least 80, at least 90, at least 100, at least 200, at least 300, at least 400, at least 500, at least 600, at least 700, at least 800, at least 900, at least 1,000, or more, as compared to a contrast of an optical spectrum obtained by an optical spectrometer in the absence of the accessory. The plurality of optical interactions may increase a contrast of an optical spectrum obtained by the optical spectrum by a factor of at most 1,000, at most 900, at most 800, at most 700, at most 600, at most 500, at most 400, at most 300, at most 200, at most 100, at most 90, at most 80, at most 70, at most 60, at most 50, at most 40, at most 30, at most 20, at most 10, at most 9, at most 8, at most 7, at most 6, at most 5, at most 4, at most 3, at most 2, or less, as compared to a contrast of an optical spectrum obtained by an optical spectrometer in the absence of the accessory. The plurality of optical interactions may increase a contrast of an optical spectrum obtained by the optical spectrum by a factor that is within a range defined by any two of the preceding values, as compared to a contrast of an optical spectrum obtained by an optical spectrometer in the absence of the accessory.

The inner surface may be spherical. The inner surface may be hemi-spherical (for instance, as depicted in FIG. 5 or FIG. 6). The inner surface may be cylindrical or tubular (for instance, as depicted in FIG. 7 or FIG. 8). The inner surface may be polyhedral. The inner surface may comprise one or more angles. For instance, the inner surface may comprise at least 1, at least 2, at least 3, at least 4, at least 5, at least 6, at least 7, at least 8, at least 9, at least 10, at least 11, at least 12, at least 13, at least 14, at least 15, at least 16, at least 17, at least 18, at least 19, at least 20, at least 30, at least 40, at least 50, at least 60, at least 70, at least 80, at least 90, at least 100, or more angles. The inner surface may comprise at most 100, at most 90, at most 80, at most 70, at most 60, at most 50, at most 40, at most 30, at most 20, at most 19, at most 18, at most 17, at most 16, at most 15, at most 14, at most 13, at most 12, at most 11, at most 10, at most 9, at most 8, at most 7, at most 6, at most 5, at most 4, at most 3, at most 2, or at most 1 angles. The inner surface may comprise a number of angles that is within a range defined by any two of the preceding values. The inner surface may have any number of substantially flat surfaces. The inner surface may have any number of substantially curved surfaces. Alternatively or in addition, the inner surface may have any combination of a number of substantially curved surfaces and substantially flat surfaces.

The inner surface may be transparent. The inner surface may be translucent. The inner surface may be opaque. The inner surface may have a reflectivity of at least 0.01%, at least 0.02%, at least 0.03%, at least 0.04%, at least 0.05%, at least 0.06%, at least 0.07%, at least 0.08%, at least 0.09%, at least 0.1%, at least 0.2%, at least 0.3%, at least 0.4%, at least 0.5%, at least 0.6%, at least 0.7%, at least 0.8%, at least 0.9%, at least 1%, at least 2%, at least 3%, at least 4%, at least 5%, at least 6%, at least 7%, at least 8%, at least 9%, at least 10%, at least 20%, at least 30%, at least 40%, at least 50%, at least 60%, at least 70%, at least 80%, at least 90%, at least 91%, at least 92%, at least 93%, at least 94%, at least 95%, at least 96%, at least 97%, at least 98%, at least 99%, at least 99.1%, at least 99.2%, at least 99.3%, at least 99.4%, at least 99.5%, at least 99.6%, at least 99.7%, at least 99.8%, at least 99.9%, at least 99.91%, at least 99.92%, at least 99.93%, at least 99.94%, at least 99.95%, at least 99.96%, at least 99.97%, at least 99.98%, at least 99.99%, or more, over a range of wavelengths detected by the optical spectrometer (and/or over a range of wavelengths emitted by the light source). The inner surface may have a reflectivity of at most 99.99%, at most 99.98%, at most 99.97%, at most 99.96%, at most 99.95%, at most 99.94%, at most 99.93%, at most 99.92%, at most 99.91%, at most 99.9%, at most 99.8%, at most 99.7%, at most 99.6%, at most 99.5%, at most 99.4%, at most 99.3%, at most 99.1%, at most 99.1%, at most 99%, at most 98%, at most 97%, at most 96%, at most 95%, at most 94%, at most 93%, at most 92%, at most 91%, at most 90%, at most 80%, at most 70%, at most 60%, at most 50%, at most 40%, at most 30%, at most 20%, at most 10%, at most 9%, at most 8%, at most 7%, at most 6%, at most 5%, at most 4%, at most 3%, at most 2%, at most 1%, at most 0.9%, at most 0.8%, at most 0.7%, at most 0.6%, at most 0.5%, at most 0.4%, at most 0.3%, at most 0.2%, at most 0.1%, at most 0.09%, at most 0.08%, at most 0.07%, at most 0.06%, at most 0.05%, at most 0.04%, at most 0.03%, at most 0.02%, at most 0.01%, or less, over a range of wavelengths detected by the optical spectrometer (and/or over a range of wavelengths emitted by the light source). The inner surface may have a reflectivity that is within a range defined by any two of the preceding values.

The inner surface may have a transmissivity of at least 0.01%, at least 0.02%, at least 0.03%, at least 0.04%, at least 0.05%, at least 0.06%, at least 0.07%, at least 0.08%, at least 0.09%, at least 0.1%, at least 0.2%, at least 0.3%, at least 0.4%, at least 0.5%, at least 0.6%, at least 0.7%, at least 0.8%, at least 0.9%, at least 1%, at least 2%, at least 3%, at least 4%, at least 5%, at least 6%, at least 7%, at least 8%, at least 9%, at least 10%, at least 20%, at least 30%, at least 40%, at least 50%, at least 60%, at least 70%, at least 80%, at least 90%, at least 91%, at least 92%, at least 93%, at least 94%, at least 95%, at least 96%, at least 97%, at least 98%, at least 99%, at least 99.1%, at least 99.2%, at least 99.3%, at least 99.4%, at least 99.5%, at least 99.6%, at least 99.7%, at least 99.8%, at least 99.9%, at least 99.91%, at least 99.92%, at least 99.93%, at least 99.94%, at least 99.95%, at least 99.96%, at least 99.97%, at least 99.98%, at least 99.99%, or more, over a range of wavelengths emitted by the light source. The inner surface may have a transmissivity of at most 99.99%, at most 99.98%, at most 99.97%, at most 99.96%, at most 99.95%, at most 99.94%, at most 99.93%, at most 99.92%, at most 99.91%, at most 99.9%, at most 99.8%, at most 99.7%, at most 99.6%, at most 99.5%, at most 99.4%, at most 99.3%, at most 99.1%, at most 99.1%, at most 99%, at most 98%, at most 97%, at most 96%, at most 95%, at most 94%, at most 93%, at most 92%, at most 91%, at most 90%, at most 80%, at most 70%, at most 60%, at most 50%, at most 40%, at most 30%, at most 20%, at most 10%, at most 9%, at most 8%, at most 7%, at most 6%, at most 5%, at most 4%, at most 3%, at most 2%, at most 1%, at most 0.9%, at most 0.8%, at most 0.7%, at most 0.6%, at most 0.5%, at most 0.4%, at most 0.3%, at most 0.2%, at most 0.1%, at most 0.09%, at most 0.08%, at most 0.07%, at most 0.06%, at most 0.05%, at most 0.04%, at most 0.03%, at most 0.02%, at most 0.01%, or less, over a range of wavelengths emitted by the light source. The inner surface may have a transmissivity that is within a range defined by any two of the preceding values.

The inner surface may comprise an anti-reflective material. The anti-reflective material may have any reflectivity or transmissivity described herein with respect to the inner surface of the accessory. The inner surface floor and the inner surface ceiling may comprise the same or different materials. For example, the inner surface floor and the inner surface ceiling may have different reflectivity or transmissivity. In some embodiments, the reflectivity or transmissivity of the inner surface floor may be adjustable, as described with respect to FIG. 16.

The inner surface may comprise a diffuse reflective material. The diffuse reflective material may comprise a diffuse white reflector. The diffuse reflective material may be substantially flat. For example, the inner surface floor may comprise the diffuse reflective material. The diffuse reflective material may be outside a range of a direct field of view of a light source used with the accessory 500. The diffuse reflective material may be outside a range of a direct field of view of an optical spectrometer used with the accessory 500.

The inner surface may comprise one or more apertures. The inner surface may comprise a plurality of apertures. For instance, the inner surface may comprise at least 1, at least 2, at least 3, at least 4, at least 5, at least 6, at least 7, at least 8, at least 9, at least 10, or more apertures. The inner surface may comprise at most 10, at most 9, at most 8, at most 7, at most 6, at most 5, at most 4, at most 3, at most 2, or at most 1 apertures. The inner surface may comprise a number of apertures that is within a range defined by any two of the preceding values. The one or more apertures may be sized for placement of the one or more light sources. The one or more apertures may be sized for placement of the optical spectrometer. The one or more apertures may be sized for placement of one or more temperature sensors. The one or more temperature sensors may be configured to remotely sense a temperature of the sample, light source, or spectrometer. The one or more temperature sensors may be bolometer-based temperature sensors or any other temperature sensors.

The inner surface may define a cavity. The cavity may have a closing plane. In some embodiments, the inner surface floor may comprise the closing plane. The cavity may be placed in a measurement volume filled by a sample. The measurement volume may be disposed below the closing plane. The measurement volume may be disposed above the closing plane. The closing plane may comprise a closing plane material. The closing plane material may have any reflectivity or transmissivity described herein with respect to the inner surface of the accessory. The closing plane material may comprise a material or a diffuse white material. The closing plane material may be substantially planar. For instance, the closing plane material may be planar to within a deviation (such as a root-mean-square deviation) of at least 0.1 nm, at least 0.2 nm, at least 0.3 nm, at least 0.4 nm, at least 0.5 nm, at least 0.6 nm, at least 0.7 nm, at least 0.8 nm, at least 0.9 nm, at least 1 nm, at least 2 nm, at least 3 nm, at least 4 nm, at least 5 nm, at least 6 nm, at least 7 nm, at least 8 nm, at least 9 nm, at least 10 nm, at least 20 nm, at least 30 nm, at least 40 nm, at least 50 nm, at least 60 nm, at least 70 nm, at least 80 nm, at least 90 nm, at least 100 nm, at least 200 nm, at least 300 nm, at least 400 nm, at least 500 nm, at least 600 nm, at least 700 nm, at least 800 nm, at least 900 nm, at a least 1 micrometer ($\mu$m), at least 2 $\mu$m, at least 3 $\mu$m, at least 4 $\mu$m, at least 5 $\mu$m, at least 6 $\mu$m, at least 7 $\mu$m, at least 8 $\mu$m, at least 9 $\mu$m, at least 10 $\mu$m, at least 20 $\mu$m, at least 30 $\mu$m, at least 40 $\mu$m, at least 50 $\mu$m, at least 60 $\mu$m, at least 70 $\mu$m, at least 80 $\mu$m, at least 90 $\mu$m, at least 100 $\mu$m, or more. The closing plane material may be planar to within a deviation of at most 100 $\mu$m, at most 90 $\mu$m, at most 80 $\mu$m, at most 70 $\mu$m, at most 60 $\mu$m, at most 50 $\mu$m, at most 40 $\mu$m, at most 30 $\mu$m, at most 20 $\mu$m, at most 10 $\mu$m, at most 9 $\mu$m, at most 8 $\mu$m, at most 7 $\mu$m, at most 6 $\mu$m, at most 5 $\mu$m, at most 4 $\mu$m, at most 3 $\mu$m, at most 2 $\mu$m, at most 1 $\mu$m, at most 900 nm, at most 800 nm, at most 700 nm, at most 600 nm, at most 500 nm, at most 400 nm, at most 300 nm, at most 200 nm, at most 100 nm, at most 90 nm, at most 80 nm, at most 70 nm, at most 60 nm, at most 50 nm, at most 40 nm, at most 30 nm, at most 20 nm, at most 10 nm, at most 9 nm, at most 8 nm, at most 7 nm, at most 6 nm, at most 5 nm, at most 4 nm, at most 3 nm, at most 2 nm, at most 1 nm, at most 0.9 nm, at most 0.8 nm, at most 0.7 nm, at most 0.6 nm, at most 0.5 nm, at most 0.4 nm, at most 0.3 nm, at most 0.2 nm, at most 0.1 nm, or less. The closing plane material may be planar to a deviation that is within a range defined by any two of the preceding values.

Figure 16:
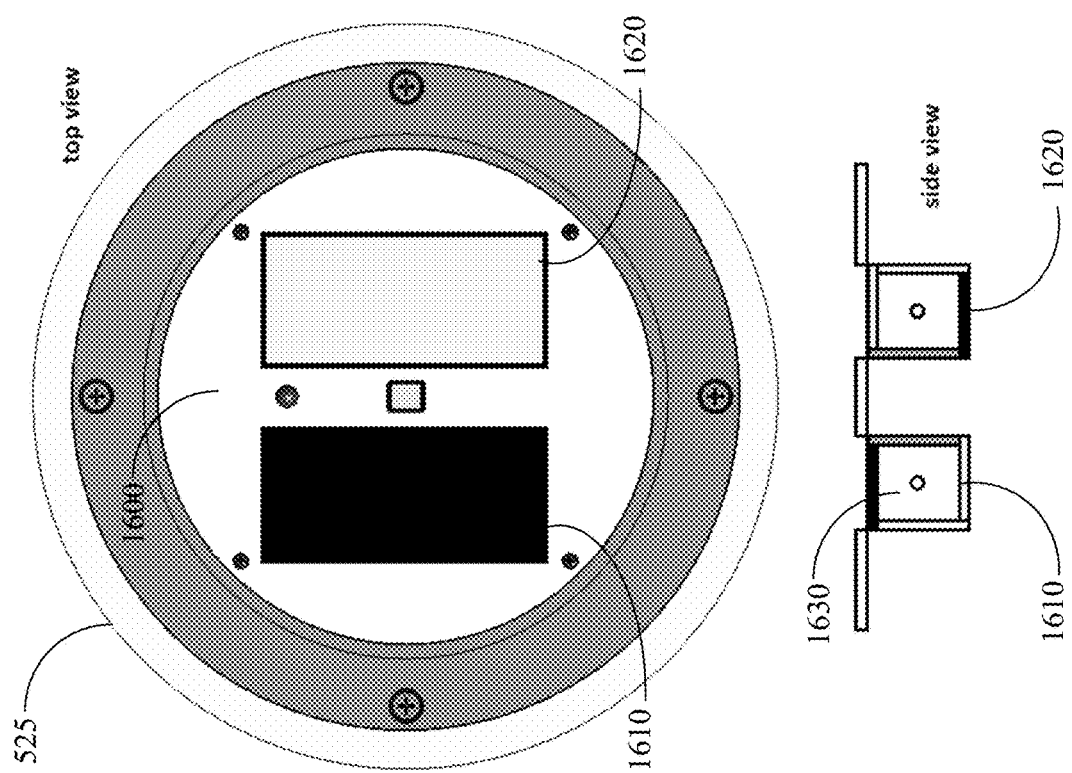
FIG. 16 is a schematic diagram of an exemplary sensitivity control accessory for improving sensitivity or efficiency of an optical spectrometer, in accordance with the embodiments of the present disclosure.

The closing plane 1600 may comprise one or more prisms 1610 and 1620, as shown in FIG. 16. The one or more prisms may comprise one or more closing plane materials. In some embodiments, a closing plan comprises a prism configured to rotate about an axis 1630 substantially parallel to the closing plane. The prism may comprise a plurality of surfaces which, upon rotation about the axis, may reflect light off a part of the closing plan. A surface of the plurality of surfaces may be substantially parallel to the axis of rotation. A surface of the plurality of surfaces may have a reflectivity of at least 0.01%, at least 0.02%, at least 0.03%, at least 0.04%, at least 0.05%, at least 0.06%, at least 0.07%, at least 0.08%, at least 0.09%, at least 0.1%, at least 0.2%, at least 0.3%, at least 0.4%, at least 0.5%, at least 0.6%, at least 0.7%, at least 0.8%, at least 0.9%, at least 1%, at least 2%, at least 3%, at least 4%, at least 5%, at least 6%, at least 7%, at least 8%, at least 9%, at least 10%, at least 20%, at least 30%, at least 40%, at least 50%, at least 60%, at least 70%, at least 80%, at least 90%, at least 91%, at least 92%, at least 93%, at least 94%, at least 95%, at least 96%, at least 97%, at least 98%, at least 99%, at least 99.1%, at least 99.2%, at least 99.3%, at least 99.4%, at least 99.5%, at least 99.6%, at least 99.7%, at least 99.8%, at least 99.9%, at least 99.91%, at least 99.92%, at least 99.93%, at least 99.94%, at least 99.95%, at least 99.96%, at least 99.97%, at least 99.98%, at least 99.99%, or more, over a range of wavelengths detected by the optical spectrometer (and/or over a range of wavelengths emitted by the light source). A surface of the plurality of surfaces may have a reflectivity of at most 99.99%, at most 99.98%, at most 99.97%, at most 99.96%, at most 99.95%, at most 99.94%, at most 99.93%, at most 99.92%, at most 99.91%, at most 99.9%, at most 99.8%, at most 99.7%, at most 99.6%, at most 99.5%, at most 99.4%, at most 99.3%, at most 99.1%, at most 99.1%, at most 99%, at most 98%, at most 97%, at most 96%, at most 95%, at most 94%, at most 93%, at most 92%, at most 91%, at most 90%, at most 80%, at most 70%, at most 60%, at most 50%, at most 40%, at most 30%, at most 20%, at most 10%, at most 9%, at most 8%, at most 7%, at most 6%, at most 5%, at most 4%, at most 3%, at most 2%, at most 1%, at most 0.9%, at most 0.8%, at most 0.7%, at most 0.6%, at most 0.5%, at most 0.4%, at most 0.3%, at most 0.2%, at most 0.1%, at most 0.09%, at most 0.08%, at most 0.07%, at most 0.06%, at most 0.05%, at most 0.04%, at most 0.03%, at most 0.02%, at most 0.01%, or less, over a range of wavelengths detected by the optical spectrometer (and/or over a range of wavelengths emitted by the light source). A surface of the plurality of surfaces may have a reflectivity that is within a range defined by any two of the preceding values. Each surface of the plurality of surfaces may have different reflective properties. A prism may be a triangular prism, a square prism, a rectangular prism, a pentagonal prism, a hexagonal prism, a heptagonal prism, an octagonal prism, a nonagonal prism, a decagonal prism, or a prism having any number of sides. In a preferred embodiment, a closing plan comprises one or more square prisms. Each square prism may comprise four reflective surfaces substantially parallel to the axis of rotation. Each surface of the four surfaces may have different reflective properties. Rotating one or more of the prisms may alter the reflectivity of a part of the closing plane, thereby altering the average reflectivity of the closing plane. In some embodiments, altering the average reflectivity of the closing plane may alter the cavity gain. For example, the cavity gain of a spectrometer as disclosed herein may be controlled by rotating one or more prisms, each prism having a plurality of surfaces with different reflective properties, about one or more axes such that the surface facing the closing plane changes, wherein the surface facing the closing plane reflects light off the closing plane. The closing plane 1600 may comprise a dynamically adjustable surface. The dynamically adjustable surface may comprise a plurality of reflective surfaces. The dynamically adjustable surface may comprise a reflective surface with variable reflectivity.

The closing plane may comprise one or more apertures. The closing plane may comprise a plurality of apertures. For instance, the closing plane may comprise at least 1, at least 2, at least 3, at least 4, at least 5, at least 6, at least 7, at least 8, at least 9, at least 10, or more apertures. The closing plane may comprise at most 10, at most 9, at most 8, at most 7, at most 6, at most 5, at most 4, at most 3, at most 2, or at most 1 apertures. The closing plane may comprise a number of apertures that is within a range defined by any two of the preceding values. The one or more apertures may be sized for placement of the one or more light sources. The one or more apertures may be sized for placement of the optical spectrometer.

The light source may be configured to emit light within a light cone having a half-angle. The half-angle may be at least 1 degrees, at least degrees, at least 3 degrees, at least 4 degrees, at least 5 degrees, at least 6 degrees, at least 7 degrees, at least 8 degrees, at least 9 degrees, at least 10 degrees, at least 15 degrees, at least 20 degrees, at least 25 degrees, at least 30 degrees, at least 35 degrees, at least 40 degrees, at least 45 degrees, at least 50 degrees, at least 55 degrees, at least 60 degrees, at least 65 degrees, at least 70 degrees, at least 75 degrees, at least 80 degrees, at least 81 degrees, at least 82 degrees, at least 83 degrees, at least 84 degrees, at least 85 degrees, at least 86 degrees, at least 87 degrees, at least 88 degrees, at least 89 degrees, or more. The light source The half-angle may be at most 89 degrees, at most 88 degrees, at most 87 degrees, at most 86 degrees, at most 85 degrees, at most 84 degrees, at most 83 degrees, at most 82 degrees, at most 81 degrees, at most 80 degrees, at most 75 degrees, at most 70 degrees, at most 65 degrees, at most 60 degrees, at most 55 degrees, at most 50 degrees, at most 45 degrees, at most 40 degrees, at most 35 degrees, at most 30 degrees, at most 25 degrees, at most 20 degrees, at most 15 degrees, at most 10 degrees, at most 9 degrees, at most 8 degrees, at most 7 degrees, at most 6 degrees, at most 5 degrees, at most 4 degrees, at most 3 degrees, at most 2 degrees, at most 1 degrees, or less. The half-angle may be within a range defined by any two of the preceding values.

The one or more light sources may have a bandwidth of at least 1 nanometer (nm), at least 2 nm, at least 3 nm, at least 4 nm, at least 5 nm, at least 6 nm, at least 7 nm, at least 8 nm, at least 9 nm, at least 10 nm, at least 20 nm, at least 30 nm, at least 40 nm, at least 50 nm, at least 60 nm, at least 70 nm, at least 80 nm, at least 90 nm, at least 100 nm, at least 200 nm, at least 300 nm, at least 400 nm, at least 500 nm, at least 600 nm, at least 700 nm, at least 800 nm, at least 900 nm, at least 1,000 nm, or more. The one or more light sources may have a bandwidth of at most 1,000 nm, at most 900 nm, at most 800 nm, at most 700 nm, at most 600 nm, at most 500 nm, at most 400 nm, at most 300 nm, at most 200 nm, at most 100 nm, at most 90 nm, at most 80 nm, at most 70 nm, at most 60 nm, at most 50 nm, at most 40 nm, at most 30 nm, at most 20 nm, at most 10 nm, at most 9 nm, at most 8 nm, at most 7 nm, at most 6 nm, at most 5 nm, at most 4 nm, at most 3 nm, at most 2 nm, at most 1 nm, or less. The one or more light sources may have a bandwidth that is within a range defined by any two of the preceding values.

The optical spectrometer may be configured to detect light within a light cone having a half-angle. The half-angle may be at least 1 degrees, at least degrees, at least 3 degrees, at least 4 degrees, at least 5 degrees, at least 6 degrees, at least 7 degrees, at least 8 degrees, at least 9 degrees, at least 10 degrees, at least 15 degrees, at least 20 degrees, at least 25 degrees, at least 30 degrees, at least 35 degrees, at least 40 degrees, at least 45 degrees, at least 50 degrees, at least 55 degrees, at least 60 degrees, at least 65 degrees, at least 70 degrees, at least 75 degrees, at least 80 degrees, at least 81 degrees, at least 82 degrees, at least 83 degrees, at least 84 degrees, at least 85 degrees, at least 86 degrees, at least 87 degrees, at least 88 degrees, at least 89 degrees, or more. The light source The half-angle may be at most 89 degrees, at most 88 degrees, at most 87 degrees, at most 86 degrees, at most 85 degrees, at most 84 degrees, at most 83 degrees, at most 82 degrees, at most 81 degrees, at most 80 degrees, at most 75 degrees, at most 70 degrees, at most 65 degrees, at most 60 degrees, at most 55 degrees, at most 50 degrees, at most 45 degrees, at most 40 degrees, at most 35 degrees, at most 30 degrees, at most 25 degrees, at most 20 degrees, at most 15 degrees, at most 10 degrees, at most 9 degrees, at most 8 degrees, at most 7 degrees, at most 6 degrees, at most 5 degrees, at most 4 degrees, at most 3 degrees, at most 2 degrees, at most 1 degrees, or less. The half-angle may be within a range that is defined by any two of the preceding values.

The optical spectrometer may have a bandwidth of at least 1 nm, at least 2 nm, at least 3 nm, at least 4 nm, at least 5 nm, at least 6 nm, at least 7 nm, at least 8 nm, at least 9 nm, at least 10 nm, at least 20 nm, at least 30 nm, at least 40 nm, at least 50 nm, at least 60 nm, at least 70 nm, at least 80 nm, at least 90 nm, at least 100 nm, at least 200 nm, at least 300 nm, at least 400 nm, at least 500 nm, at least 600 nm, at least 700 nm, at least 800 nm, at least 900 nm, at least 1,000 nm, or more. The optical spectrometer may have a bandwidth of at most 1,000 nm, at most 900 nm, at most 800 nm, at most 700 nm, at most 600 nm, at most 500 nm, at most 400 nm, at most 300 nm, at most 200 nm, at most 100 nm, at most 90 nm, at most 80 nm, at most 70 nm, at most 60 nm, at most 50 nm, at most 40 nm, at most 30 nm, at most 20 nm, at most 10 nm, at most 9 nm, at most 8 nm, at most 7 nm, at most 6 nm, at most 5 nm, at most 4 nm, at most 3 nm, at most 2 nm, at most 1 nm, or less. The optical spectrometer may have a bandwidth that is within a range defined by any two of the preceding values.

The optical spectrometer may have a first area (such as a detection area that is sensitive to light received by the optical spectrometer) and the sample may have a second area. A ratio of the second area to the first area may be at least 1, at least 2, at least 3, at least 4, at least 5, at least 6, at least 7, at least 8, at least 9, at least 10, at least 20, at least 30, at least 40, at least 50, at least 60, at least 70, at least 80, at least 90, at least 100, at least 200, at least 300, at least 400, at least 500, at least 600, at least 700, at least 800, at least 900, at least 1,000, or more. A ratio of the second area to the first area may be at most 1,000, at most 900, at most 800, at most 700, at most 600, at most 500, at most 400, at most 300, at most 200, at most 100, at most 90, at most 80, at most 70, at most 60, at most 50, at most 40, at most 30, at most 20, at most 10, at most 9, at most 8, at most 7, at most 6, at most 5, at most 4, at most 3, at most 2, at most 1, or less. A ratio of the second are to the first area may be within a range defined by any two of the preceding values.

The inner surface and the outer surface may define the boundaries of an encasement. The encasement may partially or completely enclose the one or more light sources. The encasement may partially or completely enclose the optical spectrometer. Thus, a system for improving an optical spectrum may comprise an optical spectrometer as described herein, a light source as described herein, and an encasement. The encasement may comprise an outer surface in optical communication with a sample, as described herein. The encasement may further comprise an inner surface defining a cavity and partially or completely enclosing the light source and the optical spectrometer in the cavity, as described herein. The inner surface may be in optical communication with the sample. The encasement may comprise a closing plane defined by the cavity, as described herein. The encasement may be disposed relative to each of the optical spectrometer and the one or more light sources such that light emitted by the light source achieve a plurality of optical interactions with a sample before being received by the optical spectrometer. The cavity may be placed in a measurement volume filled by a sample. The measurement volume may be disposed below the closing plane. The measurement volume may be disposed above the closing plane. The measurement volume may be disposed alongside the closing plane, such that the closing plane is oriented with any possible angle to the measurement volume. The measurement volume may be partially or completely enclosed by the encasement. The system may further comprise an external light source. The system may further comprise an external optical sensor configured to image the encasement during activation of the light source. In some embodiments, the system may comprise an image sensor, for example a camera. The image sensor may be configured to image the sample. In some embodiments, the image sensor may be configured to image a sample shape, morphology, size, color, purity, uniformity, degree of damage, or any other parameter that may be imaged optically.

The encasement may have any shape. For instance, the encasement may have a spherical, hemi-spherical, cylindrical, or tubular shape. The encasement may have the same shape as the inner surface or outer surface.

The encasement may have any reflectivity or transmissivity. For instance, the encasement may have any reflectivity or transmissivity described herein with respect to the inner surface of the accessory.

Any possible portion of light emitted by the light source may penetrate the sample and reach the encasement. For instance, at least 0.1%, at least 0.2%, at least 0.3%, at least 0.4%, at least 0.5%, at least 0.6%, at least 0.7%, at least 0.8%, at least 0.9%, at least 1%, at least 2%, at least 3%, at least 4%, at least 5%, at least 6%, at least 7%, at least 8%, at least 9%, at least 10%, at least 20%, at least 30%, at least 40%, at least 50%, at least 60%, at least 70%, at least 80%, at least 90%, at least 91%, at least 92%, at least 93%, at least 94%, at least 95%, at least 96%, at least 97%, at least 98%, at least 99.1%, at least 99.2%, at least 99.3%, at least 99.4%, at least 99.5%, at least 99.6%, at least 99.7%, at least 99.8%, at least 99.9%, or more of the light emitted by the light source may penetrate the sample and reach the encasement, At most 99.9%, at most 99.8%, at most 99.7%, at most 99.6%, at most 99.5%, at most 99.4%, at most 99.3%, at most 99.2%, at most 99.1%, at most 99%, at most 98%, at most 97%, at most 96%, at most 95%, at most 94%, at most 93%, at most 92%, at most 91%, at most 90%, at most 80%, at most 70%, at most 60%, at most 50%, at most 40%, at most 30%, at most 20%, at most 10%, at most 9%, at most 8%, at most 7%, at most 6%, at most 5%, at most 4%, at most 3%, at most 2%, at most 1%, at most 0.9%, at most 0.8%, at most 0.7%, at most 0.6%, at most 0.5%, at most 0.4%, at most 0.3%, at most 0.2%, at most 0.1%, or less of the light emitted by the light source may penetrate the sample and reach the encasement. A portion of light emitted by the light source that is within a range defined by any two of the preceding values may penetrate the sample and reach the encasement.

Figure 11:
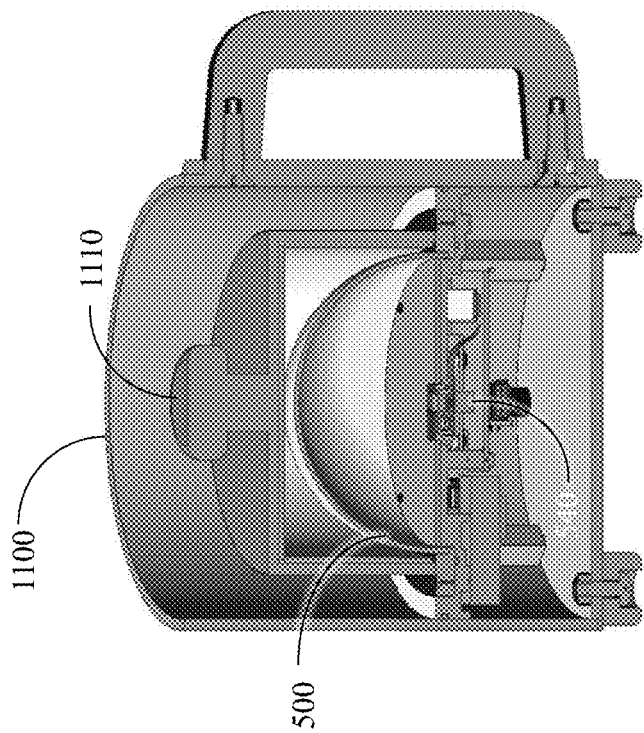
FIG. 11 is a schematic diagram of an exemplary cup accessory for improving sensitivity or efficiency of an optical spectrometer, in accordance with the embodiments of the present disclosure.
Figure 11:
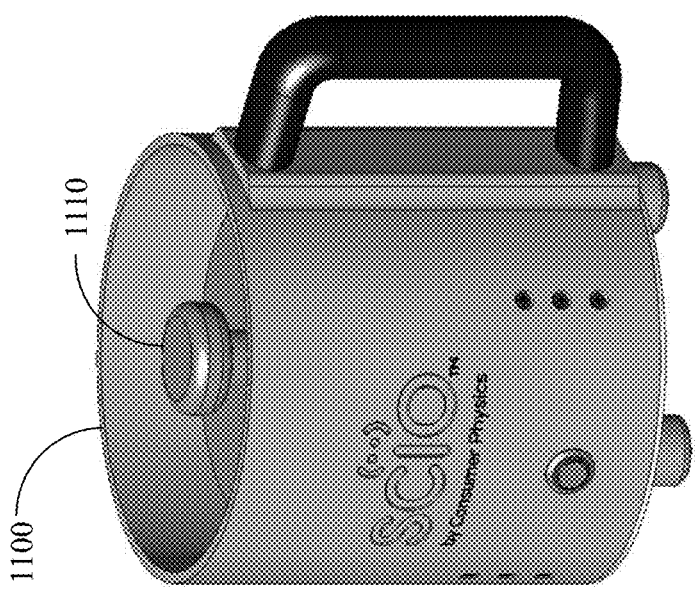
Figure 12:
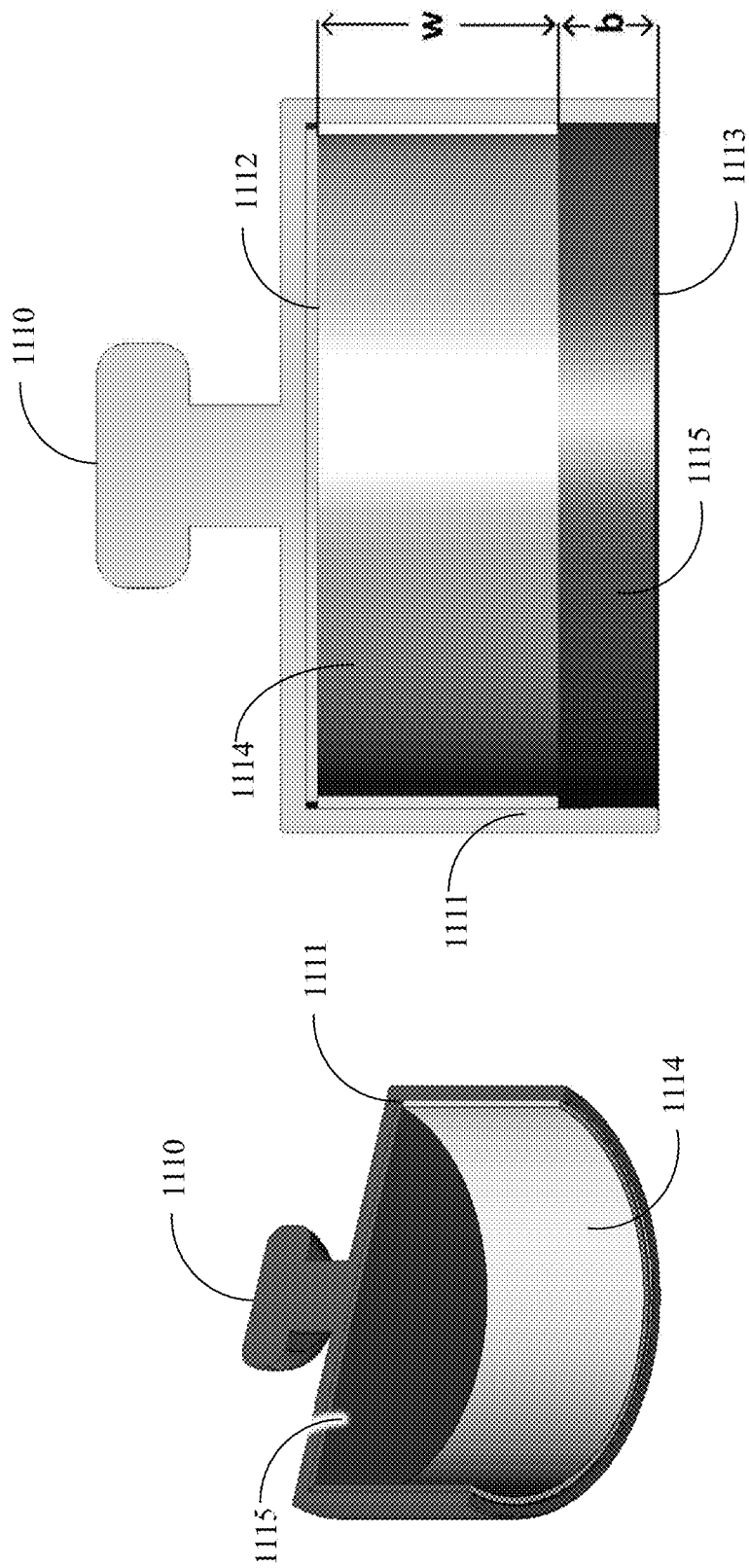
FIG. 12 is a schematic diagram of an exemplary calibration cup accessory for improving sensitivity or efficiency of an optical spectrometer, in accordance with the embodiments of the present disclosure.

The encasement may be configured to allow a calibration of the spectrometer and/or the light source in the absence of a sample. In some embodiments, calibration of the spectrometer and/or the light source in the absence of a sample may be performed using a calibration accessory, for example a calibration cup accessory 1110 as depicted in FIG. 11 and FIG. 12. The calibration cup accessory may be compatible with any of the optical spectrometer devices disclosed herein. In some embodiments, the calibration cup accessory is configured to fit inside a cup-shaped sample holder 1100, as depicted in FIG. 11. The calibration cup accessory 1110 may comprise a cylinder 1111. The cylinder 1111 may comprise a closed end 1112 and an open end 1113. The cylinder 1111 may have a diameter greater than a diameter of a hemispherical accessory 500, such that the calibration cup accessory 1110 may be placed over the hemispherical accessory 500. In some embodiments, the calibration cup accessory 1110 may surround the hemispherical accessory 500. In some embodiments, the calibration cup accessory 1110 comprises an optically absorptive material 1115. The calibration cup accessory 1110 may be made from the optically absorptive material 1115, or the calibration cup accessory may be coated by the optically absorptive material. The optically absorptive material may comprise acrylonitrile butadiene styrene (ABS), absorptive paint, or anodized metal. In some embodiments, the optically absorptive material may be black. The cylinder 1111 may comprise an optically reflective material 1114. The optically reflective material may coat at least part of the inner surface of the cylinder 1111. The optically reflecting material 1114 may coat part of the optically absorptive material 1115. In some embodiments, the optically reflective material may coat a part of an interior surface of the cylinder, for example the surface denoted by "w" in FIG. 12. In some embodiments, the optically reflective material may comprise a diffusive material. For example, the optically reflective material may comprise polytetrafluoroethylene (PFTE), paint, or a fluoropolymer (e.g., Spectralon®). In some embodiments, the optically reflective material may be white. In some embodiments, the optically absorptive material 1115 is at least partially exposed. The optically absorptive material may be exposed on part of an interior surface of the cylinder 1111, for example as denoted by "b" in FIG. 12.

The encasement may further comprise a temperature sensor configured to measure a temperature of the sample. Temperature measurements received by the temperature sensor may be used to provide enhanced chemometric models of the samples measured using the optical spectrometer.

The encasement may further comprise a weight sensor configured to measure a weight of the sample. The weight sensor may comprise one or more force sensors. The weight sensor may comprise one or more strain sensors. The weight of the sample may be used to determine additional sample properties. For example, the weight of the sample may be used to determine a sample density, a sample mass, a sample water content, a sample concentration, a sample purity, a sample composition, or a sample volume.

The encasement may comprise any number of ports (such as sample input or sample output ports). For instance, the encasement may comprise at least 1, at least 2, at least 3, at least 4, at least 5, at least 6, at least 7, at least 8, at least 9, at least 10, or more ports. The encasement may comprise at most 10, at most 9, at most 8, at most 7, at most 6, at most 5, at most 4, at most 3, at most 2, at most 1, or fewer ports. The encasement may comprise a number of ports that is within a range defined by any two of the preceding values.

The encasement may comprise any number of shutters. For instance, the encasement may comprise at least 1, at least 2, at least 3, at least 4, at least 5, at least 6, at least 7, at least 8, at least 9, at least 10, or more shutters. The encasement may comprise at most 10, at most 9, at most 8, at most 7, at most 6, at most 5, at most 4, at most 3, at most 2, at most 1, or fewer shutters. The encasement may comprise a number of shutters that is within a range defined by any two of the preceding values.

An optimal encasement may act to increase the amount of the sample that interacts with the light emitted by the light source (for instance, by increasing the surface area or volume of the sample that interacts with the light emitted by the light source). A gap between the outer surface and the encasement may be small enough that a portion of the light emitted by the light source passes through the sample volume and illuminates the sample far from the inner surface. The gap may be large enough to allow for good flow and fill of the sample in the sampling volume between the outer surface and the encasement. The entire accessory may be tilted to provide good flow and fill of the sample in the sample volume.

Figure 15:
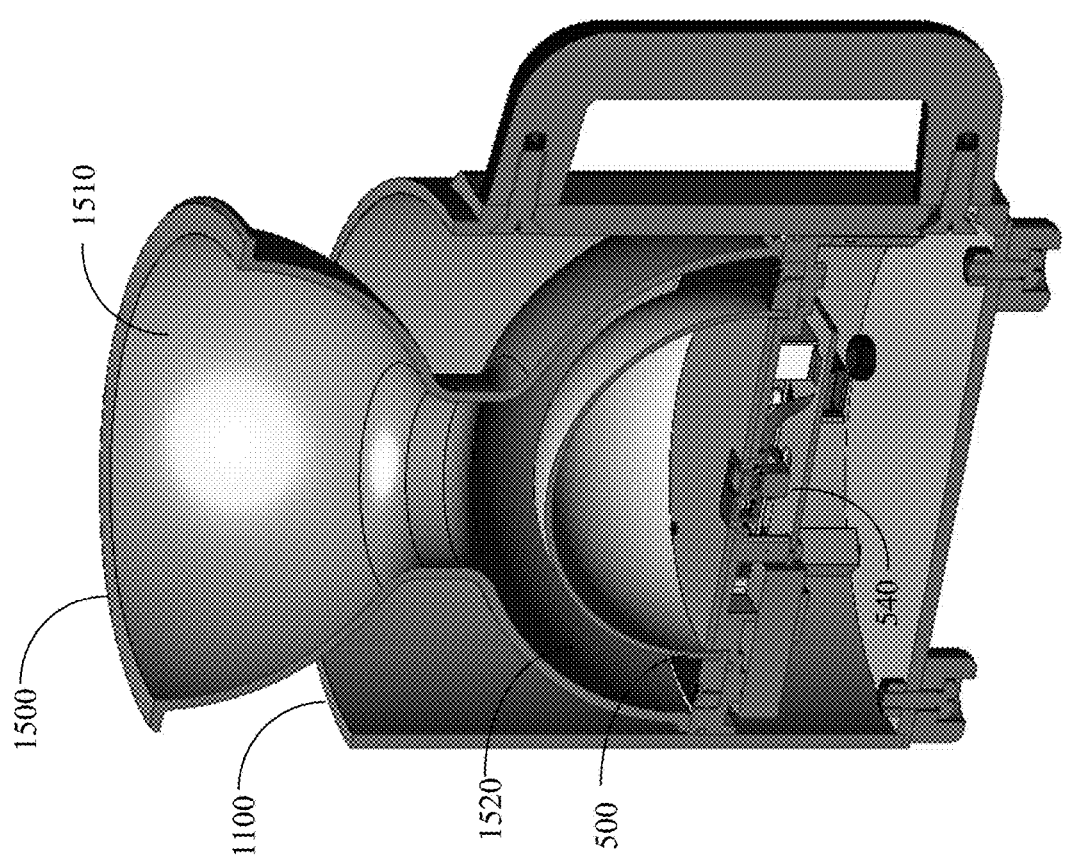
FIG. 15 is a schematic diagram of an exemplary small sample accessory for improving sensitivity or efficiency of an optical spectrometer, in accordance with the embodiments of the present disclosure.

The optical spectrometer may comprise a sample holder surrounding all or part of the encasement. The sample holder may be configured to hold the sample in the sample volume. The sample holder may be configured to contain, position, or distribute the sample around the spectrometer or spectrometer accessory and maintain the sample in the sample volume in optical communication with the optical spectrometer. The sample holder may be configured to hold a solid sample. The sample holder may be configured to hold a powder sample. The sample holder may be configured to hold a liquid sample. The sample holder may be configured to hold a gaseous sample. The sample holder may be interchangeable with a second sample holder. In some embodiments, the sample holder may be a cup-shaped sample holder 1100, as shown in FIG. 15. The sample holder may comprise a sample size adaptor 1500 configured to reduce the amount of sample in the sample holder while maintaining the amount of sample in optical communication with the optical spectrometer. The sample size adaptor may be inserted into the sample holder. The sample size adaptor may comprise a sample container 1520. The sample volume 1520 may be configured to fully or partially surround a hemispherical accessory 500. The sample volume may be hemispherical. The sample container may have a diameter that is larger than the diameter of the hemispherical accessory. The sample container may further comprise a funnel 1510. The funnel may comprise a wide end and a narrow end. The wide end may be open to allow sample insertion, and the narrow end may be connected to the sample container. The funnel may be configured to reduce sample loss while inserting the sample into the sample container.

Figure 17:
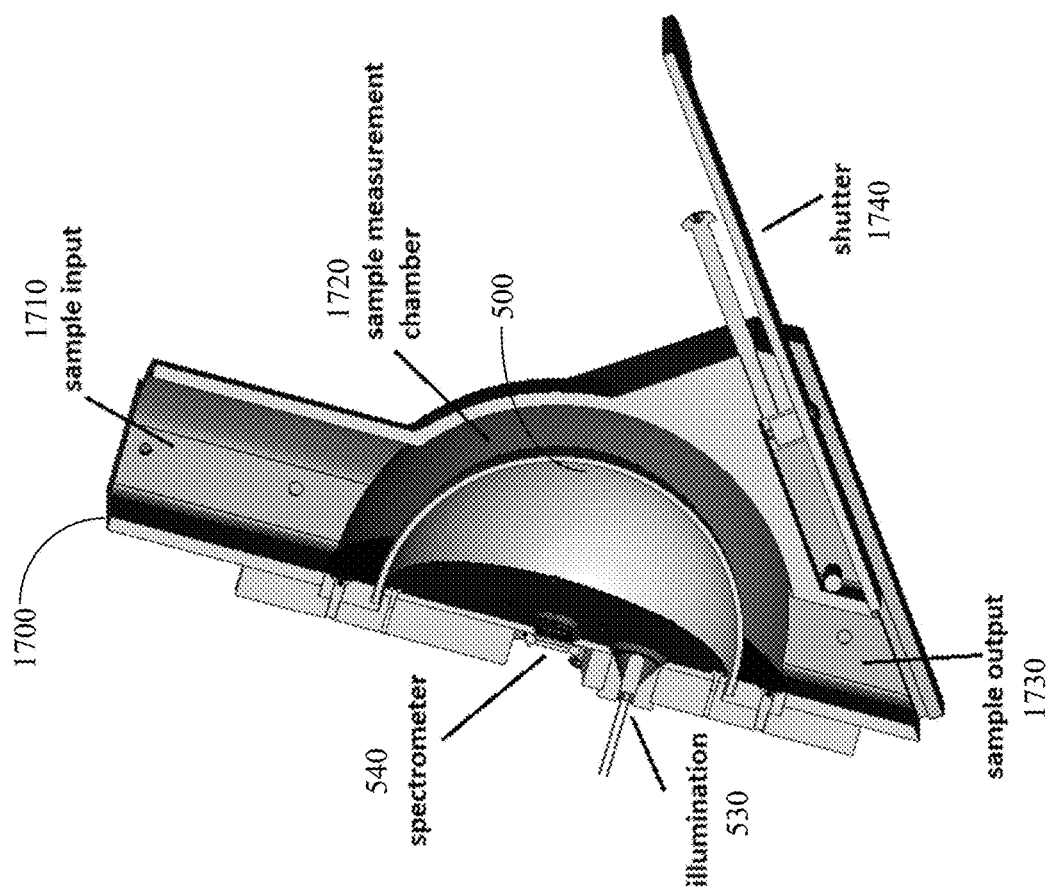
FIG. 17 is a schematic diagram of an exemplary sample flow accessory for improving sensitivity or efficiency of an optical spectrometer, in accordance with the embodiments of the present disclosure.

A sample holder may be configured to hold or direct a flowing sample. In some embodiments, a sample holder may be configured to direct a flowing sample through a spectrometer device. A flowing sample may comprise a liquid, a gas, a powder, and/or a plurality of small particles. FIG. 17 is a schematic diagram of an exemplary sample flow accessory 1700 which may serve as a sample holder to direct a flowing sample over a spectrometer 540 or a spectrometer accessory 500, as described elsewhere herein. In some embodiments, the sample flow accessory 1700 may be configured to direct a flowing sample from the sample input 1710 through a sample measurement chamber 1720, toward a sample output 1730. A sample in the sample measurement chamber 1720 may be in optical communication with spectrometer accessory 500, the illumination source 530, and/or the spectrometer 540. In some embodiments, the sample flow accessory further comprises a shutter 1740. The shutter may be configured to allow a sample to flow while the shutter is open and slow or stop the sample flow when the shutter is closed. In some embodiments, the flow rate of the sample may be tuned by incrementally opening or closing the shutter. The sample may be measured while flowing, for example while the shutter is open or partially open. The sample may be measured while the sample is not flowing, for example while the shutter is closed. The sample is measured continuously. The sample may be measured intermittently. In some embodiments, the sample remains substantially still during the measurement period. For example, sample flow may be controlled by a mechanical shutter, wherein the sample is imaged while the shutter is closed. The shutter may be opened and closed intermittently, and the sample may be measured intermittently.

An outer surface of a spectrometer accessory, for example outer surface 510 as described with respect to FIG. 5, may comprise a coating. The coating may be an optically transparent layer. In some embodiments, the coating comprises a conductive layer or conductive mesh. The conducting layer may comprise indium tin oxide (ITO), aluminum-doped zinc oxide (AZO), indium-doped cadmium oxide, gallium-doped zinc oxide (GZO), indium-doped zinc oxide (IZO), a carbon nanotube, a conductive polymers (ICP), or metal nanoparticles. In some embodiments, the coating may reduce an accumulation of static charge on the spectrometer or spectrometer accessory. For example, an outer surface of the spectrometer accessory may be coated with an optically transparent conductive layer to prevent accumulation of static charge caused by relative motions of a dry sample. Preventing accumulation of static charge on the spectrometer or spectrometer accessory may reduce the adherence of particles, for example dust or sample residue, to the outer surface.

FIG. 6 is a schematic diagram of an exemplary inverted hemispherical accessory 500 for improving sensitivity or efficiency of an optical spectrometer. As depicted in FIG. 6, accessory 500 may be inverted for insertion into a sample. An inverted accessory may be especially useful for performing optical spectroscopy of a liquid sample. The inverted accessory may comprise a sample holder surface 560. The sample holder surface may be in contact with the sample. The sample holder surface may be in optical communication with the sample 550, the optical spectrometer 540, and/or the light source 530*a* or 530*b*. In some embodiments, the sample holder surface 560 of the hemispherical accessory 500 may be reflective. The reflectivity of the sample holder surface may be increased to increase the optical signal strength when measuring a liquid sample. For example, the sample holder surface may comprise a spectrally flat and/or highly reflective material. In some embodiments, the highly reflective material may be polytetrafluoroethylene (PFTE), paint, or a fluoropolymer (e.g., Spectralon®). The reflective sample holder surface may be covered by a protective layer to prevent contamination from a liquid sample. The protective layer may be an optically transparent layer. For example, the protective layer may be glass, quartz, a transparent polymer, or any other optically transparent material.

FIG. 7 is a schematic diagram of an exemplary cylindrical or tubular accessory 500 for improving sensitivity or efficiency of an optical spectrometer. As depicted in FIG. 7, accessory 500 may comprise a cylindrical or tubular form. An example optical path 580 is illustrated.

FIG. 8 is a schematic diagram of an exemplary cylindrical or tubular accessory comprising an opening for improving sensitivity or efficiency of an optical spectrometer. As depicted in FIG. 8, accessory 500 may comprise a generally cylindrical or tubular form. In comparison with the embodiment depicted in FIG. 7, the accessory 500 may be partially open to the environment or in partial contact with a sample.

Figure 9:
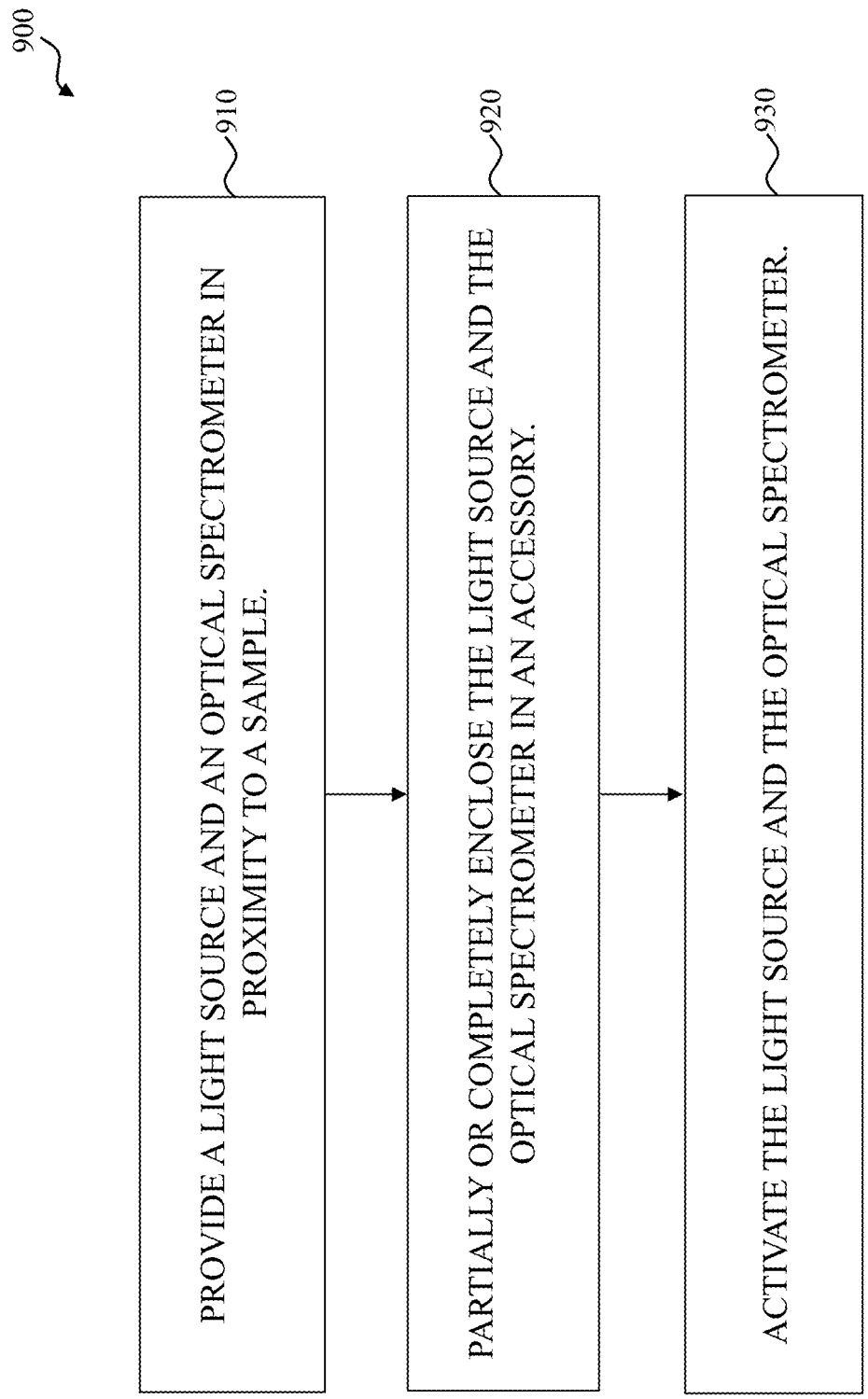
FIG. 9 is a flowchart for a method for improving sensitivity or efficiency of an optical spectrometer, in accordance with embodiments of the present disclosure.

FIG. 9 is a flowchart for a method 900 for improving sensitivity or efficiency of an optical spectrometer. The optical spectrometer may be any optical spectrometer described herein. In a first operation 910, the method 900 may comprise providing a light source and an optical spectrometer in proximity to a sample. The light source may be any light source described herein. The optical spectrometer may be any optical spectrometer described herein. The sample may be any sample described herein.

In a second operation 920, the method 900 may comprise partially or completely enclosing the light source and the optical spectrometer in an accessory. The accessory may comprise any accessory described herein, such as accessory 500 as described herein with respect to FIG. 5, FIG. 6, FIG. 7, and FIG. 8. The accessory may comprise an outer surface in optical communication with a sample. The accessory may comprise an inner surface configured to partially or completely enclose the light source and the optical spectrometer and to direct light emitted by the light source to optically interact with the sample a plurality of times before being received by the optical spectrometer. The inner surface may be in optical communication with the sample.

In a third operation 930, the method 900 may comprise activating the light source and the optical spectrometer.

The method 900 may further comprise calibrating the accessory. Calibrating the accessory may comprise providing the light source and the optical spectrometer in proximity to a reference sample, partially or completely enclosing the light source and the optical spectrometer in the accessory, and activating the light source and the optical spectrometer to generate reference data.

Calibrating the accessory may comprise providing a reference accessory, partially or completely enclosing the light source and the optical spectrometer in the reference accessory, and activating the light source and the optical spectrometer to generate reference data. The reference accessory may comprise a reference sample. In some embodiments, calibrating the accessory may comprise positioning a calibration cup accessory 1110 over the light source and the optical spectrometer 540. For example, the calibration cup accessory 1110 may be positioned to partially or completely enclose the light source and the optical spectrometer 540, as depicted in FIG. 11. The reference sample may comprise the optically reflective material 1114. In some embodiments, an average reflectivity of the calibration cup may be configured to match a reflectivity of a sample. For example, the average reflectivity of the calibration cup may be configured to match the reflectivity of a sample by exposing part of the optically absorptive material 1115 to the spectrometer. In some embodiments, the calibration cup accessory may be positioned over a hemispherical accessory 500, as shown in FIG. 11 and may reflect light from the light source. In some embodiments, the calibration cup accessory may be configured to compensate for light losses light losses in the glass dome of the hemispherical accessory. For example, the calibration cup accessory may be configured such that the typical number of times the light passes through a glass dome of the hemispherical accessory during calibration is similar to the typical number of times the light passes through the glass dome during sample measurement.

The optically absorptive material 1115 may be configured to direct light reflected, scattered, diffracted, or diffused by the optically reflective material 1114 before being received by the optical spectrometer. The optical interactions may comprise any possible interaction of the light with the optically reflective material. For instance, the optical interactions may comprise reflection, absorption, elastic scattering, inelastic scattering, diffraction, or any other linear or non-linear optical interaction, The inner surface may be configured to direct light emitted by the one or more light sources to achieve at least 1, at least 2, at least 3, at least 4, at least 5, at least 6, at least 7, at least 8, at least 9, at least 10, at least 20, at least 30, at least 40, at least 50, at least 60, at least 70, at least 80, at least 90, at least 100, at least 200, at least 300, at least 400, at least 500, at least 600, at least 700, at least 800, at least 900, at least 1,000, or more optical interactions with the sample before being received by the optical spectrometer. The inner surface may be configured to direct light emitted by the one or more light sources to achieve at most 1,000, at most 900, at most 800, at most 700, at most 600, at most 500, at most 400, at most 300, at most 200, at most 100, at most 90, at most 80, at most 70, at most 60, at most 50, at most 40, at most 30, at most 20, at most 10, at most 90, at most 80, at most 70, at most 60, at most 50, at most 40, at most 30, at most 20, at most 10, at most 9, at most 8, at most 7, at most 6, at most 5, at most 4, at most 3, at most 2, or at most 1 optical interactions with the optically reflective material before being received by the optical spectrometer. The inner surface may be configured to direct light emitted by the one or more light sources to achieve a number of optical interactions with the optically reflective material that is within a range defined by any two of the preceding values before being received by the optical spectrometer. In some instances, most of the light emitted by the one or more light sources may achieve such multiple optical interactions with the sample before being received by the optical spectrometer. In some instances, the inner surface may be configured to increase an optical path length by at least 1 times, at least 2 times, at least 3 times, at least 4 times, at least 5 times, at least 6 times, at least 7 times, at least 8 times, at least 9 times, at least 10 times, at least 20 times, at least 30 times, at least 40 times, at least 50 times, at least 60 times, at least 70 times, at least 80 times, at least 90 times, at least 100 times, or more, with respect to an optical path length of a single reflection. The inner surface may be configured to increase an optical path length by at most 100 times, at most 90 times, at most 80 times, at most 70 times, at most 60 times, at most 50 times, at most 40 times, at most 30 times, at most 20 times, at most 10 times, at most 9 times, at most 8 times, at most 7 times, at most 6 times, at most 5 times, at most 4 times, at most 3 times, at most 2 times, at most 1 time, or less. The inner surface may be configured to increase an optical path length by a number of times that is within a range defined by any two of the preceding values.

The reference sample may comprise a polytetrafluoroethylene (PTFE) sample.

Calibrating the accessory may occur prior to any one or more of operations 910, 920, and 930. Calibrating the accessory may occur subsequent to any one or more of operations 910, 920, and 930.

The method 900 may further comprise, subsequent to operation 930, generating sample data and processing the sample data with the reference data to calibrate the sample data.

The method 900 may further comprise, subsequent to operation 930, generating sample data, measuring sample temperature to generate sample temperature data, and processing the sample data with the sample temperature data to compensate for temperature-related spectral variations.

The systems, devices, spectrometers, and accessories of the present disclosure may be integrated into a larger system. For example, a system may comprise the device described herein and an instrument coupled or otherwise integrated to the device. In some embodiments, a device as disclosed herein may be integrated into a tool configured to perform additional actions. For example, the tool may be configured to interface or perform one or more actions on the sample that is measured or monitored by the devices of the present disclosure.

The device may be coupled to the instrument via one or more fastening mechanisms described herein. Examples of fastening mechanisms may include, but are not limited to, complementary threading, form-fitting pairs, hooks and loops, latches, threads, screws, staples, clips, clamps, prongs, rings, brads, rubber bands, rivets, grommets, pins, ties, snaps, hook and loop fasteners (e.g., Velcro), adhesives (e.g., glue), tapes, vacuum, seals, magnets, magnetic seals, a combination thereof, or any other types of fastening mechanisms. Alternatively, the device may be integrally part of the instrument. For example, the device can be monolithically built into the instrument, or vice versa.

In some instances, the device and the instrument can be fastened to each other via complementary fastening units. For example, the device and the instrument can complete a form-fitting pair. The device can comprise a form-fitting male component and the instrument can comprise a form-fitting female component, and/or vice versa. In some instances, an outer diameter of a protrusion-type fastening unit of the device can be substantially equal to an inner diameter of a depression-type fastening unit of the instrument, or vice versa, to form an interference fit. Alternatively or in addition, the device and instrument can comprise other types of complementary units or structures (e.g., hook and loop fasteners, latches, snaps, buttons, nuts and bolts, magnets, etc.) that can be fastened together. Alternatively or in addition, the device and instrument can be fastened using other fastening mechanisms, such as but not limited to staples, clips, clamps, prongs, rings, brads, rubber bands, rivets, grommets, pins, ties, snaps, hook and loop fasteners (e.g., Velcro), adhesives (e.g., glue), magnets or magnetic fields, tapes, a combination thereof, or any other types of fastening mechanisms.

In some instances, the device and the instrument can be fastened to each other via an intermediary structure. The intermediary structure may be a linker or connector between the device and the instrument. In some instances, the intermediary structure may be fastened to one or both of the device and the instrument through one or more of any of the fastening mechanisms described herein. The intermediary structure may be solid. The intermediary structure may be liquid or gas. The intermediary structure may be a gel. In some instances, the intermediary structure may be applied as one phase (e.g., liquid) and transform into another phase (e.g., solid) after passage of time such as to achieve the fastening. For example, the intermediary structure may comprise a fluid adhesive that solidifies to achieve the fastening. In some instances, the intermediary structure may be capable of transforming from a first phase to a second phase, such as from liquid to solid or from solid to liquid, upon application of a stimulus (e.g., thermal change, pH change, pressure change, magnetic field, electric field, etc.) to achieve fastening or unfastening (or both). In some instances, the device and/or the instrument may comprise the intermediary structure. For example, the intermediary structure may be integral to the device and/or the instrument. In some instances, the device and/or the instrument, in part or entirely, may be capable of transforming from a first phase to a second phase, such as from liquid to solid or from solid to liquid, upon application of a stimulus (e.g., thermal change, pH change, pressure change, magnetic field, electric field, etc.) to achieve fastening or unfastening (or both).

The fastening between the device and the instrument can be temporary, such as to allow for subsequent unfastening of the device and instrument without damage (e.g., permanent deformation, disfigurement, etc.) to the device and instrument or with minimal damage. In some cases, the fastening and unfastening can be readily repeatable any number of times with no, or minimal, damage to both the device and instrument to permit independent mobility and replacement of one or both of the device and the instrument when not fastened together (e.g., as an assembly).

Alternatively, the fastening can be permanent, such as to allow for subsequent unfastening of the device and instrument only by damaging at least one of the device and instrument. One of the device and instrument, or both, can be temporarily or permanently deformed (e.g., stretched, compressed, etc.) and/or disfigured (e.g., bent, wrinkled, folded, creased, etc.) or otherwise manipulated when fastened to each other or during fastening. In some instances, one or both of the device and instrument can be cut into or pierced by the other when the device and instrument are fastened together.

Figure 10:
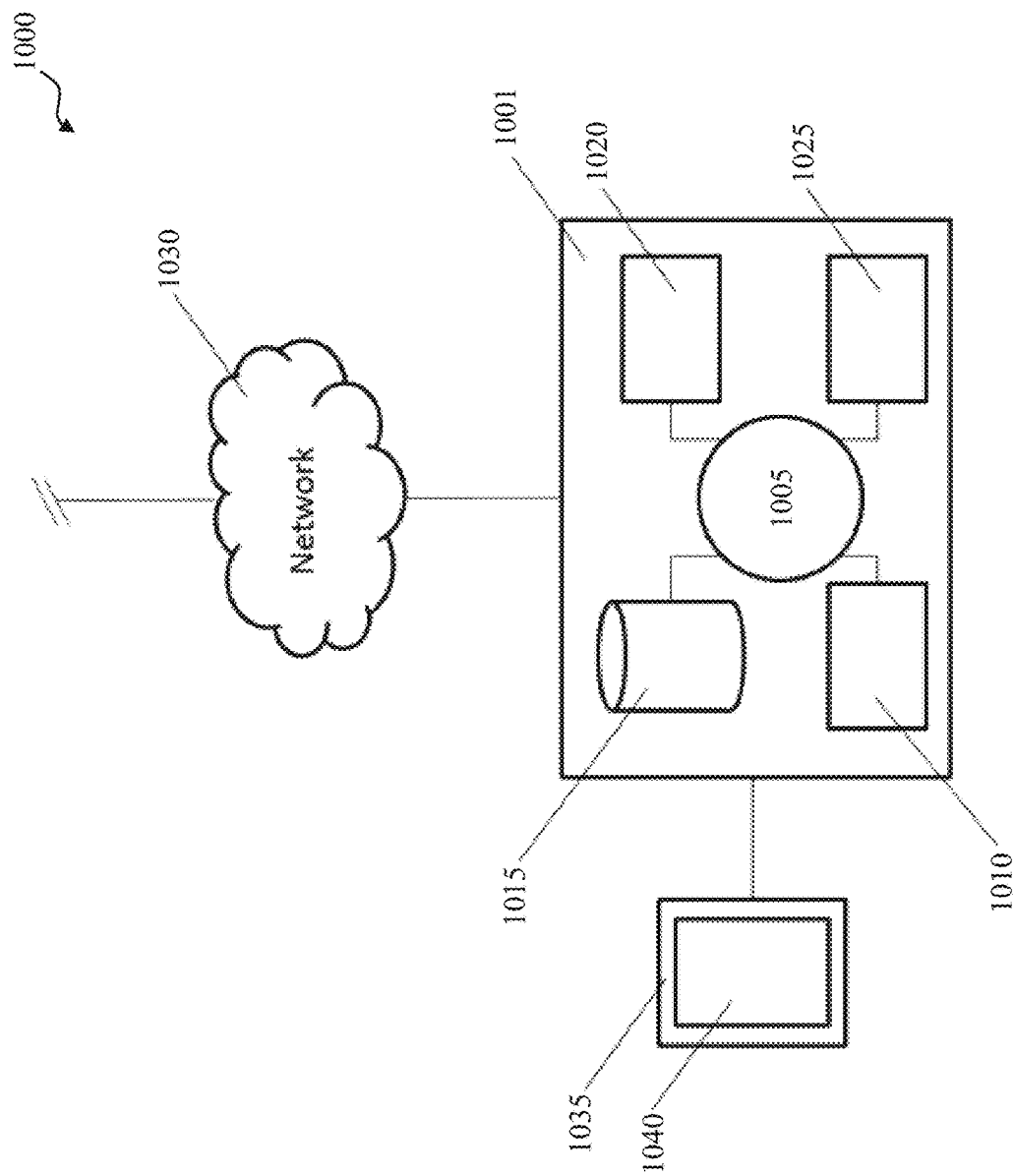
FIG. 10 is a schematic diagram of an exemplary digital processing device, in accordance with the embodiments of the present disclosure.

FIG. 10 is a schematic diagram of an exemplary digital processing device, in accordance with the embodiments of the present disclosure.

Digital Processing Device

The present disclosure provides computer systems for implementing methods and devices of the present disclosure. FIG. 10 shows a computer system 1001 that is programmed or otherwise configured to operate any method or system described herein. The computer system 1001 can regulate various aspects of the present disclosure. The computer system 1001 can be an electronic device of a user or a computer system that is remotely located with respect to the electronic device. The electronic device can be a mobile electronic device.

The computer system 1001 includes a central processing unit (CPU, also "processor" and "computer processor" herein) 1005, which can be a single core or multi core processor, or a plurality of processors for parallel processing. The computer system 1001 also includes memory or memory location 1010 (e.g., random-access memory, read-only memory, flash memory), electronic storage unit 1015 (e.g., hard disk), communication interface 1020 (e.g., network adapter) for communicating with one or more other systems, and peripheral devices 1025, such as cache, other memory, data storage and/or electronic display adapters. The memory 1010, storage unit 1015, interface 1020 and peripheral devices 1025 are in communication with the CPU 1005 through a communication bus (solid lines), such as a motherboard. The storage unit 1015 can be a data storage unit (or data repository) for storing data. The computer system 1001 can be operatively coupled to a computer network ("network") 1030 with the aid of the communication interface 1020. The network 1030 can be the Internet, an internet and/or extranet, or an intranet and/or extranet that is in communication with the Internet. The network 1030 in some cases is a telecommunication and/or data network. The network 1030 can include one or more computer servers, which can enable distributed computing, such as cloud computing. The network 1030, in some cases with the aid of the computer system 1001, can implement a peer-to-peer network, which may enable devices coupled to the computer system 1001 to behave as a client or a server.

The CPU 1005 can execute a sequence of machine-readable instructions, which can be embodied in a program or software. The instructions may be stored in a memory location, such as the memory 1010. The instructions can be directed to the CPU 1005, which can subsequently program or otherwise configure the CPU 1005 to implement methods of the present disclosure. Examples of operations performed by the CPU 1005 can include fetch, decode, execute, and writeback.

The CPU 1005 can be part of a circuit, such as an integrated circuit. One or more other components of the system 1001 can be included in the circuit. In some cases, the circuit is an application specific integrated circuit (ASIC).

The storage unit 1015 can store files, such as drivers, libraries and saved programs. The storage unit 1015 can store user data, e.g., user preferences and user programs. The computer system 1001 in some cases can include one or more additional data storage units that are external to the computer system 1001, such as located on a remote server that is in communication with the computer system 1001 through an intranet or the Internet.

The computer system 1001 can communicate with one or more remote computer systems through the network 1030. For instance, the computer system 1001 can communicate with a remote computer system of a user. Examples of remote computer systems include personal computers (e.g., portable PC), slate or tablet PC's (e.g., Apple® iPad, Samsung® Galaxy Tab), telephones, Smart phones (e.g., Apple® iphone, Android-enabled device, Blackberry®), or personal digital assistants. The user can access the computer system 1001 via the network 1030.

Methods as described herein can be implemented by way of machine (e.g., computer processor) executable code stored on an electronic storage location of the computer system 1001, such as, for example, on the memory 1010 or electronic storage unit 1015. The machine executable or machine readable code can be provided in the form of software. During use, the code can be executed by the processor 1005. In some cases, the code can be retrieved from the storage unit 1015 and stored on the memory 1010 for ready access by the processor 1005. In some situations, the electronic storage unit 1015 can be precluded, and machine-executable instructions are stored on memory 1010.

The code can be pre-compiled and configured for use with a machine having a processor adapted to execute the code, or can be compiled during runtime. The code can be supplied in a programming language that can be selected to enable the code to execute in a pre-compiled or as-compiled fashion.

Aspects of the systems and methods provided herein, such as the computer system 1001, can be embodied in programming. Various aspects of the technology may be thought of as "products" or "articles of manufacture" typically in the form of machine (or processor) executable code and/or associated data that is carried on or embodied in a type of machine readable medium. Machine-executable code can be stored on an electronic storage unit, such as memory (e.g., read-only memory, random-access memory, flash memory) or a hard disk. "Storage" type media can include any or all of the tangible memory of the computers, processors or the like, or associated modules thereof, such as various semiconductor memories, tape drives, disk drives and the like, which may provide non-transitory storage at any time for the software programming. All or portions of the software may at times be communicated through the Internet or various other telecommunication networks. Such communications, for example, may enable loading of the software from one computer or processor into another, for example, from a management server or host computer into the computer platform of an application server. Thus, another type of media that may bear the software elements includes optical, electrical and electromagnetic waves, such as used across physical interfaces between local devices, through wired and optical landline networks and over various air-links. The physical elements that carry such waves, such as wired or wireless links, optical links or the like, also may be considered as media bearing the software. As used herein, unless restricted to non-transitory, tangible "storage" media, terms such as computer or machine "readable medium" refer to any medium that participates in providing instructions to a processor for execution.

Hence, a machine readable medium, such as computer-executable code, may take many forms, including but not limited to, a tangible storage medium, a carrier wave medium or physical transmission medium. Non-volatile storage media include, for example, optical or magnetic disks, such as any of the storage devices in any computer(s) or the like, such as may be used to implement the databases, etc. shown in the drawings. Volatile storage media include dynamic memory, such as main memory of such a computer platform. Tangible transmission media include coaxial cables; copper wire and fiber optics, including the wires that comprise a bus within a computer system. Carrier-wave transmission media may take the form of electric or electromagnetic signals, or acoustic or light waves such as those generated during radio frequency (RF) and infrared (IR) data communications. Common forms of computer-readable media therefore include for example: a floppy disk, a flexible disk, hard disk, magnetic tape, any other magnetic medium, a CD-ROM, DVD or DVD-ROM, any other optical medium, punch cards paper tape, any other physical storage medium with patterns of holes, a RAM, a ROM, a PROM and EPROM, a FLASH-EPROM, any other memory chip or cartridge, a carrier wave transporting data or instructions, cables or links transporting such a carrier wave, or any other medium from which a computer may read programming code and/or data. Many of these forms of computer readable media may be involved in carrying one or more sequences of one or more instructions to a processor for execution.

The computer system 1001 can include or be in communication with an electronic display 1035 that comprises a user interface (UI) 1040. Examples of UI's include, without limitation, a graphical user interface (GUI) and web-based user interface.

Methods and systems of the present disclosure can be implemented by way of one or more algorithms. An algorithm can be implemented by way of software upon execution by the central processing unit 1005. The algorithm can, for example, enact any of the systems or methods described herein.

Non-Transitory Computer Readable Storage Medium

In some embodiments, the platforms, systems, media, and methods disclosed herein include one or more non-transitory computer readable storage media encoded with a program including instructions executable by the operating system of an optionally networked digital processing device. In further embodiments, a computer readable storage medium is a tangible component of a digital processing device. In still further embodiments, a computer readable storage medium is optionally removable from a digital processing device. In some embodiments, a computer readable storage medium includes, by way of non-limiting examples, CD-ROMs, DVDs, flash memory devices, solid state memory, magnetic disk drives, magnetic tape drives, optical disk drives, cloud computing systems and services, and the like. In some cases, the program and instructions are permanently, substantially permanently, semi-permanently, or non-transitorily encoded on the media.

Computer Program

In some embodiments, the platforms, systems, media, and methods disclosed herein include at least one computer program, or use of the same. A computer program includes a sequence of instructions, executable in the digital processing device's CPU, written to perform a specified task. Computer readable instructions may be implemented as program modules, such as functions, objects, Application Programming Interfaces (APIs), data structures, and the like, that perform particular tasks or implement particular abstract data types. In light of the disclosure provided herein, those of skill in the art will recognize that a computer program may be written in various versions of various languages.

The functionality of the computer readable instructions may be combined or distributed as desired in various environments. In some embodiments, a computer program comprises one sequence of instructions. In some embodiments, a computer program comprises a plurality of sequences of instructions. In some embodiments, a computer program is provided from one location. In other embodiments, a computer program is provided from a plurality of locations. In various embodiments, a computer program includes one or more software modules. In various embodiments, a computer program includes, in part or in whole, one or more web applications, one or more mobile applications, one or more standalone applications, one or more web browser plug-ins, extensions, add-ins, or add-ons, or combinations thereof.

Web Application

In some embodiments, a computer program includes a web application. In light of the disclosure provided herein, those of skill in the art will recognize that a web application, in various embodiments, utilizes one or more software frameworks and one or more database systems. In some embodiments, a web application is created upon a software framework such as Microsoft® .NET or Ruby on Rails (RoR). In some embodiments, a web application utilizes one or more database systems including, by way of non-limiting examples, relational, non-relational, object oriented, associative, and XML database systems. In further embodiments, suitable relational database systems include, by way of non-limiting examples, Microsoft® SQL Server, mySQL™, and Oracle®. Those of skill in the art will also recognize that a web application, in various embodiments, is written in one or more versions of one or more languages. A web application may be written in one or more markup languages, presentation definition languages, client-side scripting languages, server-side coding languages, database query languages, or combinations thereof. In some embodiments, a web application is written to some extent in a markup language such as Hypertext Markup Language (HTML), Extensible Hypertext Markup Language (XHTML), or extensible Markup Language (XML). In some embodiments, a web application is written to some extent in a presentation definition language such as Cascading Style Sheets (CSS). In some embodiments, a web application is written to some extent in a client-side scripting language such as Asynchronous Javascript and XML (AJAX), Flash® Actionscript, Javascript, or Silverlight®. In some embodiments, a web application is written to some extent in a server-side coding language such as Active Server Pages (ASP), ColdFusion®, Perl, Java™, JavaServer Pages (JSP), Hypertext Preprocessor (PHP), Python™, Ruby, Tcl, Smalltalk, WebDNA®, or Groovy. In some embodiments, a web application is written to some extent in a database query language such as Structured Query Language (SQL). In some embodiments, a web application integrates enterprise server products such as IBM® Lotus Domino®. In some embodiments, a web application includes a media player element. In various further embodiments, a media player element utilizes one or more of many suitable multimedia technologies including, by way of non-limiting examples, Adobe® Flash®, HTML 5, Apple® QuickTime®, Microsoft® Silverlight®, Java™, and Unity®.

Mobile Application

In some embodiments, a computer program includes a mobile application provided to a mobile digital processing device. In some embodiments, the mobile application is provided to a mobile digital processing device at the time it is manufactured. In other embodiments, the mobile application is provided to a mobile digital processing device via the computer network described herein.

In view of the disclosure provided herein, a mobile application is created by techniques known to those of skill in the art using hardware, languages, and development environments known to the art. Those of skill in the art will recognize that mobile applications are written in several languages. Suitable programming languages include, by way of non-limiting examples, C, C++, C#, Objective-C, Java™, Javascript, Pascal, Object Pascal, Python™, Ruby, VB.NET, WML, and XHTML/HTML with or without CSS, or combinations thereof.

Suitable mobile application development environments are available from several sources. Commercially available development environments include, by way of non-limiting examples, AirplaySDK, alcheMo, Appcelerator®, Celsius, Bedrock, Flash Lite, .NET Compact Framework, Rhomobile, and WorkLight Mobile Platform. Other development environments are available without cost including, by way of non-limiting examples, Lazarus, MobiFlex, MoSync, and Phonegap. Also, mobile device manufacturers distribute software developer kits including, by way of non-limiting examples, iPhone and iPad (iOS) SDK, Android™ SDK, BlackBerry® SDK, BREW SDK, Palm® OS SDK, Symbian SDK, webOS SDK, and Windows® Mobile SDK.

Those of skill in the art will recognize that several commercial forums are available for distribution of mobile applications including, by way of non-limiting examples, Apple® App Store, Google® Play, Chrome WebStore, BlackBerry® App World, App Store for Palm devices, App Catalog for webOS, Windows® Marketplace for Mobile, Ovi Store for Nokia® devices, Samsung® Apps, and Nintendo® DSi Shop.

Standalone Application

In some embodiments, a computer program includes a standalone application, which is a program that is run as an independent computer process, not an add-on to an existing process, e.g., not a plug-in. Those of skill in the art will recognize that standalone applications are often compiled. A compiler is a computer program(s) that transforms source code written in a programming language into binary object code such as assembly language or machine code. Suitable compiled programming languages include, by way of non-limiting examples, C, C++, Objective-C, COBOL, Delphi, Eiffel, Java™, Lisp, Python™, Visual Basic, and VB .NET, or combinations thereof. Compilation is often performed, at least in part, to create an executable program. In some embodiments, a computer program includes one or more executable complied applications.

Web Browser Plug-In

In some embodiments, the computer program includes a web browser plug-in (e.g., extension, etc.). In computing, a plug-in is one or more software components that add specific functionality to a larger software application. Makers of software applications support plug-ins to enable third-party developers to create abilities which extend an application, to support easily adding new features, and to reduce the size of an application. When supported, plug-ins enable customizing the functionality of a software application. For example, plug-ins are commonly used in web browsers to play video, generate interactivity, scan for viruses, and display particular file types. Those of skill in the art will be familiar with several web browser plug-ins including, Adobe® Flash® Player, Microsoft® Silverlight®, and Apple® QuickTime®. In some embodiments, the toolbar comprises one or more web browser extensions, add-ins, or add-ons. In some embodiments, the toolbar comprises one or more explorer bars, tool bands, or desk bands.

In view of the disclosure provided herein, those of skill in the art will recognize that several plug-in frameworks are available that enable development of plug-ins in various programming languages, including, by way of non-limiting examples, C++, Delphi, Java™, PHP, Python™, and VB .NET, or combinations thereof.

Web browsers (also called Internet browsers) are software applications, designed for use with network-connected digital processing devices, for retrieving, presenting, and traversing information resources on the World Wide Web. Suitable web browsers include, by way of non-limiting examples, Microsoft® Internet Explorer®, Mozilla® Firefox®, Google® Chrome, Apple® Safari®, Opera Software® Opera®, and KDE Konqueror. In some embodiments, the web browser is a mobile web browser. Mobile web browsers (also called mircrobrowsers, mini-browsers, and wireless browsers) are designed for use on mobile digital processing devices including, by way of non-limiting examples, handheld computers, tablet computers, netbook computers, subnotebook computers, smartphones, music players, personal digital assistants (PDAs), and handheld video game systems. Suitable mobile web browsers include, by way of non-limiting examples, Google® Android® browser, RIM Blackberry® Browser, Apple® Safari®, Palm® Blazer, Palm® WebOS® Browser, Mozilla® Firefox® for mobile, Microsoft® Internet Explorer® Mobile, Amazon® Kindle® Basic Web, Nokia® Browser, Opera Software® Opera® Mobile, and Sony® PSP™ browser.

Software Modules

In some embodiments, the platforms, systems, media, and methods disclosed herein include software, server, and/or database modules, or use of the same. In view of the disclosure provided herein, software modules are created by techniques known to those of skill in the art using machines, software, and languages known to the art. The software modules disclosed herein are implemented in a multitude of ways. In various embodiments, a software module comprises a file, a section of code, a programming object, a programming structure, or combinations thereof. In further various embodiments, a software module comprises a plurality of files, a plurality of sections of code, a plurality of programming objects, a plurality of programming structures, or combinations thereof. In various embodiments, the one or more software modules comprise, by way of non-limiting examples, a web application, a mobile application, and a standalone application. In some embodiments, software modules are in one computer program or application. In other embodiments, software modules are in more than one computer program or application. In some embodiments, software modules are hosted on one machine. In other embodiments, software modules are hosted on more than one machine. In further embodiments, software modules are hosted on cloud computing platforms. In some embodiments, software modules are hosted on one or more machines in one location. In other embodiments, software modules are hosted on one or more machines in more than one location.

Databases

In some embodiments, the platforms, systems, media, and methods disclosed herein include one or more databases, or use of the same. In view of the disclosure provided herein, those of skill in the art will recognize that many databases are suitable for storage and retrieval of spectral information. In various embodiments, suitable databases include, by way of non-limiting examples, relational databases, non-relational databases, object oriented databases, object databases, entity-relationship model databases, associative databases, and XML databases. Further non-limiting examples include SQL, PostgreSQL, MySQL, Oracle, DB2, and Sybase. In some embodiments, a database is internet-based. In further embodiments, a database is web-based. In still further embodiments, a database is cloud computing-based. In other embodiments, a database is based on one or more local computer storage devices.

While preferred embodiments of the present invention have been shown and described herein, it will be obvious to those skilled in the art that such embodiments are provided by way of example only. Numerous variations, changes, and substitutions will now occur to those skilled in the art without departing from the invention. It should be understood that various alternatives to the embodiments of the invention described herein may be employed in practicing the invention.

EXAMPLES

Example 1: Dome-Shaped Accessory

A dome, such a hemi-spherical glass dome, creates a cavity with a closing plane. The cavity closing plane can be a mirror or a diffuse white material. Preferably, the reflectivity of the closing plane material is as close as possible to 100% and as flat across the useful wavelength range of the system as possible. In some cases, the dome has a shape that is different from a hemi-sphere in order to provide more uniform illumination of the sample. This may be more important when the reflections from the sample and from the other walls have a specular component larger than the randomly diffuse reflections.

One or more wide-band and wide-angle light sources are placed in small-area openings in the closing plane. One or more spectrometer receivers are placed at one or more openings in the closing plane. Preferably, the spectrometer has wide angle incidence and small area A relative to the surface area of sample, S. In some cases, narrow band sources may be used, such as when the sample spectral response is important in a set of well-defined wavelengths. In some cases, narrow-angle light sources may be preferable to wide-angle light sources, such as in cases in which the light is guided by an optical fiber, or when a laser is used as a light source. Optionally, lenses or transparent diffusers or engineered diffusers may also be used to convert a narrow beam source to a wide-angle illumination.

Optionally, the dome is coated on one or two sides by anti-reflecting coating to reduce unwanted reflections from the surface of the dome.

The cavity is placed in a measurement volume that can be filled by the sampled substance, which is preferably diffusive. For instance, the cavity may be placed in a sample comprising grains.

Assume now that the reflectance of the sample is $\mu(\lambda)$, where u is a unit-less value smaller than 1, and $\lambda$ is the wavelength. Assume also that the illumination spectral density power is $P(\lambda)$, for example, P may be expressed in units of milliwatts per nanometer [mW/nm].

Given the shape of the accessory, the wide angle illumination, and a highly reflective, highly diffusive sample ($\mu(\lambda)$ not much smaller than 1), it can be assumed that the power flux spectral density, $E(\lambda)$ in the cavity is uniform, where E may be expressed in units of milliwatts per nanometer per square millimeter (mW/nm/mm$^2$).

Under the simplifying assumption that the closing plane reflectivity is 1 and the spectrometer absorbs all of the light emitted by the light source impinging on the spectrometer, the steady state condition will be established when the power injected into the cavity in the form of light emitted by the light source equals the power absorbed by the sample and the spectrometer. Thus:

$$P(\lambda) = E(\lambda) * (A + S * (1 - \mu(\lambda)))$$

Spectrometer output $M(\lambda)$ can be written as $M(\lambda) = A*E(\lambda)$. Therefore:

$$M(\lambda) = \frac{P(\lambda)}{1 + S/A(1 - \mu(\lambda))}$$

Since S/A>>1, the contrast of the spectrum is significantly improved. For example, assume that the reflectivity of the sample $\mu(\lambda)$ is nominally 90%, with a range of ±1%. The contrast in a reflectance test will therefore be $(\mu_{MAX} - \mu_{MIN})/(\mu_{MAX} + \mu_{MIN}) = (91-89)/(91+89) = 1.11\%$. Assume now that S/A=100. The contrast in the improved-sensitivity accessory is calculated by insertion of $\mu_{MAX}$, $\mu_{MIN}$ and S/A into the equations of M and calculating the contrast in M, resulting in improved contrast of 9.1%, a factor of 8.2 larger than in the single-reflection spectrometry.

It can be seen that, depending on the reflectivity of the sample, it is possible to trade off light intensity for the larger optical path. This may be achieved by selecting the ratio between S and A. The larger this ratio, the better the contrast but the smaller the received light intensity.

Example 2: Dynamic Cavity Gain Control Using a Rotating Prism

A prism, such as a square prism, may be used to dynamically adjust the gain of a spectrometer cavity. A sample may be detected using two or more cavity geometries, thereby providing a plurality of contrasts. One mechanism to dynamically adjust the gain is to control the average reflectivity of the closing plane. FIG. 16 illustrates an accessory for controlling the reflectivity of the closing plane by rotating one or more square prisms about an axis substantially parallel to the closing plane. Each side of a prism may be coated, covered, or painted with a material with different reflective properties. Each surface may have different reflectivity. Rotating a prism about its axis may change the average reflectivity of the closing plane, thereby adjusting the cavity gain. A sample may be measured at one or more prism configurations. A sample may be measured at one or more contrast settings. Measurement of the sample at multiple configurations may be useful when calibration of the spectrometer is not convenient or if calibration of the spectrometer is time consuming.

The invention claimed is:

1. A system for improving a reflectance spectrum of a diffusive sample, comprising:
    an optical spectrometer;
    a light source; and
    an encasement, comprising:
    (i) an outer surface;
    (ii) an inner surface defining a cavity and partially or completely enclosing said light source and said optical spectrometer in said cavity, wherein said optical spectrometer is positioned at a center of a floor of said inner surface and wherein said outer surface, a ceiling of said inner surface, and said floor of said inner surface are in optical communication with said diffusive sample, wherein said diffusive sample is positioned outside of said cavity; and
    wherein said encasement is disposed relative to each of said optical spectrometer and said light source such that light emitted by said light source achieves at least two optical interactions with said diffusive sample before being received by said optical spectrometer.

2. The system of claim 1, wherein said outer surface is hemispherical.

3. The system of claim 1, wherein said outer surface is transparent.

4. The system of claim 1, wherein said outer surface is translucent.

5. The system of claim 1, wherein said floor of said inner surface has a reflectivity greater than 98% over a range of wavelengths of light detected by said optical spectrometer.

6. The system of claim 1, wherein said floor of said inner surface comprises a diffuse reflective material.

7. The system of claim 6, wherein said diffuse reflective material comprises a diffuse white reflector.

8. The system of claim 6, wherein said diffuse reflective material is flat.

9. The system of claim 1, wherein said encasement is in physical contact with said diffusive sample only at said outer surface.

10. The system of claim 1, wherein said light source is configured to emit light within a light cone having a half-angle of at least 60 degrees.

11. The system of claim 1, wherein said light source has a bandwidth of at least 10 nanometers (nm).

12. The system of claim 1, wherein said optical spectrometer is configured to detect light within a light cone having a half-angle of at least 60 degrees.

13. The system of claim 1, wherein said at least two optical interactions increase a contrast of an optical spectrum obtained by said optical spectrometer by a factor of at least 2 relative to a contrast of an optical spectrum obtained by said optical spectrometer in the absence of said encasement.

14. The system of claim 1, wherein said cavity is disposed within a measurement volume filled by said diffusive sample.

15. The system of claim 1, wherein said encasement is disposed relative to said light source such that light emitted by said light source passes through said cavity prior to contacting said inner surface.

16. The system of claim 15, wherein said light emitted by said light source achieves a uniform power flux density within said cavity.

17. The system of claim 1, wherein said diffusive sample is a solid.

18. The system of claim 1, wherein said optical spectrometer is positioned such that light reflected from said inner surface is directed away from said optical spectrometer.

19. The system of claim 1, wherein said optical spectrometer is positioned such that light reflected from said outer surface is directed away from said optical spectrometer.

20. The system of claim 1, wherein said ceiling of said inner surface is hemispherical.

* * * * *